United States Patent
Horn et al.

(10) Patent No.: US 10,117,219 B2
(45) Date of Patent: Oct. 30, 2018

(54) WIRELESS NETWORK PAGE TRANSMISSION AND RESPONSE

(71) Applicant: QUALCOMM Incorporated, San Diego, CA (US)

(72) Inventors: Gavin Bernard Horn, La Jolla, CA (US); Stefano Faccin, Hayward, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/597,711

(22) Filed: Jan. 15, 2015

(65) Prior Publication Data

US 2016/0057729 A1 Feb. 25, 2016

Related U.S. Application Data

(60) Provisional application No. 62/040,953, filed on Aug. 22, 2014.

(51) Int. Cl.
*H04W 48/18* (2009.01)
*H04W 68/12* (2009.01)
(Continued)

(52) U.S. Cl.
CPC ......... *H04W 68/005* (2013.01); *H04W 48/18* (2013.01); *H04W 68/12* (2013.01); *H04W 68/02* (2013.01); *H04W 88/06* (2013.01)

(58) Field of Classification Search
CPC ..... H04W 88/06; H04W 68/12; H04W 12/08; H04W 48/08; H04W 48/10; H04L 63/08; H04L 47/125
See application file for complete search history.

(56) References Cited

U.S. PATENT DOCUMENTS

2005/0083913 A1* 4/2005 Choi ............... H04W 4/06
370/352
2007/0171850 A1* 7/2007 Feder ............... H04W 68/00
370/311

(Continued)

FOREIGN PATENT DOCUMENTS

WO     WO-200126407 A1     4/2001
WO     WO-2009158626 A1    12/2009
WO     WO-2010117761 A1    10/2010

OTHER PUBLICATIONS

ISA/EPO, International Search Report and Written Opinion of the International Searching Authority, Int'l Appl. No. PCT/US2015/044768, dated Nov. 6, 2015, European Patent Office, Rijswijk, NL, 11 pgs.

*Primary Examiner* — Frantz Bataille
(74) *Attorney, Agent, or Firm* — Qualcomm IP Dept.; James Hunt Yancey, Jr.

(57) ABSTRACT

Mobile devices may receive page transmissions that include information related to a service for which the mobile device is being paged. The mobile device may be provided with a policy that describes a priority of radio access technologies (RATs) based on the type of service for which the mobile device is being paged. The mobile device, based at least in part on the service information, may access one or more of the wireless communications networks based on the identified service and/or based on the policy. A page transmission may include an indication of a RAT that is to be used for the page response and/or an index into the policy. A base station that transmits a page transmission may include an identifier of a particular network that is to be accessed in response to the page.

36 Claims, 32 Drawing Sheets

(51) Int. Cl.
*H04W 88/06* (2009.01)
*H04W 68/02* (2009.01)
*H04W 68/00* (2009.01)

(56) References Cited

U.S. PATENT DOCUMENTS

| | | | |
|---|---|---|---|
| 2008/0170520 A1* | 7/2008 | Sim | H04W 72/005 370/310 |
| 2010/0067433 A1* | 3/2010 | Cheng | H04W 24/10 370/320 |
| 2010/0093389 A1* | 4/2010 | Asokan | H04W 68/12 455/552.1 |
| 2011/0072101 A1 | 3/2011 | Forssell et al. | |
| 2011/0075608 A1* | 3/2011 | Chai | H04W 48/18 370/328 |
| 2012/0052885 A1* | 3/2012 | Zhang | H04W 76/026 455/458 |
| 2012/0302241 A1* | 11/2012 | Klingenbrunn | H04W 48/16 455/436 |
| 2013/0232555 A1 | 9/2013 | Zhang et al. | |
| 2013/0303203 A1 | 11/2013 | Wang et al. | |
| 2013/0308445 A1 | 11/2013 | Xiang et al. | |
| 2014/0003254 A1* | 1/2014 | Andreoli-Fang | H04W 28/02 370/252 |
| 2014/0286296 A1* | 9/2014 | Tiirola | H04L 5/001 370/329 |
| 2016/0029303 A1* | 1/2016 | Sahu | H04W 36/14 370/331 |

\* cited by examiner

WIRELESS NETWORK PAGE TRANSMISSION AND RESPONSE

CROSS REFERENCES

The present application for patent claims priority to U.S. Provisional Patent Application No. 62/040,953 by Horn et al., entitled "Wireless Network Page Transmission and Response," filed Aug. 22, 2014, assigned to the assignee hereof, and expressly incorporated by reference herein.

BACKGROUND

Field of the Disclosure

The present disclosure, for example, relates to wireless communication systems, and more particularly to page transmission and response in systems which may utilize multiple concurrent radio access technologies for wireless communications with a mobile device Description of the Related Art Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as mobile devices and/or user equipment (mobile device). A base station may communicate with mobile devices on downlink channels (e.g., for transmissions from a base station to a mobile device) and uplink channels (e.g., for transmissions from a mobile device to a base station).

In some wireless networks, a mobile device may be capable of supporting multiple radio access technologies (RATs) concurrently, and/or multiple different connections for a same RAT using different frequency bands. For example, a mobile device may simultaneously transmit data over a wireless local area network (WLAN) link and a Long Term Evolution (LTE) link. Similarly, a mobile device may have multiple concurrent LTE links that operate at different frequencies. A particular RAT may be selected for certain communications based on any of a number of factors, including, for example, bandwidth of the RAT and/or a type of service that is being provided for using the wireless communications (e.g., data service, real time audio streaming, etc.). When the network initiates a service to a mobile device, the network may initiate a paging procedure in which a paging transmission is sent to the mobile device to indicate that communications are to be initiated.

SUMMARY

The described features generally relate to one or more improved systems, methods, and/or apparatuses for page transmissions and response between a network and a mobile device in a wireless communication system that may utilize multiple wireless communications networks that operate according to different radio access technologies (RATs). Mobile devices, in some examples, may receive page transmissions that include information related to a service for which the mobile device is being paged. The mobile device may, based at least in part on the service information, access one or more of the wireless communications networks based on the identified service. The particular wireless communications network(s) may be selected based on an indication of the network contained in the page transmission and/or based on a policy that indicates a priority of RATs based on a type of service that is to be initiated in response to the page transmission.

In some examples, mobile devices may identify services on the device (e.g., active services on the mobile device) and may include the services in registration messages for a network. Additionally or alternatively, the mobile devices may identify available connections to include in registration messages. The mobile devices may thus transmit the registration messages to the network with the identified services and/or available connections, which the network may use to determine a registration procedure for each mobile device.

Mobile devices may also, in some cases determine that they are capable of receiving a paging message via a non-cellular RAT. Mobile devices with this capability may transmit a registration message to a network indicating the capability. Such mobile devices may thus be paged for cellular or non-cellular data via a non-cellular RAT.

In a first set of illustrative examples, a method for wireless communication is described. In one configuration, the method may include receiving a page transmission at a mobile device, the page transmission including service information; determining one or more of a plurality of available networks to access for wireless communication based at least in part on the service information; and accessing one or more of the determined networks responsive to the determining.

According to the first set of examples, an apparatus for wireless communication is described. In one configuration, the apparatus may include means for receiving a page transmission at a mobile device, the page transmission including service information; means for determining one or more of a plurality of available networks to access for wireless communication based at least in part on the service information; and means for accessing one or more of the determined networks responsive to the determining.

According to the first set of examples, another apparatus for wireless communication is described. In one configuration, the apparatus may include a processor; memory in electronic communication with the processor; and instructions stored in the memory. The instructions may be executable by the processor to: receive a page transmission at a mobile device, the page transmission including service information; determine one or more of a plurality of available networks to access for wireless communication based at least in part on the service information; and access one or more of the determined networks responsive to the determining.

According to the first set of examples, a non-transitory computer-readable medium storing computer-executable code for wireless communication is described. In one configuration, the code may be executable by a processor to: receive a page transmission at a mobile device, the page transmission including service information; determine one or more of a plurality of available networks to access for wireless communication based at least in part on the service information; and access one or more of the determined networks responsive to the determining.

In some aspects of the method, apparatuses, and/or non-transitory computer-readable medium of the first set of examples, the service information may include an identifier indicating one or more services to be initiated responsive to the page transmission, and the determining may be based at least in part on the one or more services. The determining, in some examples, may be based at least in part on a quality of service requirement of the one or more services. In some examples, the service information may include an index into a policy defining which of the plurality of networks to access for wireless communication. The plurality of available networks may provide, in examples, wireless communications through two or more different RATs and the policy may provide an order for accessing RATs based on a RAT priority. In some examples, the index may indicate a position in the order for accessing RATs, and/or the policy may indicate one or more RATs that are prohibited based on the page transmission.

In some aspects of the method, apparatuses, and/or non-transitory computer-readable medium of the first set of examples, a paging response may be transmitted responsive to the received page transmission. The paging response may be transmitted, for example, using a different network than a network that provided the page transmission. The transmitting may include, in certain examples, determining which of the plurality of available networks is to be used to transmit the paging response, based at least in part on a policy that indicates a RAT for sending the paging response. In some examples, the paging response may be tunneled to the network that provided the page transmission.

In some aspects of the method, apparatuses, and/or non-transitory computer-readable medium of the first set of examples, the page transmission may include an access indication of a RAT for transmitting a paging response; and a determination may be made that one or more of the plurality of available networks provide different RATs and which of the plurality of available networks is to be used to transmit the paging response may be based at least in part on a policy for transmitting paging responses. The access indication may include, for example, a service identifier indicating one or more services to be initiated responsive to the page transmission. In certain examples, the access indication may include an indication of a RAT or frequency for use in the paging response. In some examples, the access indication may include a network identifier. The policy may include, in some examples, a list of RATs available for paging response based on the service information. The policy may be received, in some examples, as part of a broadcast message such as in a system information block (SIB).

In some aspects of the method, apparatuses, and/or non-transitory computer-readable medium of the first set of examples, the policy may be received as part of the page, and a determination may be made whether to apply the policy based on the access indication. In certain examples, the access indication may include an indication to override the policy. In other examples, a determination may be made whether the policy allows the access indication to override the policy, and a response to the page transmission may be based on the access indication when the policy allows the access indication to override the policy and based on the policy when the policy does not allow the access indication to override the policy.

In a second set of illustrative examples, a method for wireless communication is described. In one configuration, the method may include determining a service to be initiated with a mobile device; determining one or more of a plurality of available RATs suitable for providing the service; and transmitting a page transmission to the mobile device, the page transmission including service information indicating which of the one or more of the plurality of RATs are to be used by the mobile device to initiate the service.

According to the second set of examples, an apparatus for wireless communication is described. In one configuration, the apparatus may include means for determining a service to be initiated with a mobile device; means for determining one or more of a plurality of available RATs suitable for providing the service; and means for transmitting a page transmission to the mobile device, the page transmission including service information indicating which of the one or more of the plurality of RATs are to be used by the mobile device to initiate the service.

According to the second set of examples, an apparatus for wireless communication is described. In one configuration, the apparatus may include a processor; memory in electronic communication with the processor; and instructions stored in the memory. The instructions may be executable by the processor to: determine a service to be initiated with a mobile device; determine one or more of a plurality of available RATs suitable for providing the service; and transmit a page transmission to the mobile device, the page transmission including service information indicating which of the one or more of the plurality of RATs are to be used by the mobile device to initiate the service.

According to the second set of examples, a non-transitory computer-readable medium storing computer-executable code for wireless communication is described. In one configuration, the code may be executable by a processor to: determine a service to be initiated with a mobile device; determine one or more of a plurality of available RATs suitable for providing the service; and transmit a page transmission to the mobile device, the page transmission including service information indicating which of the one or more of the plurality of RATs are to be used by the mobile device to initiate the service.

In some aspects of the method, apparatuses, and/or non-transitory computer-readable medium of the first set of examples, the service information may include an index into a policy defining which of the plurality of RATs to use for wireless communication. The policy may provide, in some examples, an order for accessing RATs based on a RAT priority. The policy, in certain examples, may be transmitted in an SIB. The service information, in some examples, may be transmitted in a downlink data notification message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
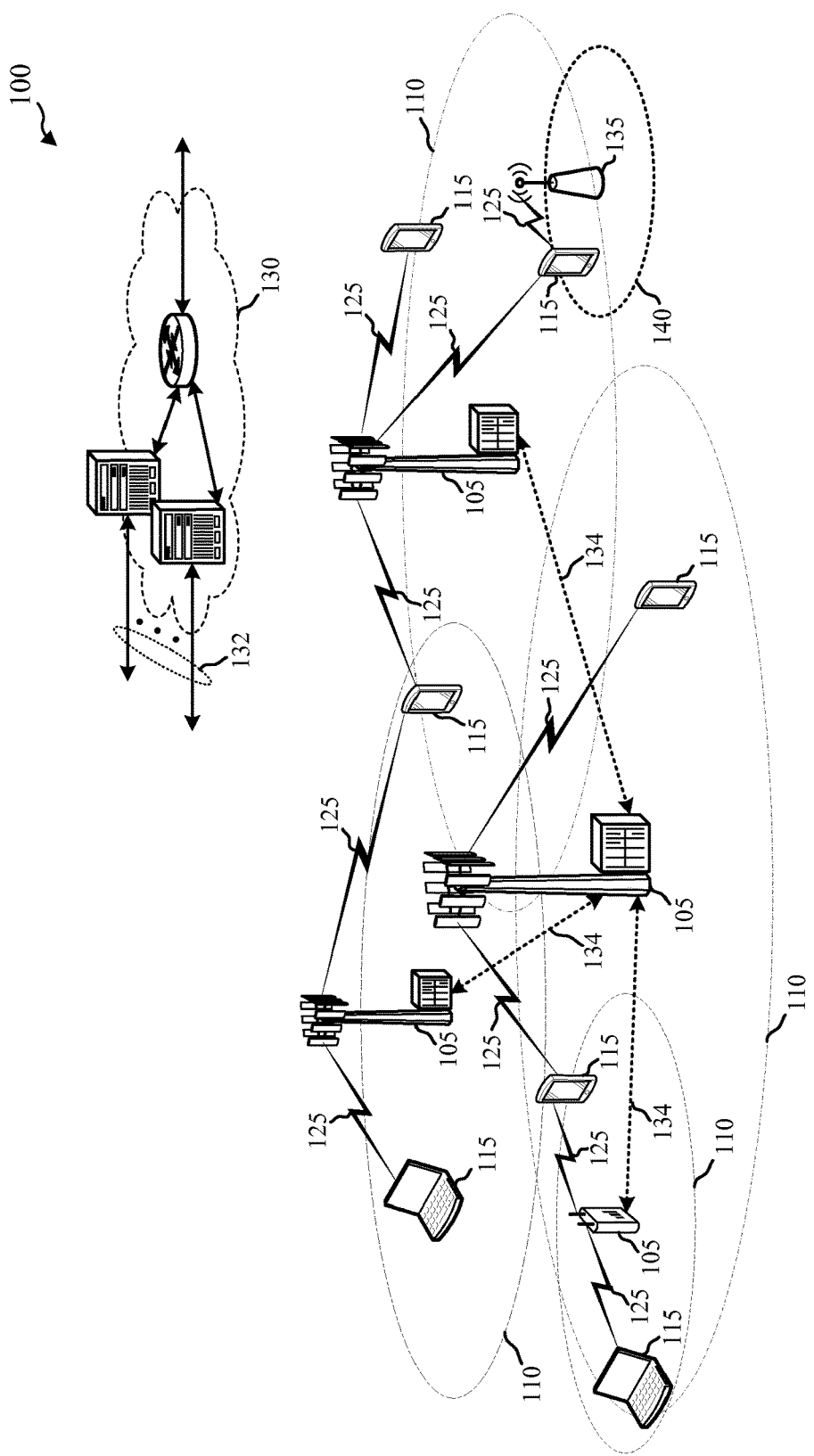
FIG. 1 shows a block diagram of a wireless communications system, in accordance with various aspects of the present disclosure.

Various examples described herein provide for efficient paging and network access in wireless communication systems that may utilize multiple RATs. According to various existing network deployments, when a mobile device is paged, the mobile device access the network that provided the page transmission. Based on the type of service to be initiated in response to the page, the network that provided the page transmission may redirect the mobile device to initiate the service on a different RAT based on one or more factors (e.g., mobile device capability, RAT availability, quality of service requirements, etc.). Wireless communication system efficiency, according to various examples, may be enhanced through direct access by a mobile device to an available network other than the network that transmitted the page request. In other examples, a non-cellular RAT may be used to transmit a page transmission to a mobile device.

Mobile devices, in some examples, may receive page transmissions that include information related to a service for which the mobile device is being paged. The mobile device may be provided with a policy that describes a priority of RATs based on the type of service for which the mobile device is being paged. The mobile device, based at least in part on the service information, may access one or more of the wireless communications networks based on the identified service and/or based on the policy. In some examples, a page transmission may include an indication of a RAT that is to be used for the page response and/or an index into the policy. A base station that transmits a page transmission, in some examples, may include an identifier of a particular network that is to be accessed in response to the page. Such a determination may be made by the base station based on a policy for network access that identifies a priority of RATs based on the type of service for which the mobile device is being paged.

In some examples, the network may determine a registration procedure based on services and/or available connections at each mobile device. For instance, a mobile device may identify services or available connections, or both, to include in a registration message transmitted to the network. The identified services and/or available connections may be selected from a set of such services and/or connections. Services and available connections may be identified from a set of services or available connections associated with the network at which the mobile device seeks to register. In some examples, the mobile devices identifies services and/or available connections according to a reporting policy or user indication, and the mobile device transmits the registration message accordingly. The network may also indicate to the mobile device whether and how frequently to provide updated registration messages. A registration procedure may involving paging cycles, tracking areas for which the mobile device may register, a number of cells for which the mobile device may register, or the like.

Additionally or alternatively, mobile devices may be paged via a non-cellular RAT. A mobile device may determine that it is capable of receiving a paging message via a non-cellular RAT and may transmit an indication of such to a network (e.g., a cellular network). Upon registering with the network and a non-cellular paging server (NCPS) of the non-cellular RAT, the mobile device may receive paging messages via the non-cellular RAT.

Techniques described herein may be used for various wireless communications systems such as cellular wireless systems, Peer-to-Peer wireless communications, wireless local access networks (WLANs or Wi-Fi networks), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. According to various examples, a RAT refer to wireless communications conducted according to a standardized implementation of one or more radio communication technologies. A wireless communications system or network that implements a RAT may be called a Radio Access Network (RAN).

Techniques described herein may be used for various wireless communications systems such as CDMA, TDMA, FDMA, OFDMA, SC-FDMA, and other systems. For example, RATs employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

As used in the present specification and claims, the terms "paging message," "page message," "paging transmission," and "page transmission" are interchangeable.

FIG. 1 shows a block diagram of a wireless communications system 100 in accordance with various aspects of the disclosure. The wireless communications system 100 includes base stations 105, mobile devices 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the mobile devices 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the mobile devices 115 via one or more base station antennas. Each of the base station 105 sites may provide communication coverage for a respective geographic coverage area 110. As discussed below, several coverage areas may make up a tracking area (TA) in which a mobile device 115 may be paged. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies. In some deployments, certain base stations 105 may operate according to a first RAT, while other base stations 105 may operate according to a second RAT. Different RATs may include, for example, LTE/LTE-A technologies, CDMA technologies, and/or wireless local area network (WLAN) technologies that may operate according to IEEE 802.11 (e.g., Wi-Fi networks) or other network communications protocols. The mobile devices 115 may, in some examples, be paged over multiple RATs.

In some examples, the wireless communications system 100 includes one or more WLAN or Wi-Fi networks such as IEEE 802.11 networks. WLAN networks may include one or more access points (AP) 135. As mentioned above, mobile devices 115 may be capable of connecting to radio access networks (RANs) operating using different RATs. In the example of FIG. 1, mobile devices 115 may access a WLAN network via the WLAN APs 135. Each WLAN AP 135 may have a coverage area 140 such that mobile devices 115 within that area can typically communicate with the WLAN AP 135. When referring to the WLAN network, the mobile devices 115 may be referred to as wireless stations, stations (STAs), or mobile stations (MSs). Although not shown in FIG. 1, a mobile device 115 can be covered by more than one WLAN AP 135 and can therefore associate with different APs at different times depending on which one provides a more suitable connection. A WLAN AP 135 and an associated set of stations may be referred to as a basic service set (BSS). An extended service set (ESS) is a set of connected BSSs and a distribution system (DS) (not shown) is used to connect APs in an extended service set.

In some examples, the wireless communications system 100 includes an LTE/LTE-A network that is configured to operate concurrently with one or more other networks using different RATs. In LTE/LTE-A networks, the term evolved Node B (eNB) may be generally used to describe the base stations 105, while the term user equipment (UE) may be generally used to describe the mobile devices 115. The wireless communications system 100 may be a Heterogeneous LTE/LTE-A network in which different types of base stations provide coverage for various geographical regions. For example, each base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by mobile devices with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by mobile devices with service subscriptions with the network provider. A femto cell also may cover a relatively small geographic area (e.g., a home) and may provide restricted access by mobile devices having an association with the femto cell (e.g., mobile devices in a closed subscriber group (CSG), mobile devices for users in the home, and the like). A base station for a macro cell may be referred to as a macro base station. A base station for a small cell may be referred to as a small cell base station, a pico base station, a femto base station or a home base station. A base station may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a mobile device 115 and the base stations 105 or core network 130 supporting radio bearers for the user plane data. At the Physical (PHY) layer, the transport channels may be mapped to Physical channels.

The mobile devices 115 are dispersed throughout the wireless communications system 100, and each mobile device 115 may be stationary or portable. A mobile device 115 may also include or be referred to by those skilled in the art as a user equipment (UE), a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro base stations, small cell base stations, relay base stations, and the like.

The communication links 125 shown in wireless communications system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. The communication links 125 may be used for various communications related to paging, including tracking area update (TAU) Update Request messages, paging messages, and the like.

In some examples of the wireless communications system 100, base stations 105 and/or mobile devices 115 may include multiple antennas and/or multiple transceivers for communicating with networks operating according to different RATs. Additionally or alternatively, base stations 105 and/or mobile devices 115 may employ multiple-input, multiple-output (MIMO) techniques that may take advantage of multi-path environments to transmit multiple spatial layers carrying the same or different coded data.

Furthermore, as mentioned above, mobile devices 115 may be multi-mode devices and may be capable of concurrently supporting connections with different RATs. For example, mobile devices 115 may be capable of establishing and maintaining concurrent radio links such as, for example, transmitting and receiving communications with both an LTE base station 105 and a WLAN AP 135 at the same time. In some deployments, the wireless communications system 100 may be configured to manage communications over multiple concurrent RATs at the packet or bearer levels. For packet-level operation, a single RLC layer may be maintained for a mobile device 115 that provides packets to be transmitted over different RATs, such as over both the LTE and the WLAN RATs. In bearer-level operation, individual bearers established for the mobile device 115 may be assigned to different RATs, such as either the LTE or the WLAN networks, and the bearers may provide packets for their assigned links. In certain examples, RAT base stations/access points may be collocated. For example, one or more LTE base stations 105 may be collocated with one or more WLAN APs 135.

Figure 2:
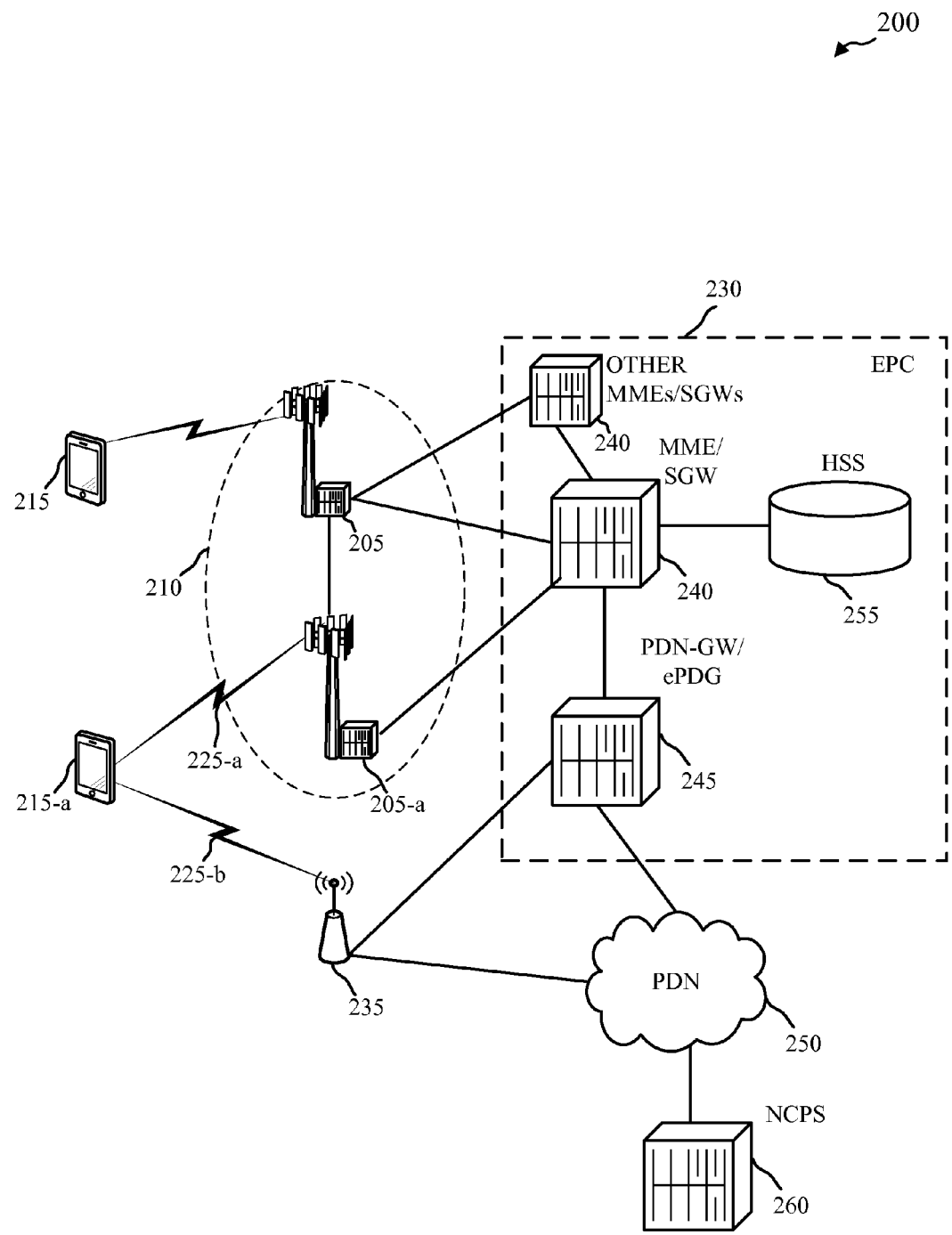
FIG. 2 shows a block diagram of a wireless communications system and associated network elements, in accordance with various aspects of the present disclosure.

FIG. 2 shows a block diagram of a wireless communications system 200 and associated network elements, in accordance with various aspects of the present disclosure. The wireless communications system 200 may include multiple RANs utilizing multiple RATs, such as, for example, one or more LTE/LTE-A networks and one or more WLAN networks with overlapping coverage areas. The LTE/LTE-A network may include a core network 230 (referred to as an evolved packet core (EPC)) and one or more base stations 205, 205-a making up a first RAN. The WLAN network may include one or more WLAN APs 235 that make up a second RAN.

The mobile devices 215, 215-a may be capable of communicating with a packet data network (PDN) 250 via the LTE/LTE-A network or the WLAN network. The PDN(s) 250 may include the Internet, an Intranet, an IP Multimedia Subsystem (IMS), a Packet-Switched (PS) Streaming Service (PSS), and/or other types of PDNs.

The evolved packet core (EPC) 230 may include a number of mobility management entity/serving gateway (MME/SGW) nodes 240 and a number of packet data network (PDN) gateways (PDN-GWs)/evolved packet data gateways (ePDG) 245. Each of the MME/SGW nodes 240 may implement both a mobile management entity (MME) and a serving gateway (SGW), as defined by the Evolved Packet System (EPS) architecture standardized by the 3GPP organization. Alternatively, the MMEs and SGWs may be implemented by separate devices. The MME may be the control node that processes the signaling between the base stations 105 and the core network 230. Generally, the MME may provide bearer and connection management in connection with the HSS 255. The HSS 255 is a database that contains user-related and subscriber-related information. The HSS 255 also provides support functions in mobility management, call and session setup, user authentication and access authorization. The MME may, therefore, be responsible for idle mode mobile device tracking and paging, bearer activation and deactivation, and SGW selection for the mobile devices 215. The MME may additionally authenticate the mobile devices 215 and implement Non-Access Stratum (NAS) signaling with the mobile devices 215

Mobile device 215-a may be a multi-mode mobile device capable of concurrent communications with base station 205-a over link 225-a and WLAN AP 235 over link 225-b. In some examples, the mobile device 215-a may receive a signal over link 225-a and initiate a transmission over link 225-b. In some cases, the mobile device 215-a may receive a page transmission over link 225-a to initiate a service. Depending upon the type of service that is to be initiated, the mobile device 215-a may initiate communications using the LTE/LTE-A network or using the WLAN through WLAN AP 235. In some examples, a page transmission may be initiated by MME/SGW node 240 and transmitted to the mobile device 215-a via either base station 205-a or a non-cellular paging server (NCPS) 260, PDN 250, and WLAN AP 235. In certain examples, the NCPS 260 may be collocated with the MME/SGW node 240.

Because a mobile device's 215 location may not be precisely known (e.g., at the cell level), a mobile device 215 may register to be paged within a tracking area (TA), which may include the geographic coverage areas 110 (FIG. 1) of a number of cells, and which may be controlled by an MME/SGW node 240. Thus, as the mobile devices 215 move within the tracking area in an idle mode, and it may be paged anywhere within the TA by the core network 230 when downlink communications are available.

In some cases, including in some LTE/LTE-A systems, a mobile device 215 may be required to register with an MME/SGW node 240—e.g., the mobile devices 215 may be required to send updated information about the tracking in which they are located. A registration area and a paging area may be the same. In other examples, because determining where to page a mobile device 215 may be MME-dependent, the MME/SGW node 240 may not need to page a mobile device 215 over the entire registration area, and implementation dependent optimizations may be utilized within the wireless communications system 200.

In some examples, a mobile device 215 may transmit a tracking area update (TAU) request, which may also be referred to as a registration message, in order to receive an update—a TAU—from an MME/SGW node 240 with information relevant to or necessary for paging the mobile device 215. For instance, a mobile device 215 may be required to register (e.g., transmit a TAU request) if a current tracking area or cell ID advertised in received system information (e.g., SIB 1) by a serving cell is not in a list of TAs and cell IDs received from the core network 230 in a prior TAU. Additionally or alternatively, a mobile device 215 may be required by the core network 230 to transmit a registration message if a TAU timer at the mobile device 215 expires. In some cases, a mobile device 215 may be required to register when the mobile device 215 reselects to camp on a new cell because, e.g., the MME/SGW node 240 may page the mobile device only at a single cell. Alternatively, a mobile device 215 may not be required to register when it reselects to camp on a new cell because, e.g., the MME/SGW node 240 may page the mobile device 215 at many cells.

In some examples, a mobile device 215 in an idle state is paged in all cells of the TAs with which it is currently registered. The mobile device may be registered in multiple TAs and may reference multiple TA lists received from the core network 230 in TAU Update Accept messages. All TAs and cell IDs in a TA list to which a mobile device 215 is registered may be served by the same MME/SGW node 240. A tracking area identity (TAI) of a mobile device 215 may be constructed from a mobile country code (MCC), a mobile network code (MNC), and/or a tracking area code (TAC).

It may be possible to require different mobile devices 215 to register in different and/or overlapping TAs, because the MME/SGW node 240 may need to page different mobile devices 215 in the different and/or overlapping TAs. In other examples, a mobile device 215 may not be required to register when it reselects to camp on a new cell of a different RAT, including WLAN, because the MME/SGW node 240, in conjunction with, e.g., the NCPS 260, may page mobile devices 215 across RATs. Additionally, some mobile devices 215, including stationary devices, may not be required to re-register because their location may be presumed by the MME/SGW node 240.

In some case, however, it may be useful to optimize the number of TAUs and paging configurations available for a particular mobile device 215 in an idle mode—e.g., accounting for the presence of heterogeneous services active on the mobile device 215 and/or the networks available for access. A mobile device 215 may provide some assistance in this regard: a TAU Request message (e.g., a registration message) may include the TA last visited by the mobile device 215. While this may be useful for the MME/SGW node 240 to determine where the mobile device 215 has come from, knowing roughly where the mobile device 215 is with respect to other RATs may be more useful in minimizing the frequency with which a mobile device 215 needs to send TAU Requests. Additionally, while the MME/SGW node 240 may be aware of active PDN 250 connections (e.g., dedicated and default bearers for each PDN 250), the MME/SGW node 240 may not always be aware of the actual services associated with the PDN 250 connections absent additional information from the mobile device 215. The mobile device 215 may thus provide an indication of active services (e.g., services or applications running on the mobile device that may need network support to work well) and/or available connections (e.g., RATs) to assist the MME/SGW node 240 improve registration procedures. For instance, the MME/SGW node 240 may use such information to determine how frequently to page the mobile device 215 and/or to indicate to the mobile device 215 where to access a page.

The mobile device 215 may also provide a list of TAs or cell IDs to indicate cells in the vicinity or on the path of the mobile device 215. In some examples, the mobile device 215 may also provide context, as described below, which may also indicate mobility of the mobile device 215 and duration of a particular connection.

As discussed below, the MME/SGW node 240 may improve registration and paging procedures by receiving from mobile devices 215 information related to active services and available connections at the mobile device 215. The MME/SGW node 240 may use such information for TA indication lists (e.g., directions to the mobile device 215 of where to listen for a page), cause the mobile device 215 to set periodic TAU timers, and/or to determine paging discontinuous reception (DRX) cycles.

In some cases, it may be desirable to enable paging of a mobile device on multiple RATs, including WLAN (e.g., Wi-Fi), and on other non-cellular technologies. Paging over non-cellular technologies may require the core network 230 to be able to deliver information to mobile devices 215 such that the mobile devices 215 detect when they are being paged over non-cellular RATs. In many systems, no paging mechanism for non-cellular technology is defined. But paging may be provided via the user plane (e.g., utilizing IP traffic). Utilizing IP traffic introduces additional issues for the core network 230 to contend with; although, as described below, such issues are avoidable. For instance, network address translation (NAT) can be an impediment to non-cellular paging, if a WLAN AP 235 is behind the NAT; but the tools discussed herein provide a manner of avoiding such issues. Additionally, the techniques described below address issues related to tracking a mobile device 215 as it moves between WLAN APs 235. The NCPS 260 facilitates both communication with and tracking of the mobile devices 215 as they move between coverage areas of 110 of various WLAN APs 235.

Figure 3:
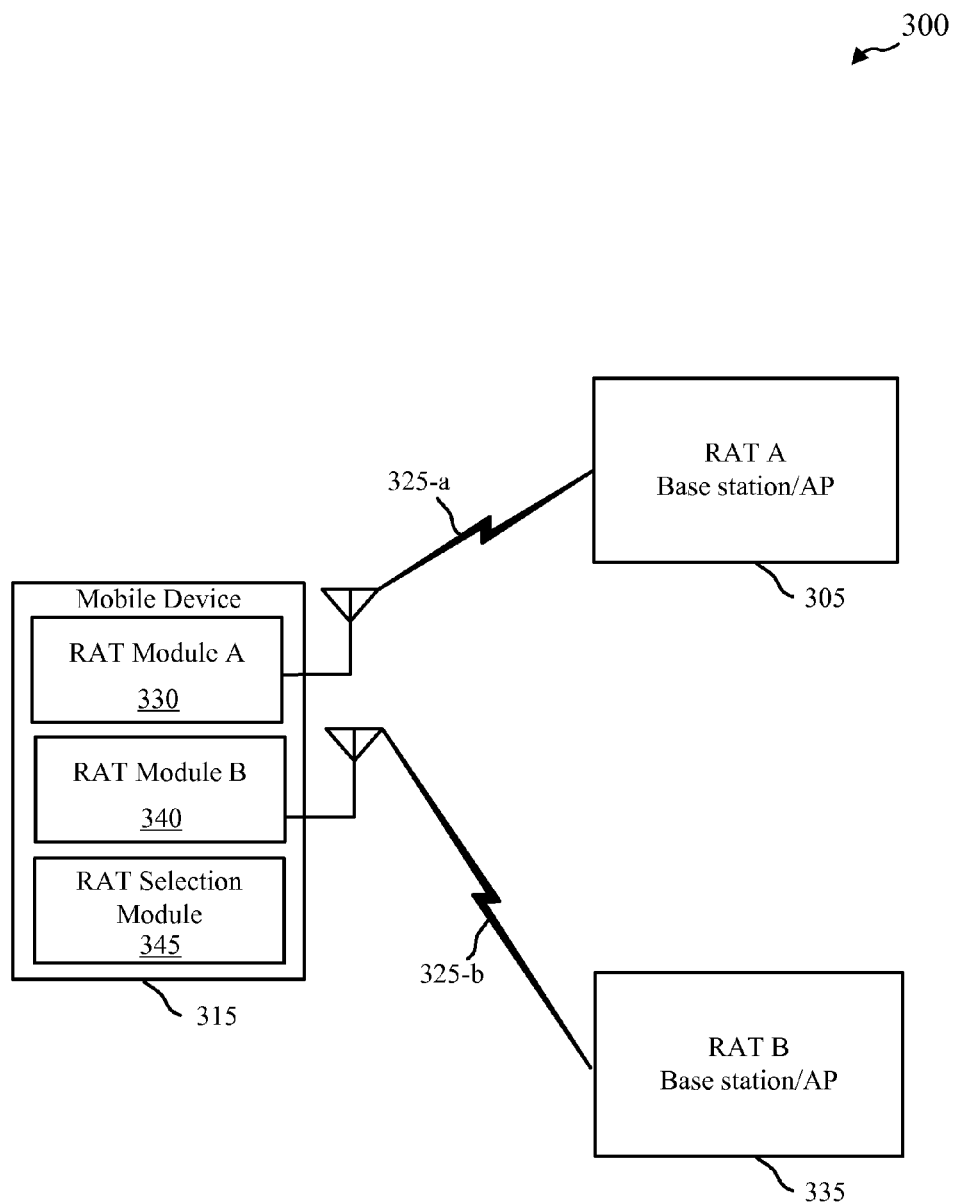
FIG. 3 shows a block diagram of a wireless communications system in which a multi-mode mobile device may communicate using multiple radio access technologies, in accordance with various aspects of the present disclosure.

FIG. 3 shows a block diagram of a wireless communications system 300 in which a multi-mode mobile device 315 may communicate using multiple RATs, in accordance with various aspects of the present disclosure. Mobile device 315 may be an example of a mobile device 115 and/or 215 of FIGS. 1 and/or 2. In the example of FIG. 3, mobile device 315 may be a multi-mode device having multiple RAT modules, RAT module A 330 and RAT module B 335. According to various examples, RAT module A 330 may be used for communications with RAT A base station/AP 305 via link 325-a. The mobile device 315 may also communicate with RAT B base station/AP 335 via link 325-b and RAT module B 340. The mobile device 315 in this example also includes a RAT selection module 345 that may determine available RATs and select which of the available RATs may be used for wireless communications.

According to various wireless communications protocols, a mobile device, such as mobile device 315, may register with one or more serving base stations and/or access points, such as base stations/APs 305, 335, and receive pages that are transmitted via one or more base stations and/or access points, such as base stations/APs 305, 335. In some examples, RAT A base station/AP 305 may be an eNB in an LTE/LTE-A network, and the mobile device 315 may perform a tracking area update (TAU) to register with the RAT A base station/AP 305. Such a registration may be performed, for example, if a current tracking area (TA) advertised in a serving cell's system information block (SIB) is not included in a list of TAs that the mobile device 315 has received from the network in a previous TAU, or if a periodic TAU timer expires. A registered mobile device 315 may receive page transmissions from a serving cell, such as RAT A base station/AP 305, which may indicate that the mobile device is to take some action. In some examples, a mobile device 315 that is in an idle state may be paged in all cells of the TAs in which the mobile device 315 is currently registered. The mobile device 315 may be registered in multiple TAs based on a TA list included in a TAU update accept message, for example. In some examples, paging may be triggered in the MME (e.g., MME/SGW node 240 of FIG. 2) when the MME receives a downlink data notification message from a SGW, the MME may initiate a page transmission to the mobile device 315. In various examples, as will be discussed in more detail below, the mobile device 315 may receive a policy that indicates a particular RAT that is to be used for responding to certain types of pages. In some examples, described in more detail below, the page transmissions may include service information that may indicate to the mobile device 315 that a particular RAT is to be used for the page response. In some examples, the service information may include an indication of the RAT to be used, or may include an index into a page policy that indicates a priority for RAT access in response to the page transmission.

The use of different RATs for different services to be provided to the mobile device 315 may allow for more efficient use of network resources. In instances where the mobile device 315 initiates a transmission, such RATs may be selected, in some examples, according to an access network discovery and selection function (ANDSF). In some examples, the ANDSF may prioritize different types of RATs for initiating the connection, which may be prioritized differently if the mobile device 315 is not capable to concurrently connect to multiple RATs, as compared to priorities of RATs for distributing traffic among available RATs when the mobile device 315 is capable to concurrently connect to multiple RATs. In some examples, the ANDSF may include a set of rules that define one or more conditions to identify traffic associated with a service (e.g. IP flow or access point name (APN)), identify conditions for validity of one or more rules (e.g. time of day, location, etc.), rule priority, and an action (i.e. routing rule). In some implementations of ANDSF, at any point in time there may be one rule applied, referred to as the "active" rule. The mobile device 315 may periodically re-evaluate ANDSF policies, irrespective of whether any rule is "active" or not. When the ANDSF policy selection rules identify an available network, the highest priority rule becomes 'active' rule and network re-selection is performed, according to some implementations.

Thus, for mobile device 315 initiated traffic, the mobile device 315 may use a policy to determine the appropriate RAT to access based on the rules. On the other hand, according to legacy implementations, when a mobile device 315 is paged, it accesses the network where it was paged. Various aspects of the present disclosure provide techniques for the network (e.g., base stations 105, 205, 305, 335 or access points (APs) 135, 235, 335, of FIGS. 1-3, or aspects of the core networks 130 or 230 of FIGS. 1, 2) to apply the types of policies available for traffic steering for mobile initiated services to mobile terminated services when they are initiated via paging from the network. According to some examples, network triggered service request procedures, referred to as paging procedures, may include information that indicates a service identifier and/or a policy that is to be used to prioritize access to one or more RAT(s) in response to a page transmission.

In some examples, paging is triggered in an MME (e.g., MME portion of MME/SGW node 240 of FIG. 2) when the MME receives a downlink data notification message from a SGW (e.g., SGW portion of MME/SGW node 240 of FIG. 2). The downlink data notification includes, for example, the address resolution protocol (ARP) and EPS Bearer ID for the data that has triggered the page. The MME may use the EPS bearer context information identified by EPS bearer ID received in downlink data notification message in order to control the paging based on operator policy such as paging retransmission strategies, determinations on whether to send the paging message based on load conditions, and/or paging enhancements for traffic arriving on a PDN connection used for Local IP Access without mobility. In order to identify the service at the MME, the downlink data notification message may be sent from the SGW to the MME, and may include additional information such as indicating the service for which the mobile device is being paged. In some examples, the PGW and/or SGW may use deep packet inspection (DPI) to determine the identity of the service and forward this information to the MME in the downlink data notification message.

In certain examples, the MME may respond to the downlink data notification message from the SGW with a downlink data notification acknowledgment message. The MME may then page the mobile device by sending the paging message based on the existing TAI list for the mobile device. In addition to identifying the mobile device, the paging message, in some examples, may be enhanced to include a service identifier that may indicate a service for which the mobile device is being paged. For example, the service identifier may be an index to the ANDSF policy on the mobile device on how to respond to the page. In other examples, the page may identify the actual service for which the mobile device is being paged. The mobile device, upon receiving the page, may determines the service information in the page and respond to the page by accessing an available network having a RAT according to the policy.

In some examples, as mentioned above, the service information may include a service index. For example, the service information may be an index of a policy to use and the mobile device may not be explicitly aware of the actual service associated with the page but rather uses the policy to determine which network/RAT to access. In other examples, the service information may include a service identifier, such as information that explicitly indicates the service associated with the page. In still further examples, the service information may include an access indication to the mobile device to redirect the access request to another RAT/frequency in the page. Such a service identifier may be used, for example, in cases where the network may determine the RAT to use based on service and access conditions. In some cases, both an access indication and a service index or identifier may be included in the service information, which may result in conflicting situations between the mobile device policies for access and the network selected RAT for access. In such a situation, the policy at the mobile device may include one or more rules that may define when an access indication may be used to override the policy, or when the policy at the mobile device may override the access indication. Such rules may be based on any of a number of factors, such as quality of service identified for one or more RATs, time of day restrictions, mobility restrictions, and/or location restrictions, for example.

In certain examples, the service index or identifier may provide the mobile device with an indication of the service that is triggering the paging. Then a policy in the mobile device may select the RAT and network to access. In further examples, the access indication, additionally or alternatively, may provide an indication of which RAT the mobile device should use to send the access request. In the event that conflicts arise, in some examples, the access indication may take priority, or alternatively, the network may provide a bit indicating that the access indication takes priority when paging is sent, in order to resolve the conflict.

In any event, in such examples, the mobile device may use the service information and the policy to determine the network/RAT to access. The policy may, in some examples, further indicate whether to allow, forbid or prioritize different RATs for access based on the service identifier. For example, the policy may include a list of RATs to access based on a priority; and/or RATs forbidden to access for the service information. In other examples, the network may indicate a preference for the mobile device to "wake up" in WLAN even if the paging was received in cellular. If the mobile device is not connected to WLAN or WLAN is not available, the mobile device may access the cellular network (and in some examples provides an indication of why it has done so).

As mentioned above, a network element that initiates paging of a mobile device may continue initiating such paging until an acknowledgment is received. In some examples, if the mobile device accesses a network that did not send the paging request, the mobile device may send an encapsulated message on the new RAT (or uses some specific channels over the new RAT that allow sending signaling to the serving nodes of other RATs) to the MME (e.g., MME portion of MME/SGW) to enable the MME to determine the mobile device has responded to the page and discontinue initiating pages to the mobile device. In still other examples, the MME may stop initiating page transmissions after an implementation dependent time, or after a certain number of paging messages have been sent. In still further examples, the policy may also indicate whether to send the paging response in a tunnel to the MME, for example, via a different RAT.

Figure 4:
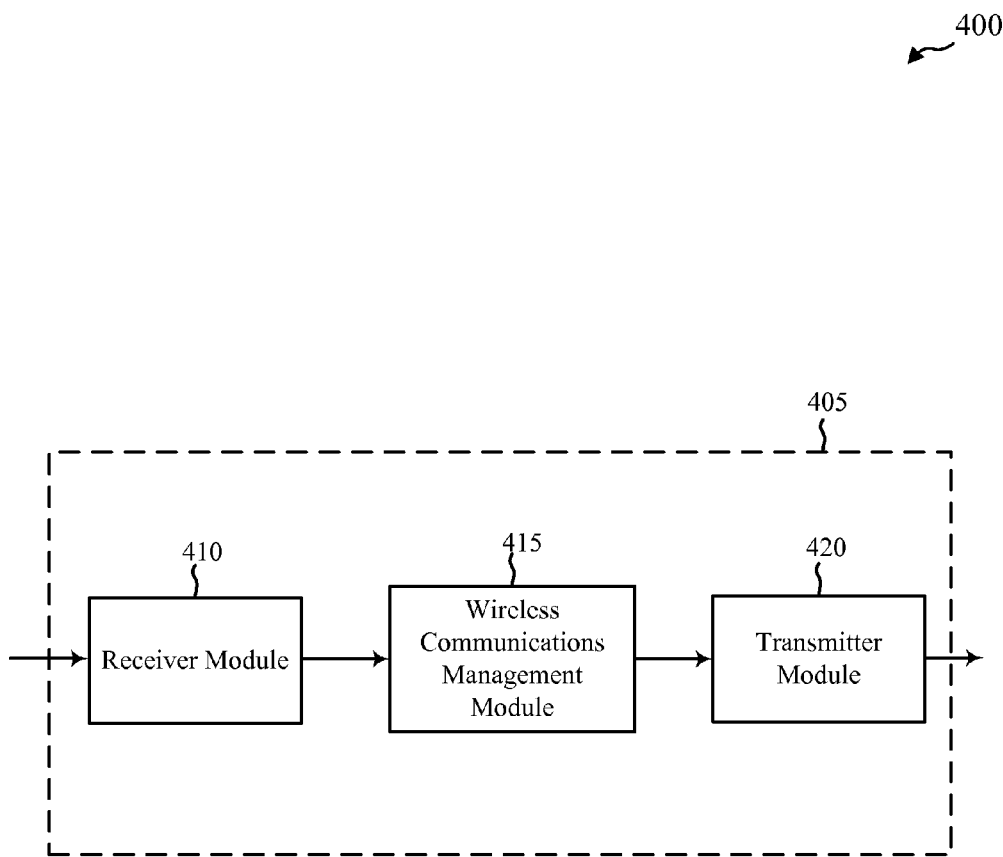
FIG. 4 shows a block diagram of an apparatus configured for use in wireless communication, in accordance with various aspects of the present disclosure.

FIG. 4 shows a block diagram 400 of an apparatus 405 or device configured for use in wireless communication, in accordance with various aspects of the present disclosure. The apparatus 405 may be an example of one or more aspects of a mobile devices 115, 215, and/or 315 described with reference to FIGS. 1, 2, and/or 3. The apparatus 405 may include a receiver module 410, a wireless communications management module 415, and/or a transmitter module 420. The apparatus 405 may also be or include a processor (not shown). Each of these modules may be in communication with each other.

The components of the apparatus 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 410 may receive information such as packets, user data, and/or control information associated with various information channels (e.g., control channels, data channels, paging channels, etc.). The receiver module 410 may be configured to receive page transmissions over one or more of the information channels, and provide information from the page, including service information and/or a service indicator such as discussed above, for example. This information may be passed on to the wireless communications management module 415, and to other components of the apparatus 405. In some examples, the receiver module 410 is configured to receive registration information for an NCPS from a base station; the receiver module 410 may be configured to receive a paging message from the NCPS via a non-cellular RAT (e.g., via a WLAN AP 235 (FIG. 2)).

The wireless communications management module 415 may be configured to perform various functions related to identifying services and/or available connections at the apparatus 405. This may include identifying active services at the apparatus 405, and it may include identifying RATs available for connection to the apparatus 405, which may be an example of the functions described below with reference to FIG. 19. In other examples, the wireless communications management module 415 may be configured to determine that the apparatus 405 is capable of receiving a paging message via a non-cellular RAT, which may be example of the functions described below with reference to FIG. 12.

The transmitter module 420 may transmit the one or more signals received from other components of the apparatus 405. The transmitter module 420 may transmit a page response, or a registration request, for example. The transmitter module 420 may also be configured to transmit a registration message with identified services and/or available connections. Additionally or alternatively, the transmitter module 420 may be configured to transmit a registration message to a network (e.g., via base station 205 (FIG. 2)). In some examples, the transmitter module 420 may be collocated with the receiver module 410 in a transceiver module.

Figure 5:
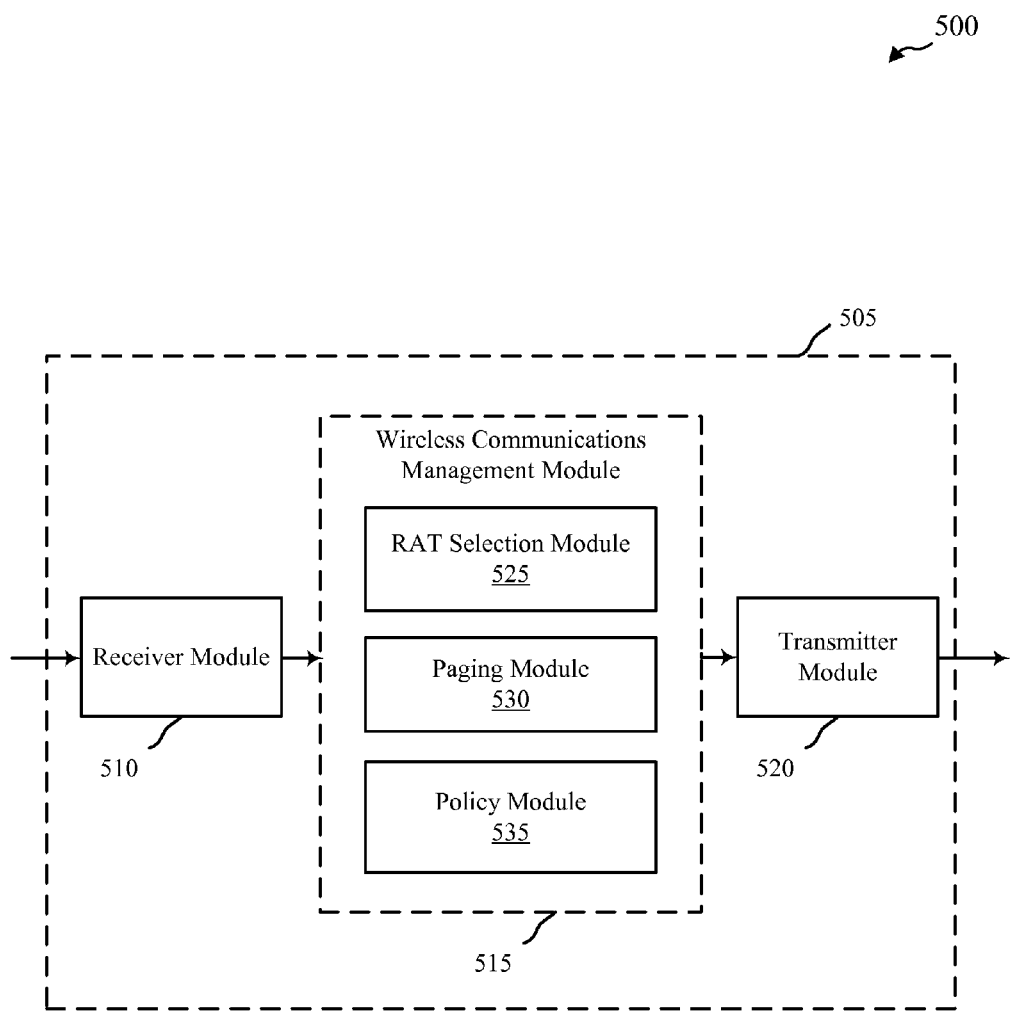
FIG. 5 shows a block diagram of an apparatus configured for use in wireless communication, in accordance with various aspects of the present disclosure.

FIG. 5 shows a block diagram 500 of an apparatus 505 configured for use in wireless communication, in accordance with various aspects of the present disclosure. The apparatus 505 may be an example of one or more aspects of a mobile devices 115, 215 and/or 315 described with reference to FIGS. 1, 2 and/or 3. The apparatus 505 may also be an example of the apparatus 405 described with reference to FIG. 4. The apparatus 505 may include a receiver module 510, a wireless communications management module 515, and/or a transmitter module 520, which may be examples of the corresponding modules of apparatus 405 of FIG. 4. The apparatus 505 may also include a processor (not shown). Each of these components may be in communication with each other. The wireless communications management module 515 may include a RAT selection module 525, a paging module 530, and a policy module 535. The receiver module 510 and the transmitter module 520 may perform the functions of the receiver module 410 and the transmitter module 420, of FIG. 4, respectively.

The RAT selection module 525, according to various examples, may determine available RATs for accessing an associated wireless communications network and may determine a page policy for accessing networks based on service information received in page transmissions, such as discussed above. Such available RATs may include, for example, one or more cellular and/or non-cellular RATs. The RAT selection module 525 may determine which of any available RATs should be accessed, and a priority of RAT access, based on a policy included in the policy module 535. In the case of communications originated from the apparatus 505, this RAT selection may be based on a service that is being originated. In cases where the access is initiated in response to a page transmission, the paging module 530 may provide information related to the page and any service or access indication, such as discussed above. In such a manner, the wireless communications management module 515 may efficiently access a network using a RAT that is selected to provide enhanced network operation.

Figure 6:
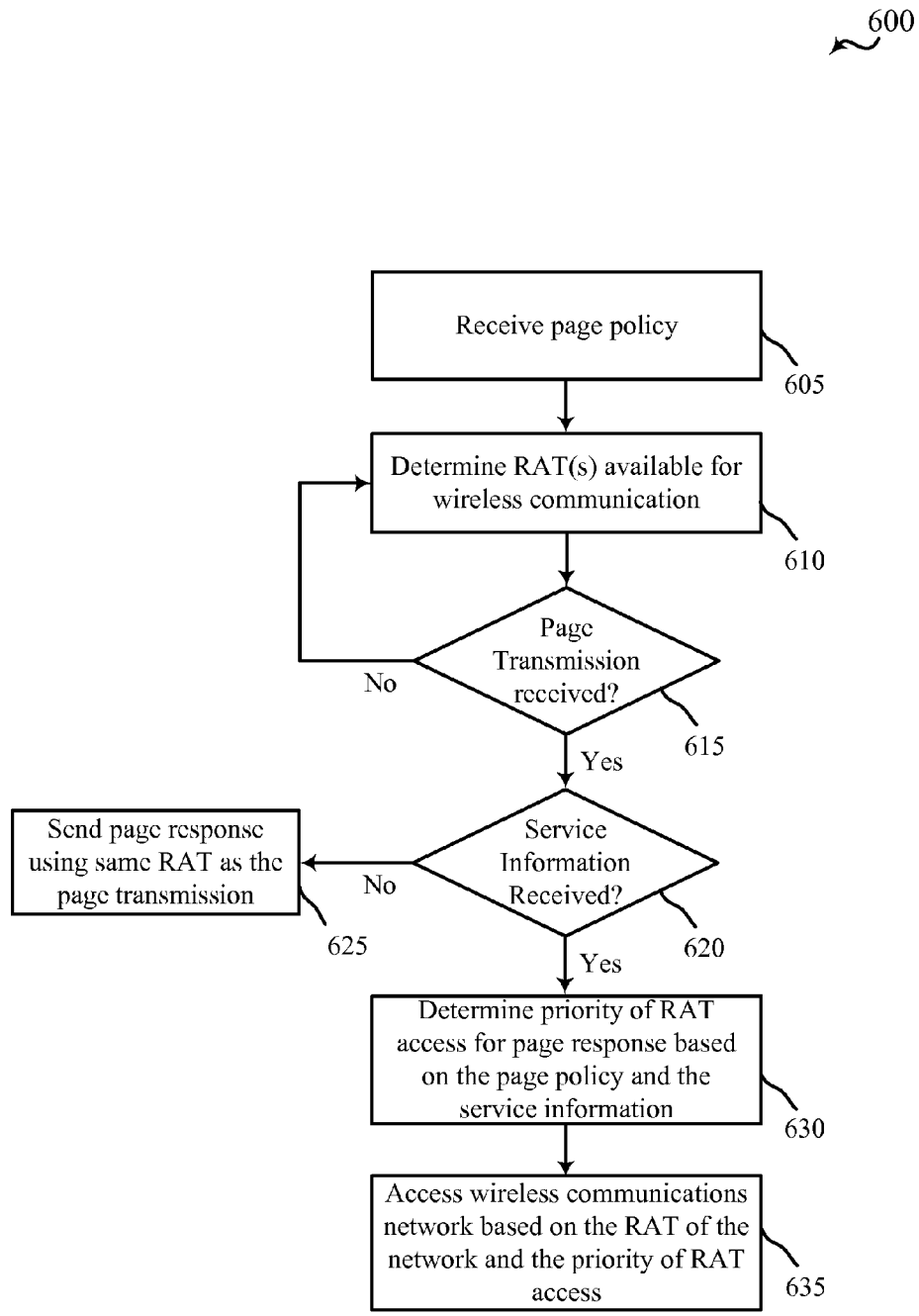
FIG. 6 shows a flowchart illustrating an example of a method for wireless communication, in accordance with various aspects of the present disclosure.

FIG. 6 shows a flowchart illustrating an example of a method 600 for wireless communication, in accordance with various aspects of the present disclosure. For clarity, the method 600 is described below with reference to aspects of one or more of the mobile devices 115, 215 and/or 315 described with reference to FIGS. 1, 2, and/or 3, and/or aspects of one or more of the apparatuses 405 and/or 505 described with reference to FIGS. 4 and/or 5. In some examples, a mobile device may execute one or more sets of codes to control the functional elements of the mobile device to perform the functions described below. Additionally or alternatively, the mobile device may perform one or more of the functions described below using special-purpose hardware.

At block 605, the mobile device may receive a page policy. As discussed above, such a page policy may include a policy for accessing RATs based on one or more characteristics of a service that is to be initiated between the mobile device and a base station or access point, for example. The page policy may include, for example, a priority of RATs to access for particular services, and may include one or more rules related to RAT access. Such rules may include, for example, time and day restrictions for accessing one or more RATs, quality of service (QoS) criteria for accessing one or more RATs for a particular service, and/or prohibited RATs for particular services, to name but a few. The page policy may be received, for example, from a base station as part of control signaling received from the base station. In some examples, the policy may be received as part of a broadcast message from the base station. In certain examples, the policy may be received in a system information block (SIB) from the base station. At block 610, the mobile device determines the RAT(s) that are available for wireless communications. Such a determination may be made, for example, by scanning frequencies associated with the different RATs and determining if a base station or access point is available for connection on.

At block 615, it is determined if a page transmission is received. Such a determination may be made, for example, by monitoring a control channel, such as a paging channel, associated with a RAT that may be used to transmit page transmissions. In some examples, the monitoring of such a control channel may be periodically performed according to established discontinuous reception (DRX) techniques. If a page is not received, the operations of block 610 are performed. If a page transmission is received, it is determined if the page transmission includes service information. As discussed above, such service information may include information related to a RAT that is to be used for network access in response to the page transmission. In certain examples, the service information may include an identifier indicating one or more services to be initiated responsive to the page transmission. The service information may include, in various examples, an index into the policy, with the policy providing an order for accessing RATs based on a RAT priority. For example, the service indicator may simply be an index that indicates a position in the order for accessing RATs.

If, at block 620, it is determined that no service information is included in the page transmission, the mobile device may transmit a page response using the same RAT as the page transmission, as indicated at block 625. The mobile device may also establish a connection with the RAT that transmitted the page response to initiate a service. If it is determined that the page transmission did include service information, the mobile device, at block 630, may determine priority of RAT access for a page response based on the page policy and the service information. In some examples, the determination may be based at least in part on an indication of one or more services to be initiated responsive to the page transmission. In certain examples, the priority of RAT access may be determined based at least in part on a quality of service requirement of the one or more services and/or current channel conditions associated with the one or more RATs. At block 635, the mobile device may access a wireless communications network based on the RAT of the network and the priority of RAT access. In some examples, the RAT used for the page response and subsequent network access may be a different RAT than was used to transmit the page transmission.

Thus, the method 600 may provide for wireless communication access based on information in a page transmission. It should be noted that the method 600 is just one implementation and that the operations of the method 600 may be rearranged or otherwise modified such that other implementations are possible.

Figure 7:
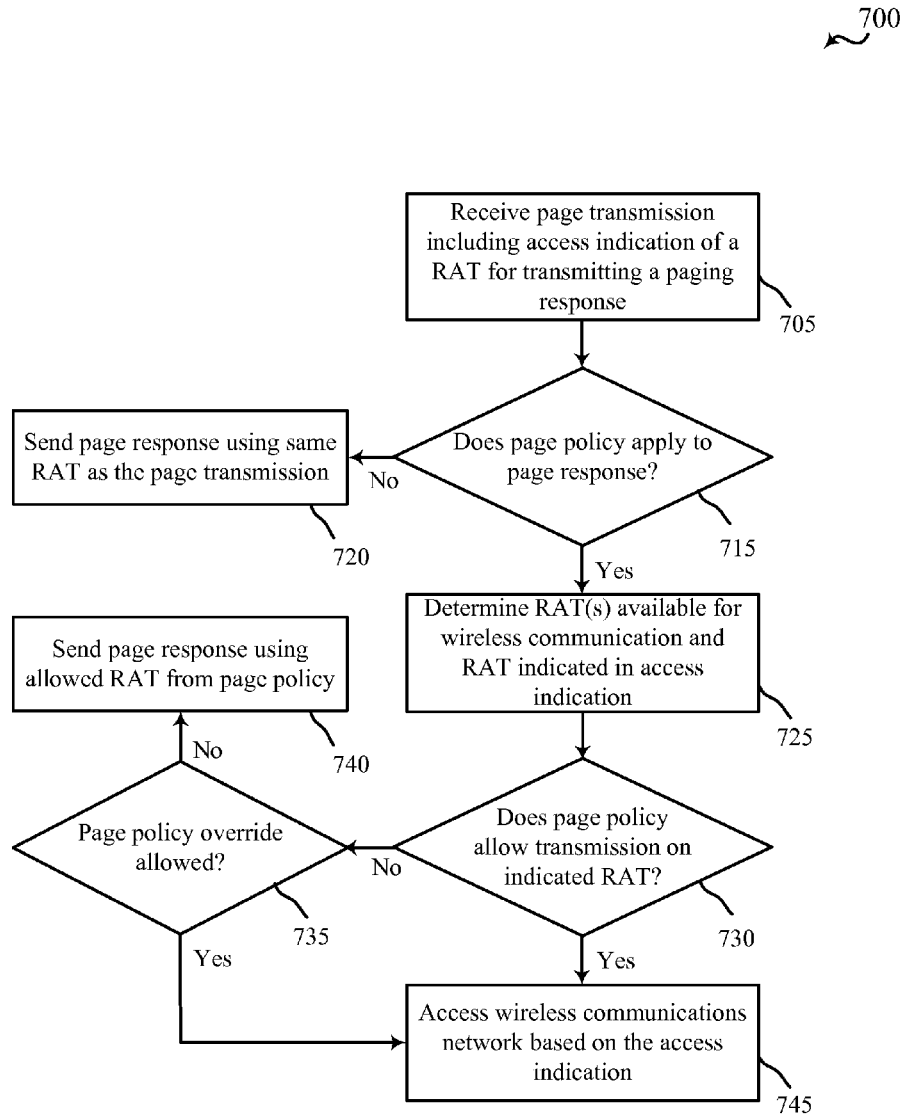
FIG. 7 shows a flowchart illustrating an example of a method for wireless communication, in accordance with various aspects of the present disclosure.

FIG. 7 shows a flowchart illustrating an example of a method 700 for wireless communication, in accordance with various aspects of the present disclosure. For clarity, the method 700 is described below with reference to aspects of one or more of the mobile devices 115, 215 and/or 315 described with reference to FIGS. 1, 2, and/or 3, and/or aspects of one or more of the apparatuses 405 and/or 505 described with reference to FIGS. 4 and/or 5. In some examples, a mobile device may execute one or more sets of codes to control the functional elements of the mobile device to perform the functions described below. Additionally or alternatively, the mobile device may perform one or more of the functions described below using special-purpose hardware.

At block 705, the mobile device may receive a page transmission including an access indication of a RAT for transmitting a paging response. In such an example, the access indication of the page transmission may identify the RAT for use in the page response. The RAT may be identified, for example, through a number of bits included in the page transmission that are mapped to particular RATs, or to particular frequencies that may be associated with one or more RAT(s). In some examples, the access indication may include a service identifier indicating one or more services to be initiated responsive to the page transmission, which may be mapped to different preferred RAT(s) in a page policy. In still further examples, the access indication may include a network identifier that identifies a network that is to be accessed responsive to the page transmission.

At block 715, it is determined by the mobile device whether a page policy applies to the page response. If a page policy does not apply to the page response, a page response may be transmitted using the same RAT as the page transmission, as indicated at block 720. If a page policy does apply to the page response, the mobile device, at block 725, may determine RAT(s) available for wireless communication, and the RAT indicated in access indication. At block 730, it is determined whether the page policy provides for transmission of the page response on the RAT indicated in the page transmission. For example, a page policy may indicate a first RAT is to be used for a page response under certain conditions (e.g., day and time rules, QoS rules) that is different from the RAT indicated in the page transmission.

If the page policy does not allow transmission on the RAT indicated in the page transmission, it is determined, at block 735, whether the page policy allows the access indication of the page transmission to override the page policy. If the page policy does not allow override, the page transmission is transmitted using the RAT from the page policy, as indicated at block 740. In some examples, the access indication may include an indication to override the page policy, which may be used to determine whether override is allowed. If, at block 730 it is determined that the page policy allows for page response transmission using the indicated RAT, or if at block 735 it is allowed that the page policy allows the access indication to override a RAT indicated by the page policy, the mobile device may access a wireless communications network having the RAT as indicated in the access indication, according to block 745. Thus, the access indication may be used to determine which of the available RATs, and associated networks, is to be used to transmit the paging response based at least in part on the page policy for transmitting paging responses.

Thus, the method 700 may provide for wireless communication access based on information in a page transmission. It should be noted that the method 700 is just one implementation and that the operations of the method 700 may be rearranged or otherwise modified such that other implementations are possible.

Figure 8:
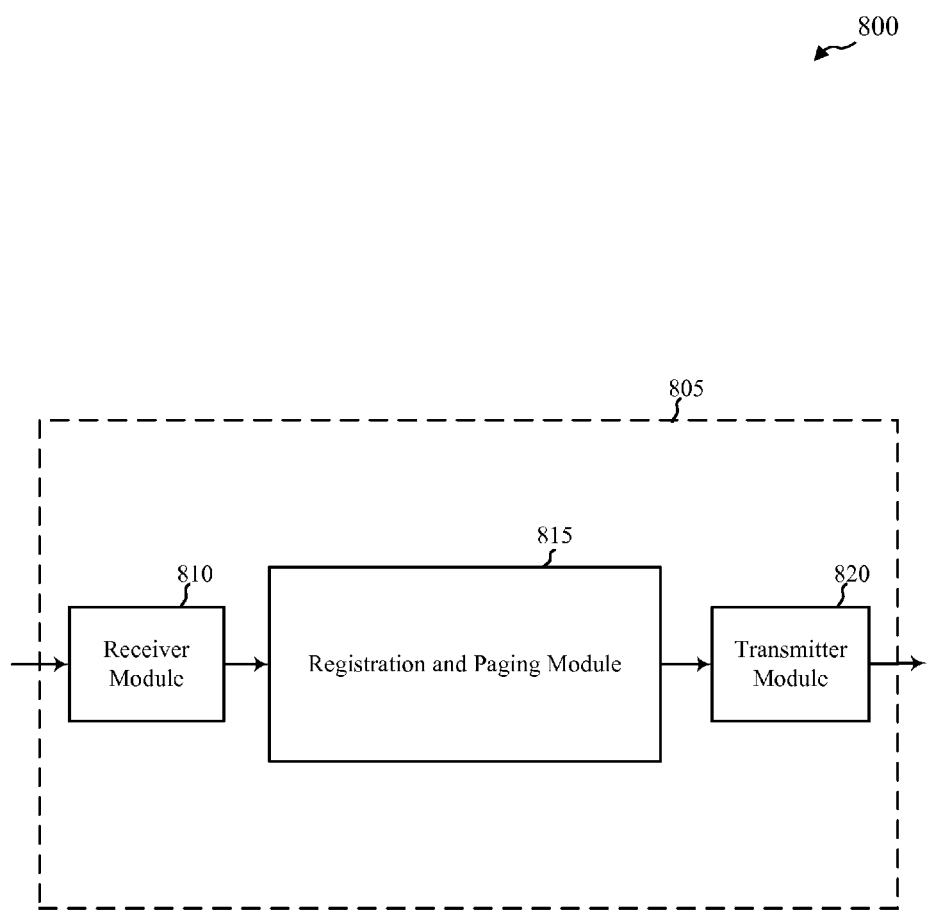
FIG. 8 shows a block diagram of an apparatus configured for use in wireless communication, in accordance with various aspects of the present disclosure.

FIG. 8 shows a block diagram 800 of an apparatus 805 configured for use in wireless communication, in accordance with various aspects of the present disclosure. In some examples, the apparatus 805 may be an example of aspects of one or more of the base stations 105, 205, and/or 305, or one or more of the WLAN APs 135, 235, and/or 335 described with reference to FIGS. 1, 2, and/or 3. In some examples, the apparatus 805 may be part of or include an LTE/LTE-A base station. In other examples, the apparatus 805 may be a WLAN access point. In other cases, the apparatus 805 may illustrate aspects of the core network 130 and/or 230, described with reference to FIGS. 1 and 2. For instance, the apparatus 805 may be an example of one or more aspects of an MME/SGW node 240 of FIG. 2. Or, the apparatus 805 may illustrate aspects of the NCPS 260 of FIG. 2. The apparatus 805 may also be a processor. The apparatus 805 may include a receiver module 810, a registration and paging module 815, and/or a transmitter module 820. Each of these modules may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 810 may include at least one radio frequency (RF) receiver, such as an RF receiver operable to receive transmissions from one or more mobile devices, such as, for example, transmissions for registering the mobile device. In other examples, the receiver module 810, additionally or alternatively, may include a network receiver module that may receive network communication, such as a paging message from an MME, for example. In some examples, the receiver module 810 may be an input device configured to receive packetized communications, which may include a registration message from mobile device 115 and/or 215 of FIGS. 1 and/or 2. Such communications may be from a base station 105 (FIG. 1) or 205 (FIG. 2), and may be wired or wireless communications. The receiver module 810 may be used to receive various types of data and/or control signals (i.e., transmissions) over one or more communication links and/or backhaul links of a wireless communication system, such as one or more communication links of the wireless communications systems 100, 200, and/or 300 described with reference to FIGS. 1, 2, and/or 3, and/or one or more transmissions from apparatuses 405 and/or 505 described with reference to FIGS. 4 and/or 5.

In some examples, the transmitter module 820 may include at least one RF transmitter, such as at least one RF transmitter operable to transmit page transmissions, and other wireless transmissions, to one or more mobile devices. In certain examples, the transmitter module 820 may additionally or alternatively include a network transmitter that may transmit network communications such as, for example, communications to an MME and/or SGW. In some cases, the transmitter module 820 is an output device configured to send packetized communications, which may include a response message to a mobile device 115 and/or 215 of FIGS. 1 and/or 2. Such communications may be via a base station 105 (FIG. 1) or 205 (FIG. 2), and may be wired or wireless communications. The transmitter module 820 may be used to transmit various types of data and/or control signals (i.e., transmissions) over one or more communication links of a wireless communication system, such as one or more communication links and/or backhaul links of the wireless communications system 100, 200, and/or 300 described with reference to FIGS. 1, 2, and/or 3, and/or may transmit communications to one or more of the apparatuses 405 and/or 505 described in FIGS. 4 and/or 5.

In some examples, the registration and paging module 815 according to various examples, may determine a service that is to be initiated with a mobile device, and may determine a service indication that is to be transmitted to a mobile device as part of a page transmission, in a manner such as described above. In some examples, the registration and paging module 815 may determine RATs that may be suitable for accessing an associated wireless communications network responsive to a service to be initiated from the page. The registration and paging module 815 may, in some examples, determine a page policy for accessing networks, and transmit the page policy to mobile devices. Such a page policy may be transmitted, for example, in a broadcast message, such as a SIB. Such available RATs may include, for example, one or more cellular and/or non-cellular RATs. In such a manner, the registration and paging module 815 may provide for enhanced efficiency when mobile devices initiate wireless communications responsive to a page transmission.

In some examples, and as described below with reference to FIG. 21, the registration and paging module 815 may be configured to perform various functions related to determining a registration procedure based on registration messages received by the apparatus 805. This may include determining a paging DRX cycle, a TA for which a mobile device should register, a number of cells for which a mobile device should register, or the like.

Additionally or alternatively, the registration and paging module 815 may be configured to register a mobile device with a network (e.g., a cellular network), as described below with reference to FIG. 14. In other examples, and as described below with refer to FIG. 16, the registration and paging module 815 may be configured to control non-cellular paging of a mobile device.

Figure 9:
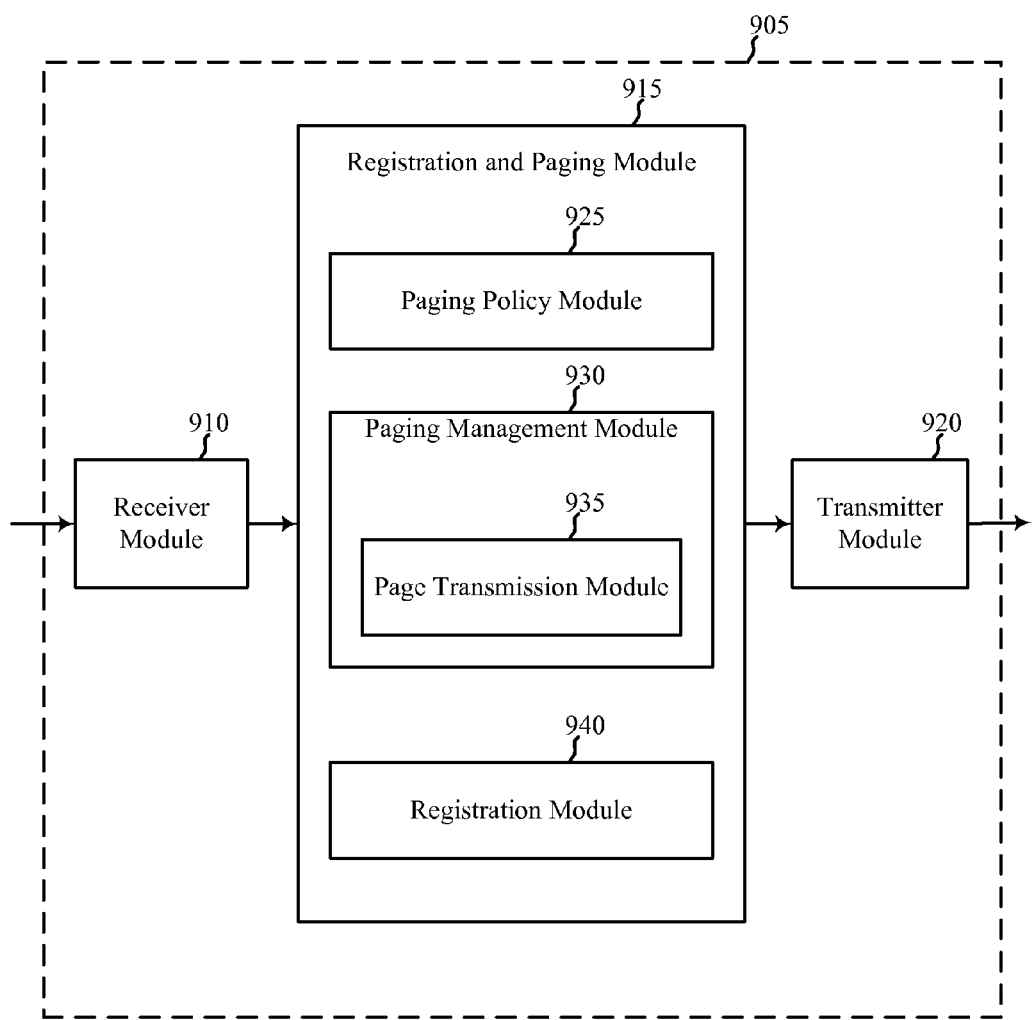
FIG. 9 shows a block diagram of an apparatus configured for use in wireless communication, in accordance with various aspects of the present disclosure.

FIG. 9 shows a block diagram 900 of an apparatus 905 configured for use in wireless communication, in accordance with various aspects of the present disclosure. In some examples, the apparatus 905 may be an example of aspects of one or more of the base stations 105, 205, and/or 305, or one or more of the WLAN APs 135, 235, and/or 335 described with reference to FIGS. 1, 2, and/or 3, and/or an example of aspects of the apparatus 805 described with reference to FIG. 8. In some examples, the apparatus 905 may be part of or include an LTE/LTE-A base station. In other examples, the apparatus 905 may be a WLAN access point. The apparatus 905 may also be a processor. The apparatus 905 may include a receiver module 910, a registration and paging module 915, and/or a transmitter module 920. Each of these modules may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 910 may be an example of one or more aspects of the receiver module 810 described with reference to FIG. 8. In some examples, the receiver module 910 may include at least one radio frequency (RF) receiver, such as at least one RF receiver, and/or one or more network communications receiver modules that may receive network transmissions from and MME and/or SGW for example. The receiver module 910 may be used to receive various types of data and/or control signals (i.e., transmissions) over one or more communication links of a wireless communication system, such as one or more communication links of the wireless communications system 100, 200, and/or 300 described with reference to FIGS. 1, 2, and/or 3 and/or may receive communications from one or more of the apparatuses 405 and/or 505 described in FIGS. 4 and/or 5.

In some examples, the transmitter module 920 may be an example of one or more aspects of the transmitter module 820 described with reference to FIG. 8. In some examples, the transmitter module 920 may include at least one RF transmitter, such as at least one RF transmitter operable to transmit RF communications to one or more mobile devices. The transmitter module 920 may be used to transmit various types of data and/or control signals (i.e., transmissions) over one or more communication links of a wireless communications system, such as one or more communication links of the wireless communications system 100, 200, and/or 300 described with reference to FIGS. 1, 2, and/or 3, and/or may transmit communications to one or more of the apparatuses 405 and/or 505 described in FIGS. 4 and/or 5.

The registration and paging module 915 may be an example of the registration and paging module 815 of FIG. 8, for example. The registration and paging module 915, in some examples, may include a paging policy module 925, a paging management module 930 that may include a page transmission module 935, and a registration module 940. The paging policy module 925 may, in various examples, determine paging policies that may be transmitted to one or more mobile devices, in a manner such as discussed above. In some examples, a paging policy may be transmitted to mobile devices using a broadcast message, such as a SIB transmission. The paging management module 930 may perform paging management functions for the apparatus 905, in a manner similar as discussed above. For example, the paging management module 930 may receive page messages from an MME, and determine that a particular mobile device is to be paged. The paging management module 930 may, for example, receive a downlink data notification message and determine a service type that is to be initiated with the mobile device responsive to the page transmission. The paging management module 930 may determine a RAT that is suitable for the service, and may generate service information to be included in a page transmission that indicates a RAT to be accessed from the page transmission. The page transmission module 935 may initiate the transmission of the page request, such as through the transmitter module 920. In some examples, the service information may include information such as discussed above. For example, the service information may include an index into a policy defining which of a plurality of RATs to use for wireless communication. The page policy may provide an order for accessing RATs based on a RAT priority, and the index may identify a location in the order as a starting point for selecting a RAT for use in the paging response.

Figure 10:
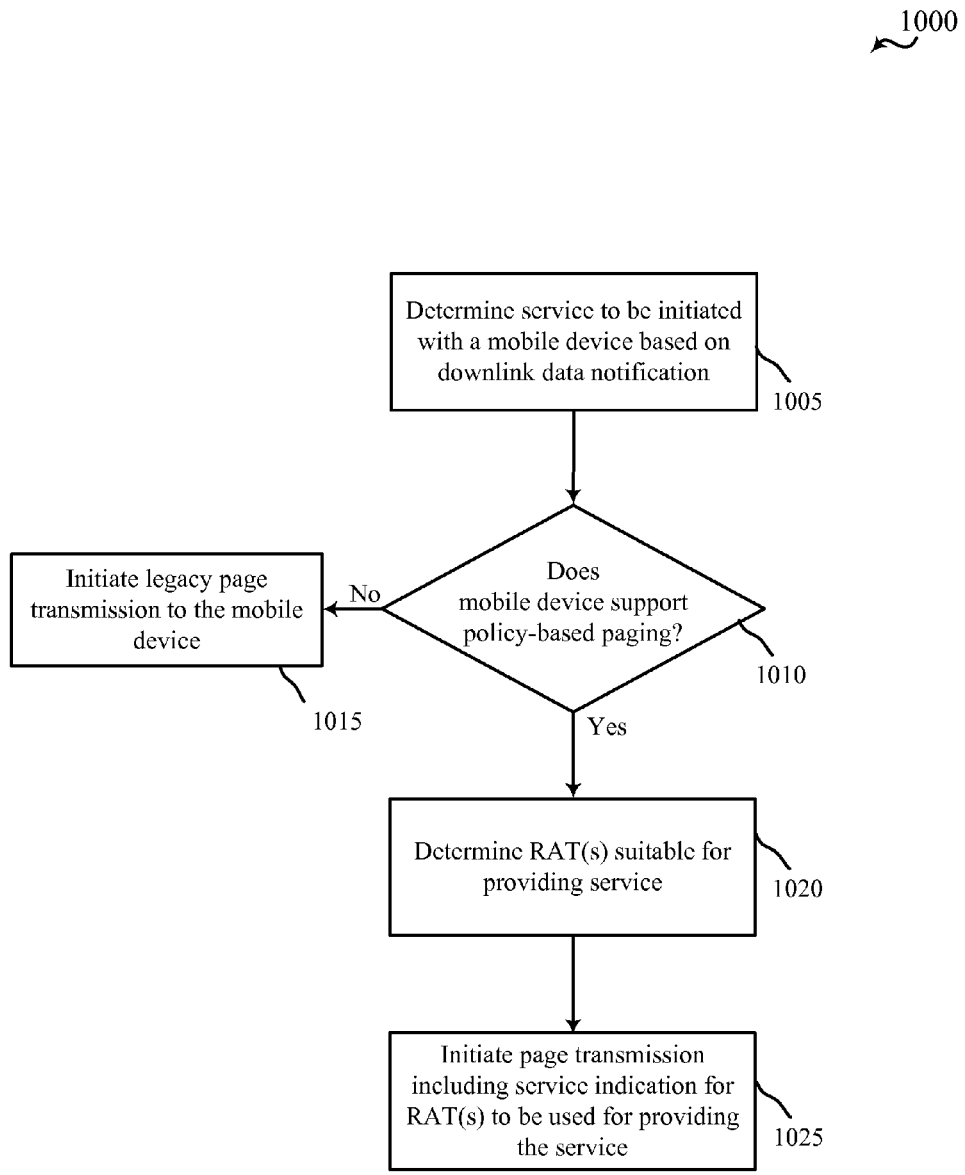
FIG. 10 shows a flowchart illustrating an example of a method for wireless communication, in accordance with various aspects of the present disclosure.

FIG. 10 shows a flowchart illustrating an example of a method 1000 for wireless communication, in accordance with various aspects of the present disclosure. For clarity, the method 1000 is described below with reference to aspects of one or more of the base stations 105, 205, 305, or 335, or WLAN APs 135, 235, 335 described with reference to FIGS. 1, 2, and/or 3, and/or aspects of one or more of the apparatuses 805 and/or 905 described with reference to FIGS. 8 and/or 9. In some examples, a base station or access point may execute one or more sets of codes to control the functional elements of the base station or access point to perform the functions described below. Additionally or alternatively, the base station or access point may perform one or more of the functions described below using special-purpose hardware.

At block 1005, the base station may determine a service to be initiated with a mobile device based on a downlink data notification message. Such a downlink data notification message may be received, for example, from an MME or SGW. At block 1010, it is determined whether the mobile device supports policy-based paging. In some examples, when a mobile device registers with the base station or access point, it may provide an indication of capability to receive policy-based paging. If it is determined that the mobile device does not support policy-based paging, a legacy page is initiated to the mobile device, as indicated at block 1015.

If the mobile device does support policy-based paging, at block 1020, the base station or access point may determine one or more RAT(s) that are suitable for providing the service. The page policy may include, for example, a priority of RATs for particular services, and may include one or more rules related to RAT access. Such rules may include, for example, time and day restrictions for accessing one or more RATs, quality of service (QoS) criteria for accessing one or more RATs for a particular service, and/or prohibited RATs for particular services, to name but a few. This information may be used to determine a service indication to be transmitted with the page transmission, in a manner similar as discussed above.

At block 1025, a page transmission is initiated that includes a service indication for one or more RAT(s) to be used for providing the service. As discussed above, such service information may include information related to a RAT that is to be used for network access in response to the page transmission. In certain examples, the service information may include an identifier indicating one or more services to be initiated responsive to the page transmission. The service information may include, in various examples, an index into the policy, with the policy providing an order for accessing RATs based on a RAT priority. For example, the service indicator may simply be an index that indicates a position in the order for accessing RATs.

Thus, the method 1000 may provide for paging in a wireless communication system based on information related to a service to be initiated and based on capability of a mobile device to receive policy-based page transmissions. It should be noted that the method 1000 is just one implementation and that the operations of the method 1000 may be rearranged or otherwise modified such that other implementations are possible.

Figure 11:
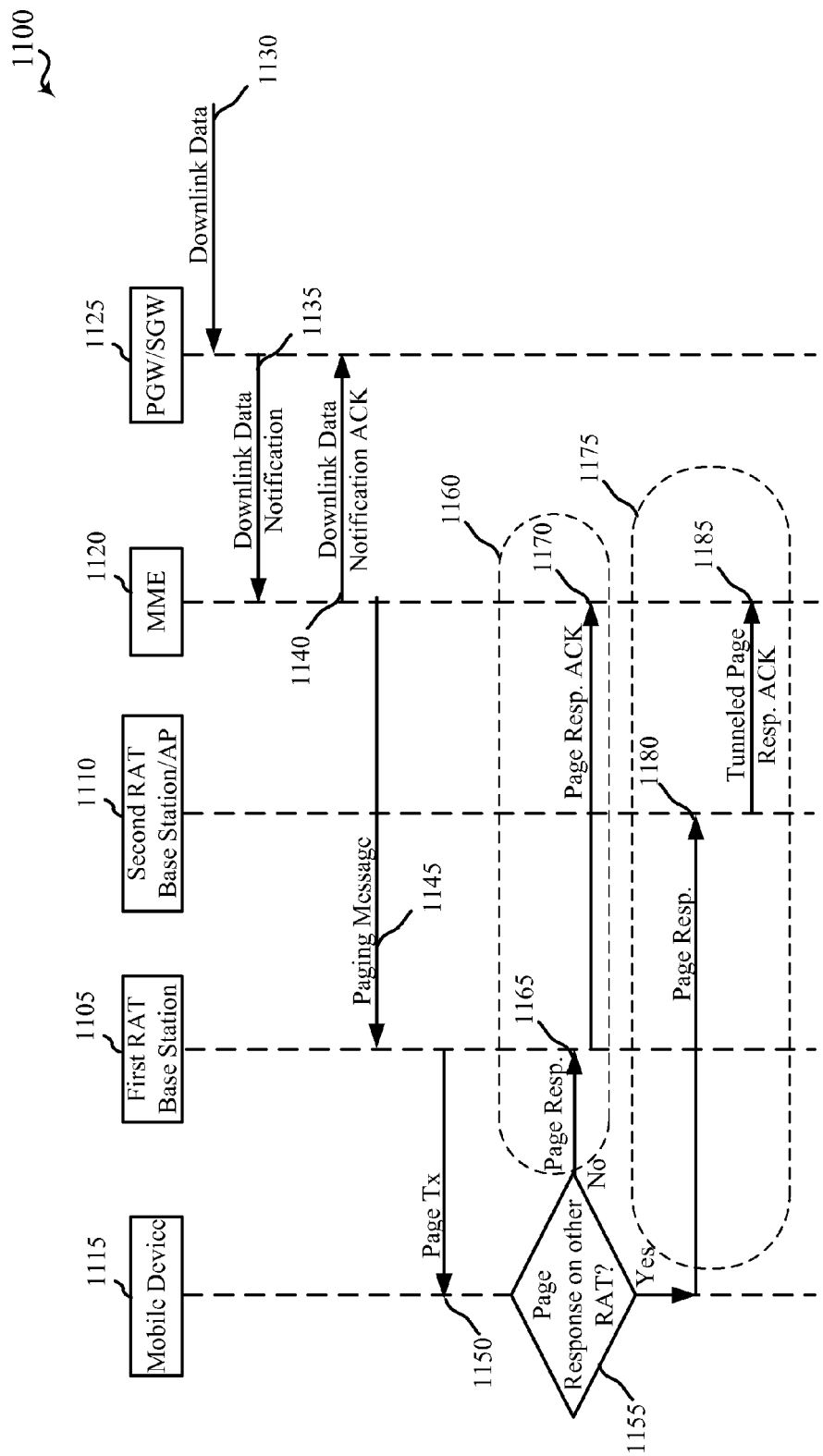
FIG. 11 shows a message flow diagram illustrating an example of a page transmission and paging response call flow for wireless communication, in accordance with various aspects of the present disclosure.

FIG. 11 shows a message flow diagram illustrating an example of a page transmission and paging response call flow 1100 of wireless communication in accordance with various aspects of the present disclosure. The page transmission and paging response call flow 1100 includes communications between a mobile device 1115, a first RAT base station 1105, a second RAT base station/AP 1110, an MME 1120, and a PGW/SGW 1125, which may be examples of the mobile devices 115, 215 and/or 315, base stations 105, 205, and/or 305, WLAN APs 135, and/or 235, MME/SGW nodes 240, and PGW/SGW node 245 described with reference to the preceding Figures. Additionally, is some examples, the page transmission and paging response call flow 1100 illustrates communication between apparatuses 405 and/or 505 and apparatuses 805 and 905 of FIGS. 4, 5, 8, and/or 9.

As discussed above, a particular RAT to be used for a particular type of service may be selected to provide enhanced network efficiency. In some examples, paging may be triggered when downlink data for a mobile device 1130 arrives at PGW/SGW 1125. The PGW/SGW may generate a downlink data notification message 1135 that is provided to MME 1120. When the MME 1120 receives a downlink data notification message 1135, the MME may transmit a downlink data notification acknowledgment 1140 that is provided to the PGW/SGW 1125. The MME 1120 may generate a paging message 1145 that is provided to the first RAT base station 1105. In some examples, service information is included in the downlink data notification message 1135, and the MME 1120 may include this information in the paging message 1145. The first RAT base station 1105 may generate a page transmission 1150 that is transmitted to mobile device 1115. The page transmission may include service information, in a manner similarly as discussed above.

The mobile device 1115 may receive the page transmission, and determine that the page transmission includes service information. The mobile device 1115 may determine that a paging policy applies to the page message, and transmit a page response to initiate wireless communication using a RAT according to the paging policy, in a manner such as discussed above. The mobile device 1115 may determine, at block 1155, whether a different RAT is to be used for the page response than was used for the page transmission. If a different RAT is not to be used for the page response, the mobile device 1115 initiates process 1160 and transmits the page response 1165 to the first RAT base station 1105. The first RAT base station 1105 may then provide a page response acknowledgment 1170 to the MME 1120.

If the mobile device 1115 determines that a different RAT is to be used for the page response, the mobile device 1115 initiates process 1175 and transmits the page response 1180 to second RAT base station/AP 1110. The second RAT base station/AP 1110 may then provide a tunneled page response acknowledgment 1185 to the MME 1120. The page response acknowledgment may be tunneled to the MME through, for example, a packet data network such as PDN 250 of FIG. 2.

Figure 12:
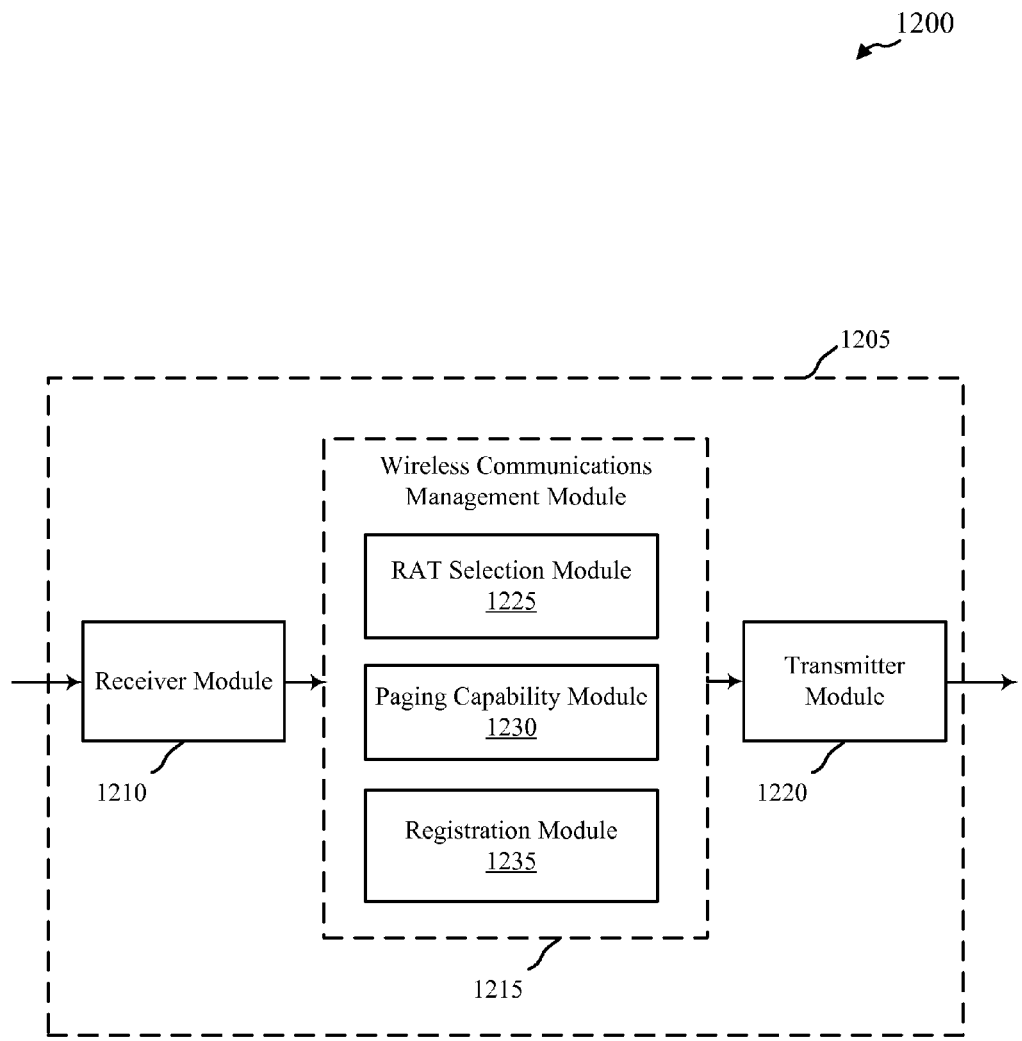
FIG. 12 shows a block diagram of an apparatus configured for use in wireless communication, in accordance with various aspects of the present disclosure.

FIG. 12 shows a block diagram 1200 of an apparatus 1205 configured for use in wireless communication, in accordance with various aspects of the present disclosure. The apparatus 1205 may be an example of one or more aspects of a mobile devices 115, 215 and/or 315 described with reference to FIGS. 1, 2 and/or 3. The apparatus 1205 may also be an example of the apparatus 405 described with reference to FIG. 4. The apparatus 1205 may include a receiver module 1210, a wireless communications management module 1215, and/or a transmitter module 1220, which may be examples of the corresponding modules of apparatus 405 of FIG. 4. The apparatus 1205 may also include a processor (not shown). Each of these components may be in communication with each other. The wireless communications management module 1215 may include a RAT selection module 1225, a paging capability module 1230, and/or registration module 1235.

The RAT selection module 1225 may be configured to select a RAT with which the apparatus 1205 communicates. The RAT selection module 1225 may thus facilitate, in conjunction with the receiver module 1210 and the transmitter module 1220, communication over multiple different RATs. In some cases, the RAT selection module 1225 is configured to deactivate a cellular radio of the apparatus 1205. The deactivating may include deactivating the cellular radio after transmitting, via the transmitter module 1220, the registration message to the network. In some examples, the RAT selection module 1225, in conjunction with the receiver module 1210, may be configured to receive a an acknowledgement (ACK) from the network in response to the registration message; and deactivating the cellular radio may be based upon receiving the ACK. Or, in some cases, deactivating occurs upon a connection release of a cellular connection with the network.

In other examples, the receiver module 1210 may be configured to receive a message from the network including an indication to deactivate the cellular ratio, or it may be configured to receive an indication that the network will refrain from paging via the cellular radio. In either example, the RAT selection module 1225 may be configured to deactivate the cellular radio upon receiving such an indication.

The paging capability module 1230 may be configured to determine that the apparatus 1205 is capable of receiving a paging message via a non-cellular RAT. Additionally, the paging capability module 1230 may, in conjunction with other modules, facilitate non-cellular paging. For instance, the paging capability module 1230, in conjunction with the transmitter module 1220, may be configured to transmit a registration message, including an indication that the apparatus 1205 is capable of receiving a paging message via a non-cellular RAT. The paging capability module 1230, with the receiver module 1210, may also be configured to receive a paging message from the NCPS via a non-cellular RAT.

The indication that the apparatus 1205 is capable of receiving paging via a non-cellular RAT may include an IP address and/or a port number at which the apparatus 1205 can receive a page. In some cases, the registration message includes mobility information, which may include at least one of a description of the mobility status of the apparatus 1205 or a prediction of a time duration for non-cellular RAT coverage.

In some examples, the paging message includes a request for the apparatus 1205 to monitor a cellular paging channel of the network. The paging message may also include identities of cellular base stations of the network or corresponding locations at which the cell paging channel will be broadcast.

The paging capability module 1230, in conjunction with the transmitter module 1220 and the receiver module 1210, may be configured to transmit an update message to the network, which may include a confirmation that the apparatus 1205 is capable of receiving a paging message via the non-cellular RAT; and the combination of modules may be configured to receive a notification message from the non-cellular RAT that the apparatus 1205 is capable of receiving a paging message via the non-cellular RAT. In some examples, transmitting the update message may include sending the update message to the network via the non-cellular RAT, and thus via the NCPS. The update message and/or notification message may be in response to, for instance, timers set to trigger a reactivation of a cellular radio.

The paging capability module 1230 may also be configured to detect a loss or impending loss of the capability of the apparatus 1205 to receive a paging message via the non-cellular network. The transmitter module 1220 my thus be configured to transmit a notification message that the mobile device is unable to receive a paging message via the non-cellular RAT.

The registration module 1235 may be configured to register the mobile device with an NCPS. The paging capability module 1230 may be configured to determine that the mobile device is capable of receiving a paging message via a non-cellular RAT based on registering with the NCPS. In some examples, the registration module 1235, in conjunction with the receiver module 1210, is configured to receive registration information for an NCPS from the network. The registration information for the NCPS may include an IP address and/or a uniform resource locator (URL) of the NCPS.

Figure 13:
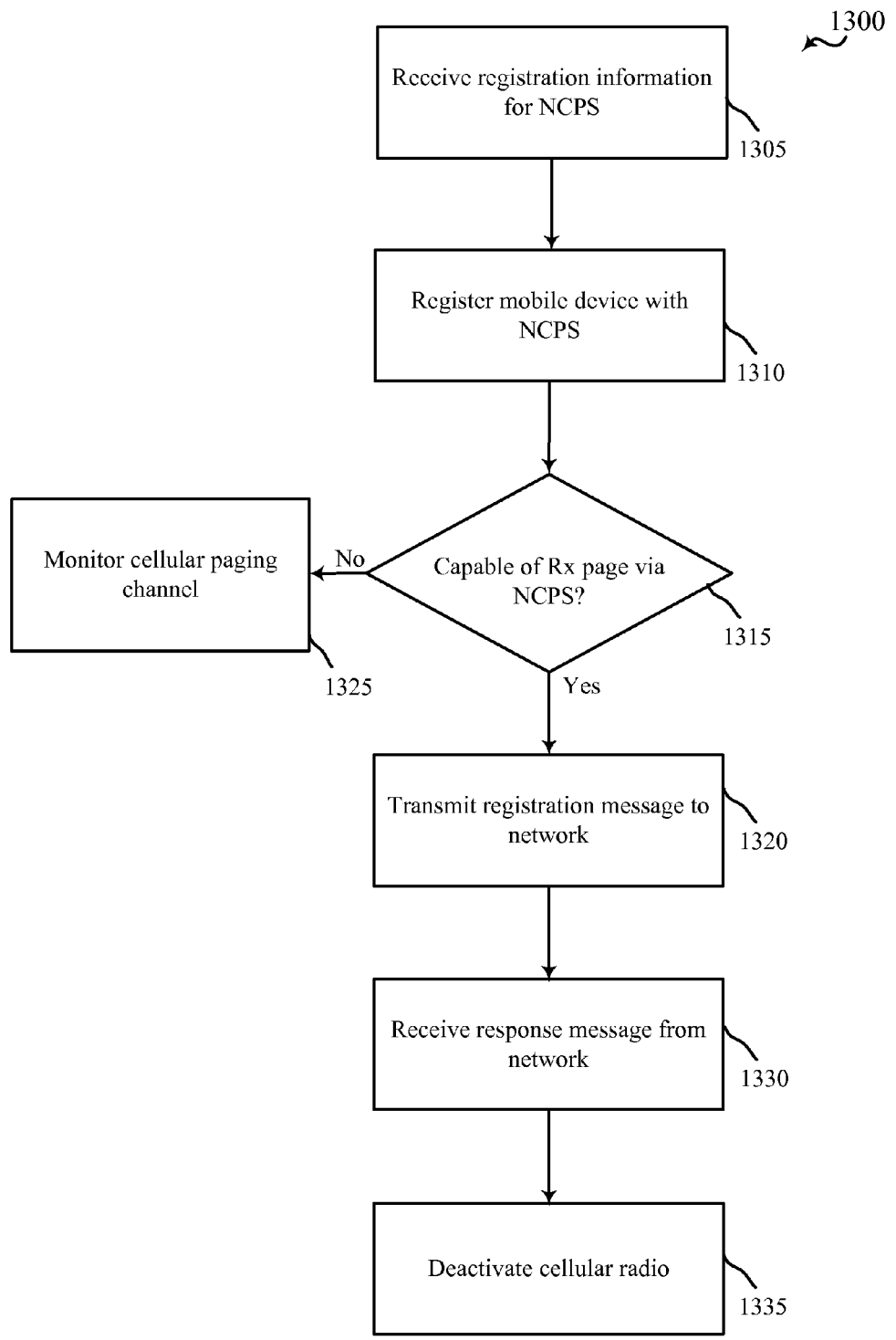
FIG. 13 shows a flowchart illustrating an example of a method for wireless communication, in accordance with various aspects of the present disclosure.

FIG. 13 shows a flowchart illustrating an example of a method 1300 for wireless communication, which may be implemented by the mobile devices 115 and/or 215 of FIGS. 1 and/or 2, and/or the apparatus 1205 of FIG. 12. By way of example, the method 1300 is described with reference to the apparatus 1205. At block 1305, the apparatus 1205 may receive registration information for an NCPS. The registration information by may be receive via the receiver module 1210 (FIG. 12) from a base station 105 (FIG. 1) or 205 (FIG. 2).

At block 1310, the apparatus 1205 may register with the NCPS. The operations of block 1310 may be performed by the registration module 1235 of FIG. 12.

At block 1315, the apparatus 1205 may determine whether it is capable of receiving a paging message from the NCPS via a non-cellular RAT. The operations of block 1315 may be performed by the paging capability module 1230. If the apparatus 1205 is capable of receiving non-cellular paging, the apparatus 1205 may, at block 1320, transmit a registration message to the network indicating as much. But if the apparatus 1205 is not capable of receiving non-cellular paging, it may, at block 1325, monitor a cellular paging channel according to other paging protocol. The operations of block 1320 may be performed by the transmitter module 1220; and the operations of block 1325 may be performed by the receiver module 1210.

At block 1330, the apparatus 1205 may receive a response message from the network, as discussed above. The apparatus 1205 may thus, at block 1335, deactivate a cellular radio. The operations of block 1330 may be performed by the receiver module 1210; and the operations of block 1335 may be performed by the RAT selection module 1225.

Figure 14:
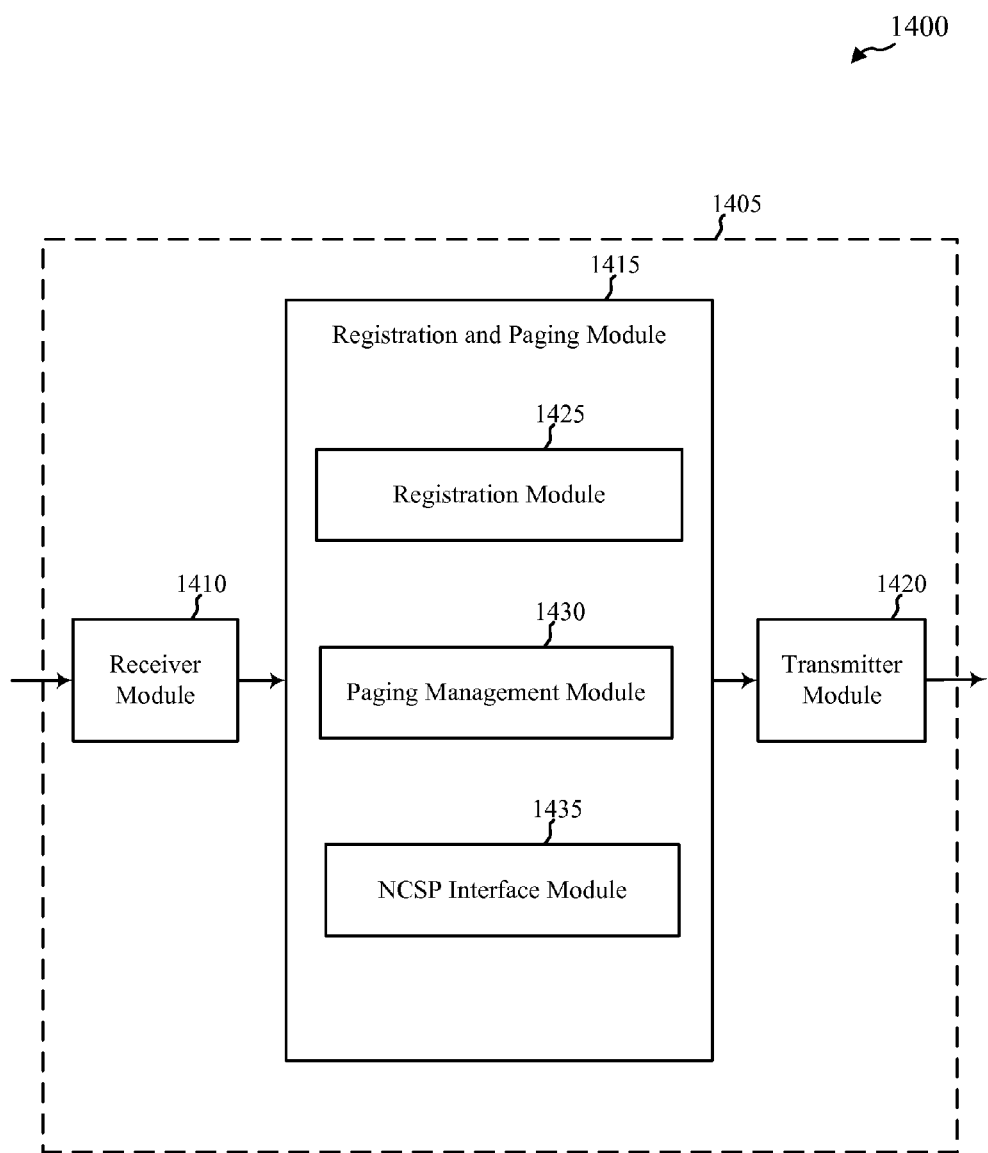
FIG. 14 shows a block diagram of an apparatus configured for use in wireless communication, in accordance with various aspects of the present disclosure.

FIG. 14 shows a block diagram 1400 of an apparatus 1405 configured for use in wireless communication, in accordance with various aspects of the present disclosure. In some examples, the apparatus 1405 may be an example of aspects of one or more of the base stations 105, 205, and/or 305 described with reference to FIGS. 1, 2, and/or 3, and/or an example of aspects of the apparatus 805 described with reference to FIG. 8. In some examples, the apparatus 1405 may be part of or include an LTE/LTE-A base station. In other cases, the apparatus 1405 may illustrate aspects of the core network 130 and/or 230, described with reference to FIGS. 1 and/or 2. For instance, the apparatus 1405 may be an example of one or more aspects of an MME/SGW node 240 of FIG. 2. The apparatus 1405 may also be a processor. The apparatus 1405 may include a receiver module 1410, a registration and paging module 1415, and/or a transmitter module 1420. Each of these modules may be in communication with each other. The registration and paging module 1415 may include a registration module 1425, a paging management module 1430, and/or an NCPS interface module 1435.

The registration module 1425, in conjunction with the receiver module 1410, may be configured to receive a registration message from a mobile device. The registration message may include an indication that the mobile device is capable of receiving a paging message via a non-cellular RAT. The indication may include an IP address and/or a port number at which the mobile device can receive a page. In some examples, the registration message includes mobility information, which may include a mobility status of a mobile device and/or a predication of a time during for non-cellular RAT coverage. The registration module 1425 may also be configured to reject registration of a mobile device. A rejection may be based, for instance, on mobility information received in a registration message.

The registration module 1425 may also be configured to register the mobile device with the network. In some examples, the registration module 1425, in conjunction with the transmitter module 1420, is configured to send an ACK message from the apparatus 1405 to a mobile device to confirm that the device is registered as being capable of receiving a paging message via the non-cellular RAT. Additionally or alternatively, the registration module 1425, in conjunction with the transmitter module 1420, may be configured to send a message from the apparatus 1405 to a mobile device requesting the mobile device to confirm that the device is capable of receiving a paging message via a non-cellular RAT.

In still other examples, the registration module 1425, in conjunction with the receiver module 1410 and/or the NCPS interface module 1435, may be configured to receive registration information from the NCPS. The registration module 1425, in conjunction with the transmitter module 1420, may also be configured to transmit the registration information to a mobile device. The registration information from the NCPS may include an IP address or a URL of the NCPS.

In some cases, the receiver module 1410 is configured to receive a downlink data notification for the mobile device from a PGW or an SGW. The paging management module 1430, in conjunction with the transmitter module 1420, may be configured to send a paging notification from the NCPS to the mobile device based on the received downlink data notification. The paging notification may include a request for the mobile device to monitor a paging channel of the network (e.g., a cellular network).

Figure 15:
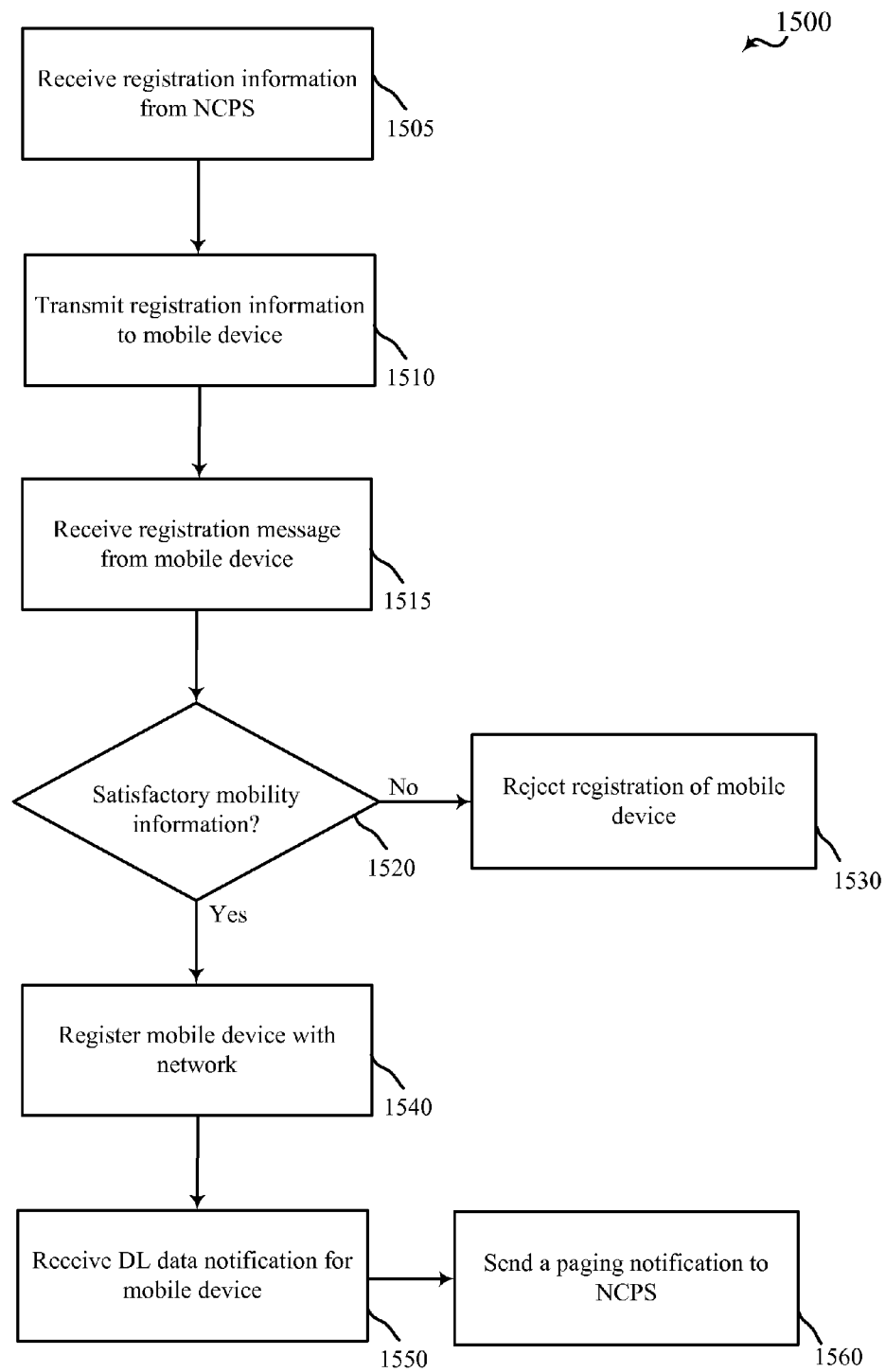
FIG. 15 shows a flowchart illustrating an example of a method for wireless communication, in accordance with various aspects of the present disclosure.

FIG. 15 shows a flowchart illustrating an example of a method 1500 of wireless communication, which may be implemented by base stations 105 and/or 205 of FIGS. 1 and/or 2, MME/SGW nodes 240 of FIG. 2, and/or the apparatus 1405 of FIG. 14. By way of example, the method 1500 is described with reference to the apparatus 1405. At block 1505, the apparatus 1405 may receive registration information from an NCPS. The operations of block 1505 may be performed by the receiver module 1410 of FIG. 14.

At block 1510, the apparatus 1405 may transmit registration information to a mobile device—e.g., via a base station. The operations of block 1510 may be performed by the transmitter module 1420 of FIG. 14.

At block 1515, the apparatus 1405 may receive a registration message (e.g., a TAU Update Request) from a mobile device. The registration message may include an indication that mobile device is capable of receiving paging via a non-cellular RAT. The operations of block 1515 may be performed by the receiver module 1410 of FIG. 14.

At block 1520, the apparatus 1405 may determine whether a mobile device seeking to register has satisfactory mobility information. If a mobile device does not have satisfactory mobility information, the apparatus 1405 may, at block 1530, reject registration of the mobile device. For example, if mobile device has mobility information indicating that it is moving quickly through a TA, or if the mobile device is not likely to be under coverage of particular non-cellular RAT for a threshold period of time, the apparatus 1405 may reject a registration request with an indication the mobile device is capable of receiving non-cellular paging. The operations of blocks 1520 and 1530 may be performed by the registration module 1425.

If a mobile device has satisfactory mobility information, then, at block 1540, the apparatus 1405 may register the mobile device. For example, the apparatus 1405 may accept a TAU Update Request and managing paging operations for the mobile device accordingly. In some cases, the operations of block 1540 are performed by the registration module 1425.

At block 1550, the apparatus 1405 may receive a downlink data notification from a PGW or an SGW. The operations of block 1550 may performed by the paging management module 1430, in conjunction with the receiver module 1410.

The apparatus 1405 may thus, at block 1560, send a paging notification to the NCPS. The operations of block 1560 may be performed by the NCPS interface module 1435, in conjunction with the paging management module 1430 and the transmitter module 1420.

Figure 16:
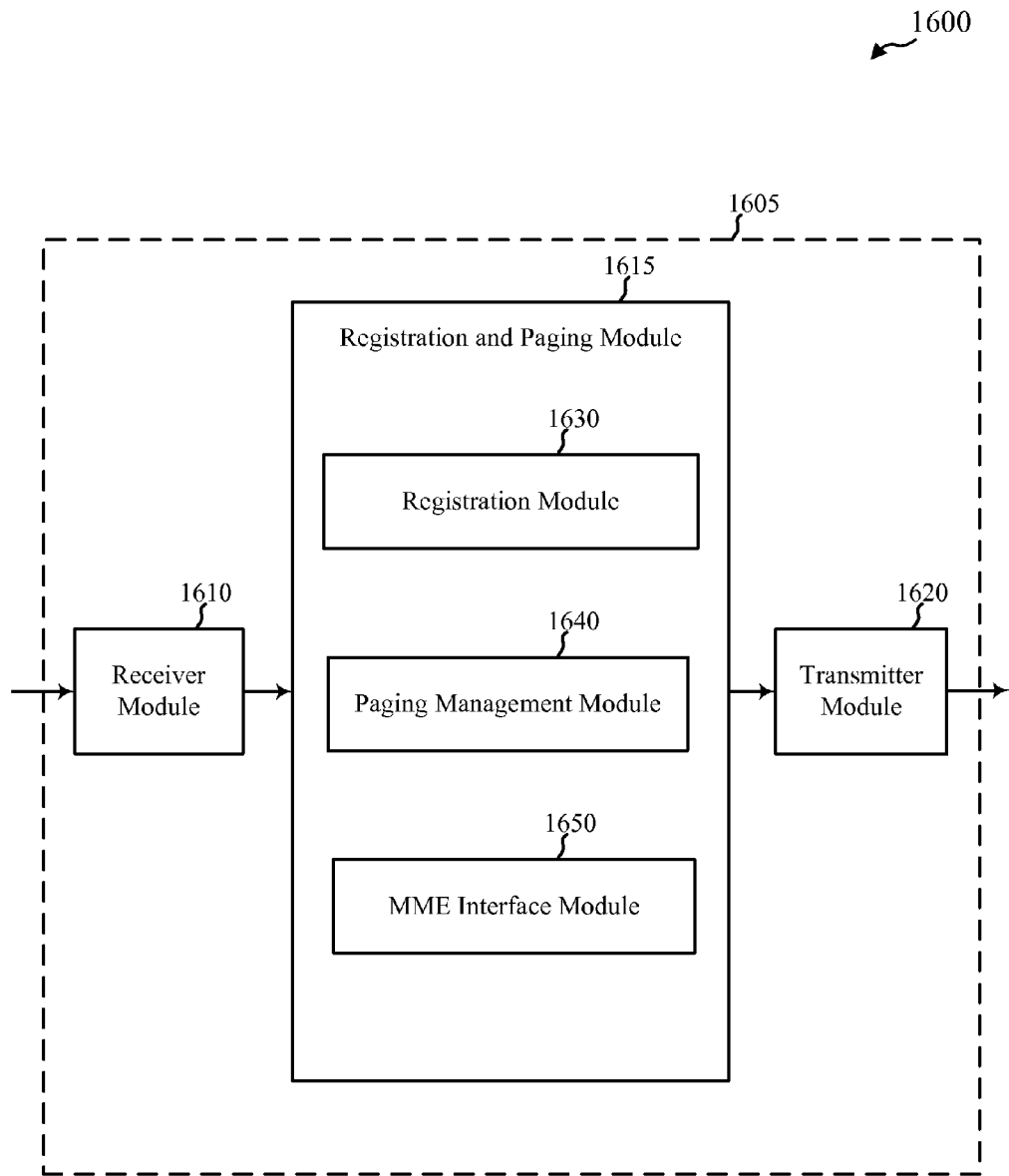
FIG. 16 shows a block diagram of an apparatus configured for use in wireless communication, in accordance with various aspects of the present disclosure.

Next, FIG. 16 shows a block diagram 1600 of an apparatus 1605 configured for use in wireless communication, in accordance with various aspects of the present disclosure. In some examples, the apparatus 1605 may be an example of aspects of one or more of the base stations 105, 205, and/or 305 described with reference to FIGS. 1, 2, and/or 3, and/or an example of aspects of the apparatus 805 described with reference to FIG. 8. In some examples, the apparatus 1605 may be part of or include an LTE/LTE-A base station. In other cases, the apparatus 1605 may illustrate aspects of the core network 130 and/or 230, described with reference to FIGS. 1 and/or 2. For instance, the apparatus 1605 may illustrate aspects of the NCPS 260 of FIG. 2. The apparatus 1605 may also be a processor. The apparatus 1605 may include a receiver module 1610, a registration and paging module 1615, and/or a transmitter module 1620. Each of these modules may be in communication with each other. The registration and paging module 1615 may include a registration module 1630, a paging management module 1640, and/or an MME interface module 1650

The registration module 1630 may be configured to register a mobile device with the apparatus 1605. The receiver module 1610 may, for instance, be configured to receive a registration message from the mobile device, which may be the basis for registering the mobile device with the apparatus 1605. In some examples, the transmitter module 1620, in conjunction with the registration module 1630 may be configured to send registration information for use by a mobile device to an MME. The registration information may include an IP address and/or URL of the apparatus 1605.

Additionally or alternatively, the registration module 1630 and/or the transmitter module 1620 may be configured to respond to the registration message from a mobile device with a message confirming the registration. In some examples, the message confirming the registration includes an expiration time. The registration module 1630, in conjunction with the receiver module 1610 may also be configured to receive, from a mobile device, an extension message including a request to extend a registration.

The paging management module 1640 may be configure, in conjunction with the MME interface module 1650 and/or the receiver module 1610, to receive a paging notification from an MME of a cellular network. The paging management module 1640, in conjunction with the transmitter module 1620 may be configured to send a paging message to a mobile device.

The MME interface module 1650 may also be configured to forward a message from the apparatus 1605 to an MME. In some examples, the receiver module 1610 is configured to receive a message from a mobile device, and the MME interface module 1650 is configured to forward the message.

Figure 17:
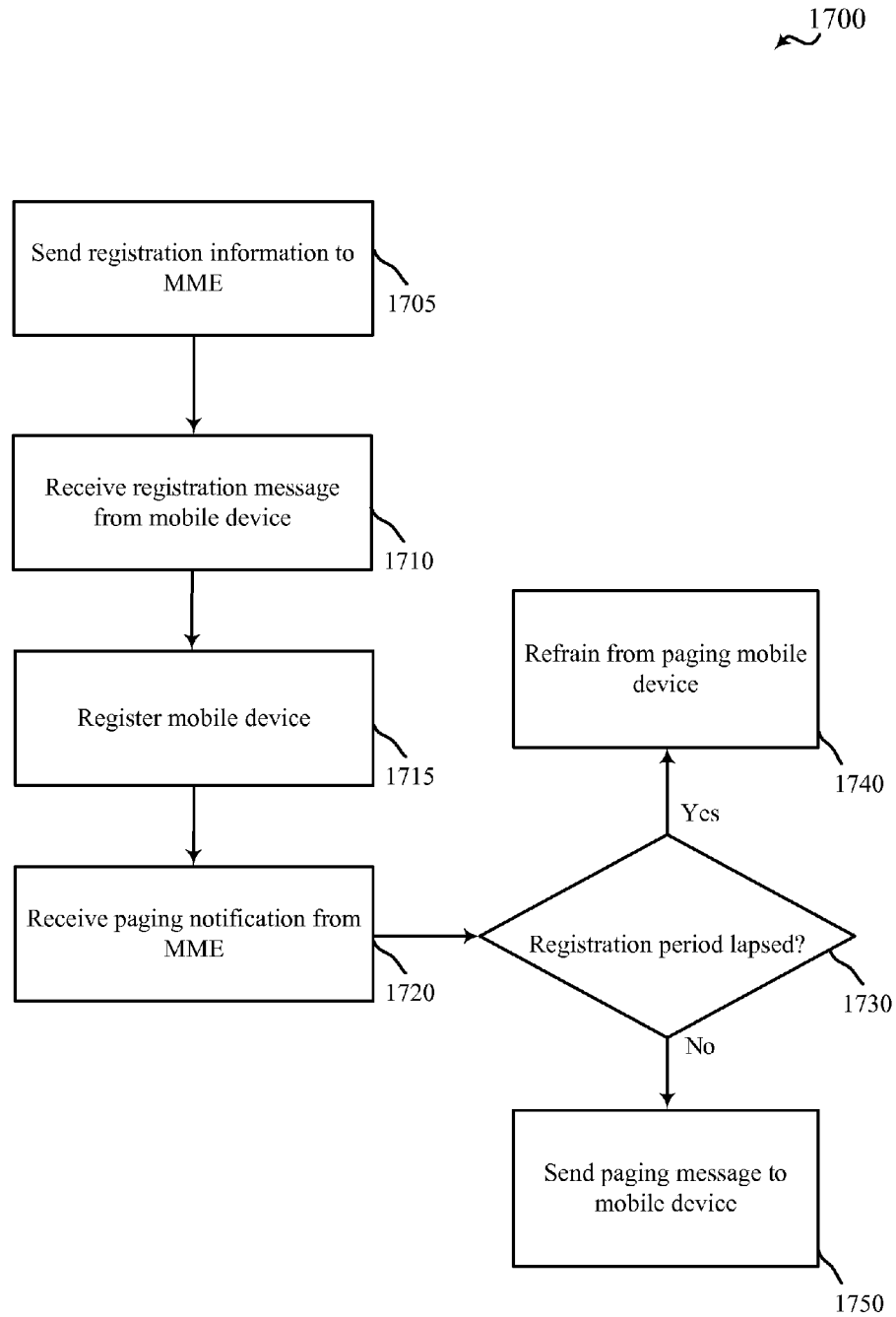
FIG. 17 shows a flowchart illustrating an example of a method for wireless communication, in accordance with various aspects of the present disclosure.

FIG. 17 shows a flowchart illustrating an example of a method 1700 for wireless communication, which may be implemented by base stations 105 and/or 205 of FIGS. 1 and/or 2, NCPS 260 of FIG. 2, and/or the apparatus 1605 of FIG. 16. By way of example, the method 1700 is described with reference to the apparatus 1605. At block 1705, the apparatus 1605 may send registration information to an MME. The operations of block 1705 may be performed by the transmitter module 1620 of FIG. 16.

At block 1710, the apparatus 1605 may receive a registration message from a mobile device. The registration message may be based on, or include, registration information sent to the MME. The operations of block 1710 may be performed by the receiver module 1610 of FIG. 16.

At block 1715, the apparatus 1605 may register the mobile device. The operations of block 1715 may be performed by the registration module 1630.

At block 1720, the apparatus may receiving a paging notification from the MME. The operations of block 1720 may be performed by the MME interface module 1650, in conjunction with the receiver module 1610. The apparatus, at block 1730, via the registration module 1630, may then determine whether the registration period of the mobile device has lapsed. If the registration period of the mobile device has lapsed, the apparatus 1605 may notify the MME (e.g., via the MME interface module 1650), and, at block 1740, it may refrain from paging the mobile device. But if the registration period has not lapsed, the apparatus 1605 may, at block 1750, send a paging message to the mobile device via a non-cellular RAT. The operations of block 1750 may be performed by the paging management module 1640, in conjunction with the transmitter module 1620.

Figure 18:
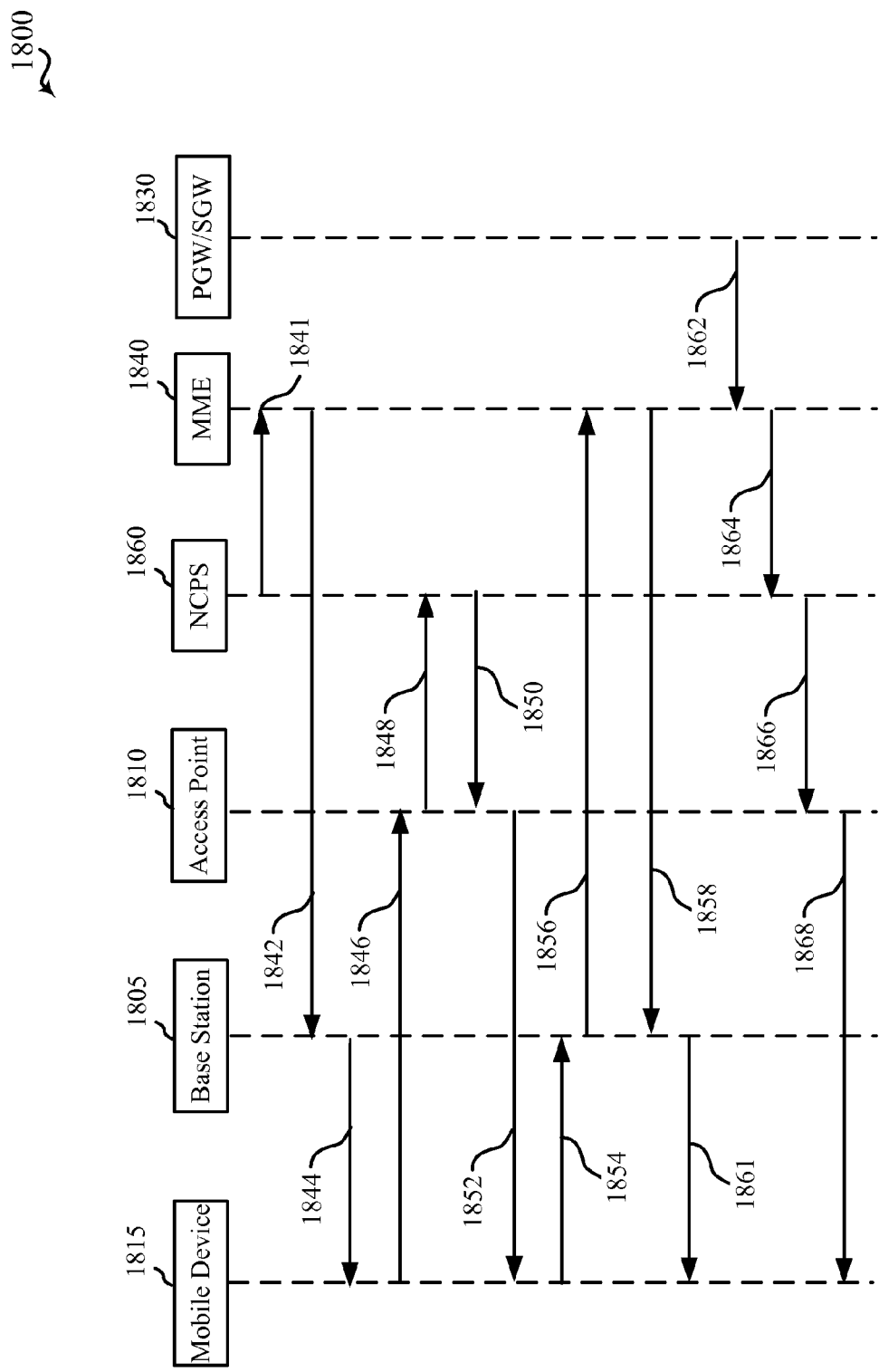
FIG. 18 shows a message flow diagram illustrating an example of communications between various nodes of a wireless communications system, in accordance with various aspects of the present disclosure.

FIG. 18 shows a message flow diagram illustrating an example of communications 1800 between various nodes of a wireless communications system, in accordance with various aspects of the present disclosure. The nodes of the wireless communications system may include a mobile device 1815, a base station 1805, an AP 1810, an MME 1840, and a PGW/SGW 1830, which may be examples of the mobile devices 115 and 215, base stations 105, WLAN APs 235, MME/SGW nodes 240, NCPS 260, and PGW/SGW node 245 described with reference to the preceding Figures. Additionally, is some examples, the message flow diagram may reflect communication between an apparatus 1205 and apparatuses 1405 and 1605 of FIGS. 12, 14, and 16.

As mentioned above, non-cellular paging may be effected utilizing IP traffic to deliver paging information to the mobile device 1815. This paging information may be the same information that would be delivered over a cellular paging channel. The NCPS 1860 may be in communication with the MME 1840. The NCPS may send registration information 1841 to the MME 1840. This registration information 1841 may include an IP address or URL of the NCPS. The MME 1840 may communicate the registration information in signaling 1842 to the base station 1805, which may be broadcast or unicast 1844 to the mobile device 1815, and thus received by the mobile device 1815 via a cellular radio. In some examples, the signaling 1842 from the MME 1840 is sent in OM ADM configuration to the UE (e.g., in ANDSF); or it may be sent in NAS layer signaling when the mobile device 1815 attaches to or registers with a TAU Update Request.

The mobile device 1815 may send a registration message 1846 to an non-cellular RAT AP 1810, which may be forwarded in message 1848 to the NCPS 1860. The registration message 1846 may include the identity of the mobile device 1815, which may be one of the temporary identities in use over the network of the MME 1840. The NCPS 1860 may send an acknowledgment 1850 of the registration, and the AP 1810 may forward the acknowledgment message 1852 to the mobile device 1815. The mobile device 1815 may then maintain a session with the NCPS 1860. For instance, the mobile device 1815 may refresh its status periodically or at any change of IP address. In some cases, such as implementation employing IPv4 traffic for paging, this session with NCPS may enable the traffic to pass through a network address translations (NATs); the mobile device 1815 and the NCPS 1860 may negotiate how paging will be delivered (e.g., port number, IP address version, etc.).

Upon registering with the NCPS 1860, the mobile device 1815 may transmit a registration message 1854 (e.g., a TAU Update Request), which may be forwarded 1856 from the base station 1805 to the MME 1840. The registration message 1854 may include an indication that the mobile device 1815 is capable of receiving a paging message via a non-cellular RAT. The registration message 1854 may also provide the identity of the NCPS 1860. Or, in some case where no NCPS is deployed, the mobile device 1815 may not register with an NCPS, and may provide to the MME 1840 a manner of delivering paging via non-cellular RATs. For instance, utilizing dummy traffic on a specific, configured IP address and port number. The MME 1840 may provide an acknowledgement message 1858, which may be forwarded 1861 to the mobile device 1815 from the base station 1805. The acknowledgement message 1858 may acknowledge the mobile device's 1815 registration with the MME 1840.

In some examples, the registration message 1854 may also include mobility context information—e.g., information related to whether the mobile device 1815 is moving and/or is likely to move in the future. The MME 1840 may reject registration of the mobile device 1815 based on the mobility information and/or based on knowledge of whether contiguous non-cellular cover is possible in the present area of the mobile device 1815.

Once the mobile device 1815 has registered with the MME 1840 and/or the NCPS 1860, the mobile device 1815 may deactivate its cellular radio. And then, at regular intervals—e.g., intervals set by the NCPS 1860 or the MME 1840 during a registration process, or on demand by the NCPS 1860 or the mobile device 1815—the mobile device 1815 may temporarily re-activate the cellular radio to re-synchronize with the base station 1805, to re-acquire system information or to confirm an ability to receive paging over non-cellular technology, or to update mobility context information. The mobile device 1815 may also confirm with the MME 1840 that mobile device 1815 has connectivity with the NCPS 1860 while the cellular radio is active.

Alternatively, the mobile device 1815 may temporarily re-activate the cellular radio only to re-synchronize and to read system information. In such cases, the mobile device 1815 may send a message to the MME 1840 via the NCPS 1860 to confirm with the MME 1840 that the mobile device 1815 has connectivity with the NCPS 1860. The NCPS 1860 may route the message to the MME 1840 based on a mapping of the identity of the MME 1840, or based on an IP address or port number provided to the mobile device 1815 at the time of registration. In some examples, and irrespective of how the mobile device 1815 confirms connectivity with the NCPS 1860, the mobile device 1815 may also provide the MME 1840 with the TA where the mobile device 1815 is located. The mobile device 1815 may also trigger measurements and/or confirmations, as discussed below, based on sensor information—e.g., a rate of synchronization actions should be higher in a scenario involving Wi-Fi service in a vehicle, such as a car, bus, train, or the like.

In some cases, if the mobile device 1815 loses a non-cellular RAT connection (e.g., through movement, deliberate action of the user, etc.), the mobile device 1815 may immediately activate the cellular radio and initiate a de-registration process with the MME 1840. The MME 1840 may optionally inform the NCPS of such de-registration. In some examples, the mobile device 1815 may undertake such actions in advance of loss of connectivity, for instance, if the mobile device 1815 can predict an imminent loss of connectivity due to, e.g., changed signal strength.

When paging is initiated, paging information may be provided by the paging entity (e.g., the MME 1840) to the NCPS 1860. If the mobile device 1815 is registered with the NCPS 1860, the NCPS 1860 may page the mobile device 1815 over a non-cellular RAT. For instance, the PGW/SGW 1830 may send a downlink data notification 1862 to the MME 1840. The MME 1840 may send a page notification 1864 to the NCPS 1860. The NCPS 1860 may, in turn, send a paging message 1866 to the AP 1810, which may be forwarded in a paging message 1868 to the mobile device 1815. The mobile device 1815 may then respond to the paging message according to a behavior defined by the MME 1840 (e.g., in a TAU).

In some cases, the MME 1840 may initiate a timer, which may run until the MME 1840 receives a confirmation or update message from the mobile device 1815. If the timer expires before the mobile device 1815 communicates with the MME 1840, the MME 1840 may initiate a normal cellular paging and registration process using a last-known TA of the mobile device 1815.

Alternatively, the MME 1840 may provide only an indication to the NCPS 1860 that a cellular paging process is required, and the NCPS 1860 may send a paging alert message over the non-cellular RAT to the mobile device 1815. In such cases, the mobile device 1815 may acknowledge the paging alert message, and thereafter, the mobile device 1815 may activate its cellular radio as though the mobile device 1815 is emerging from an idle, inactive period; and a paging message may be sent to the mobile device 1815 according to a normal cellular paging operation.

Figure 19:
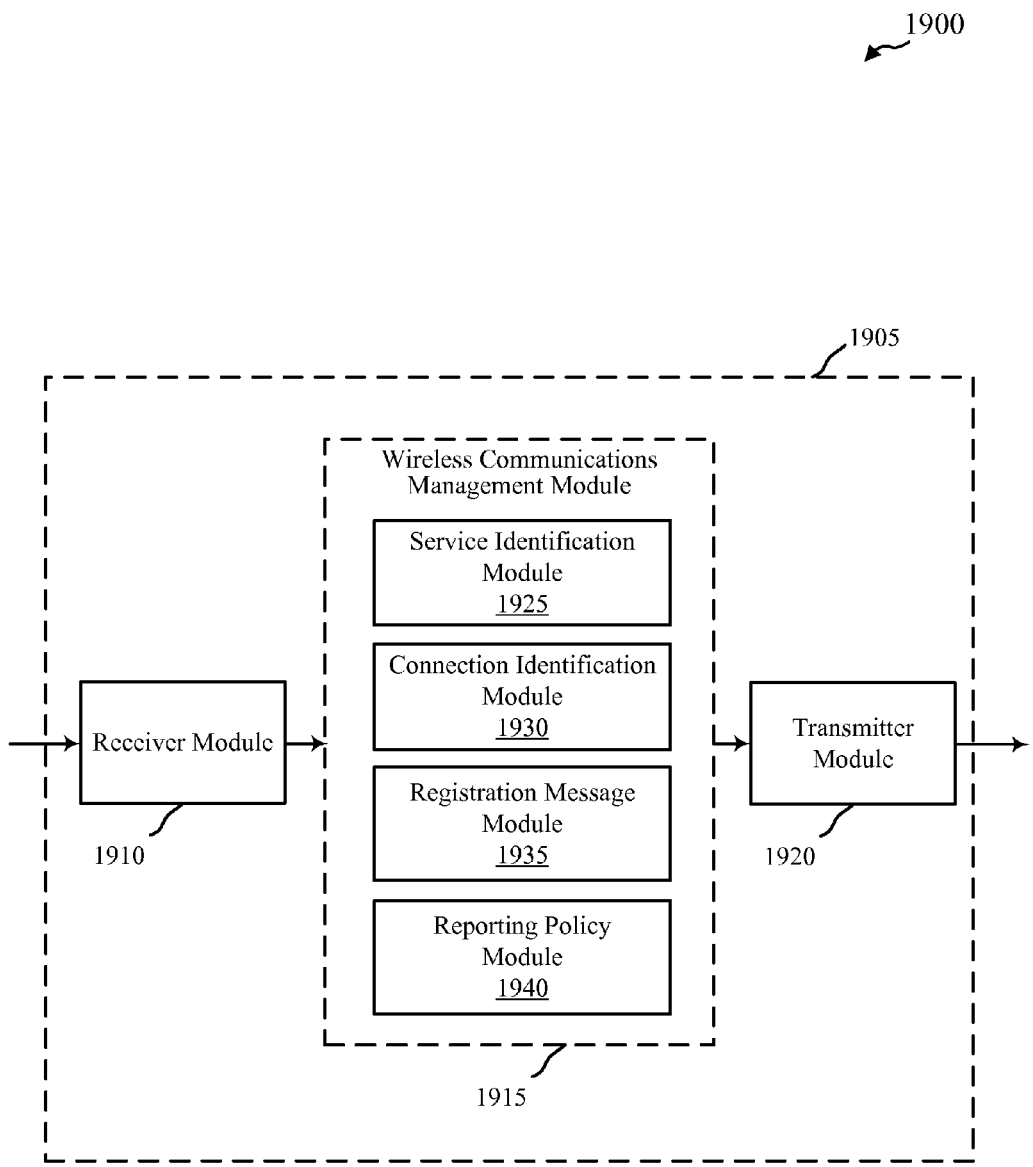
FIG. 19 shows a block diagram of an apparatus configured for use in wireless communication, in accordance with various aspects of the present disclosure.

Next, FIG. 19 shows a block diagram 1900 of an apparatus 1905 configured for use in wireless communication, in accordance with various aspects of the present disclosure. The apparatus 1905 may be an example of one or more aspects of mobile devices 115, 215 and/or 315 described with reference to FIGS. 1, 2 and/or 3. The apparatus 1905 may also be an example of the apparatus 405 described with reference to FIG. 4. The apparatus 1905 may include a receiver module 1910, a wireless communications management module 1915, and/or a transmitter module 1920, which may be examples of the corresponding modules of apparatus 405 of FIG. 4. The apparatus 1905 may also include a processor (not shown). Each of these components may be in communication with each other. The wireless communications management module 1915 may include a service identification module 1925, a connection identification module 1930, a registration message module 1935, and/or a reporting policy module 1940. The receiver module 1910 and the transmitter module 1920 may perform the functions of the receiver module 410 and the transmitter module 420, of FIG. 4, respectively.

The service identification module 1925 may be configured to identify a service or to include in a registration message for a network. Service, as used here, may relate to communication types (e.g., voice, data, etc.) and/or applications operable on a mobile device and/or network. The service identification module 1925 may be configured to identify a service to include in the registration message from a set of active services (e.g., services active at the apparatus 1905). Additionally or alternatively, the service identification module 1925 may be configured to identify the service to include in the registration message from a set of services associated with the network.

The connection identification module 1930 may be configured to identify an available connection to include in a registration message for a network. Available connection, as used here, may include a RAT, base station, access point, and/or network at with which a mobile device is able to communicate. In some examples, the connection identification module 1930 is configured to identify the available connection to include in the registration message from a set of RATs. Additionally or alternatively, the connection identification module 1930 may be configured to identify the available connection to include in the registration message from a set of available networks. The list, or set, of available networks may include networks controlled by a common operator; or the list of available networks may include networks controlled by a plurality of operators.

The registration message module 1935 may be configured, in conjunction with the service identification module 1925 and/or the connection identification module 1930, to generate a registration message including identified services and/or available connections. The registration message module 1935 may, for instance, generate a TAU Update Request which includes a service and available connections for a mobile device. The registration message module 1935 may, in conjunction with the transmitter module 1920, transmit a registration message to a network.

The reporting policy module 1940 may be configured to maintain and reference a policy governing reporting of services and/or available connections. A reporting policy may be received at the apparatus 1905 (e.g., via the receiver module 1910) from a network. Or, in some cases, the apparatus 1905 may be configured with set reporting polices. In other examples, user of the apparatus 1905 may provide an indication governing service and/or available connections to report. The reporting policy module 1940 may be configured to determine that a reporting policy, or a user indication applies to services to be included in the registration message. Additionally or alternatively, the reporting policy module 1940 may be configured to determine that that a reporting policy or user indication applies to available connections to be included in the registration message. The service identification module 1925 and/or the connection identification module 1930 may thus be configured to identify a service or available connection, respectively, based on the reporting policy or user indication.

A reporting policy may include a network indication for when to provide an updated registration message (e.g., a TAU Update Request). For example, the receiver module 1910 may be configured to receive such a network indication, which may include a set of criteria for the apparatus 1905 (e.g., via the service identification module 1925 and/or the connection identification module 1930) to apply in identifying service and/or connection information to include in the updated registration message.

In some examples, the receiver module 1910 is configured to receive a response message from the network. The response message may include a registration procedure to be applied by the registration message module 1935, or other components of the apparatus 1905. The registration procedure may include at least one of a paging DRX cycle, a TA for which the device may register, a number of cells for which the device may register, or a period (e.g., a timer) at which the device may register, as required by the network.

Figure 20:
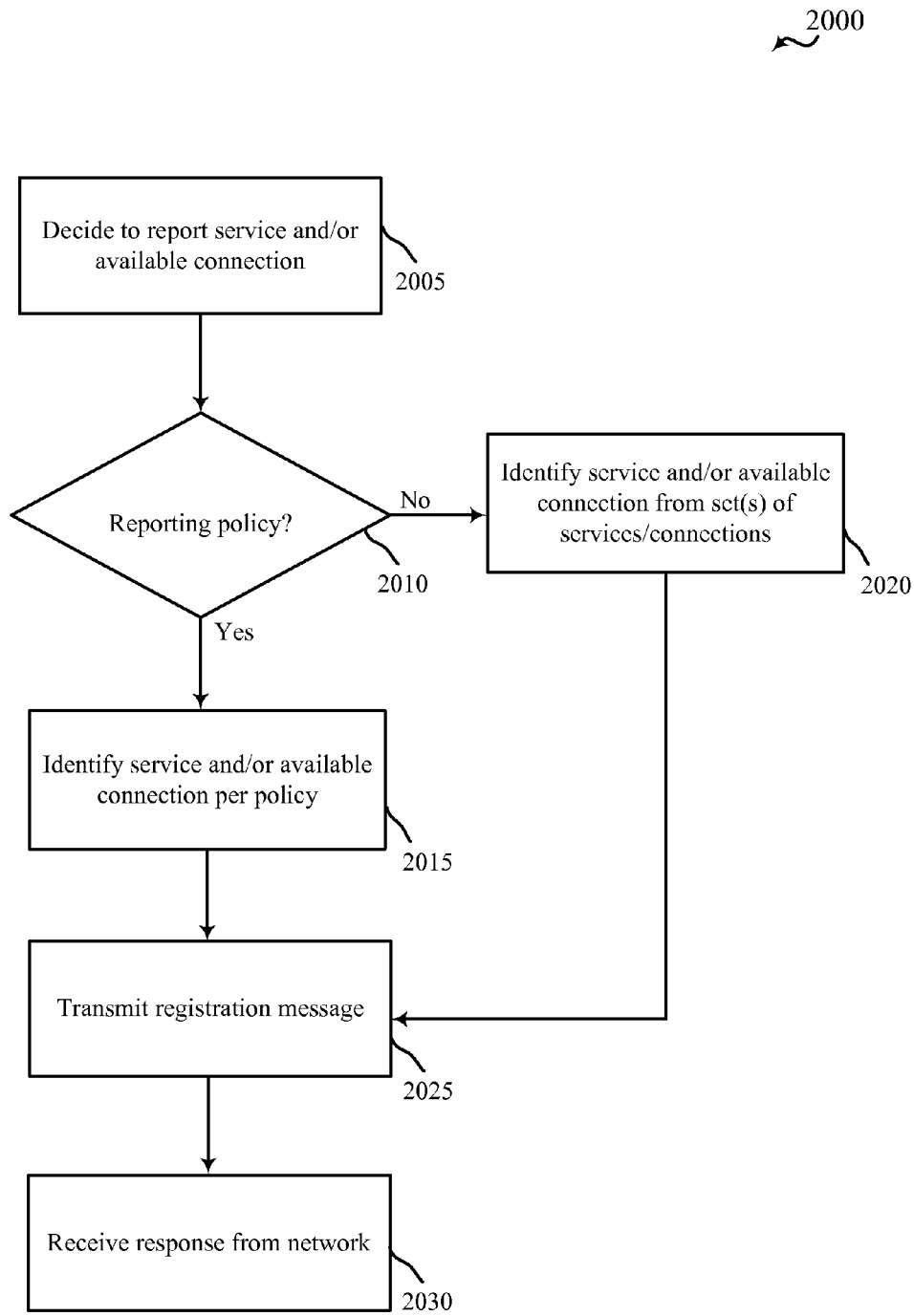
FIG. 20 shows a flowchart illustrating an example of a method for wireless communication, in accordance with various aspects of the present disclosure.

Next, FIG. 20 shows a flowchart illustrating an example of a method 2000 for wireless communication, which may be implemented by the mobile devices 115 and/or 215 of FIGS. 1 and/or 2, and/or the apparatus 1905 of FIG. 19. By way of example, the method 2000 is described in with reference to the apparatus 1905. At block 2005, the apparatus 1905 may decide to report a service and/or available connection—e.g., because the apparatus 1905 has determined that a current TA or cell ID advertised in SIB 1 of a serving cell is not on a list of TAs and/or cell IDs at the apparatus 1905. At block 2010, the apparatus 1905 may determine whether a reporting policy applies to services and/or available connections to be included in a registration message. The operations of block 2010 may be performed by the reporting policy module 1940 of FIG. 19.

If a policy does apply, the apparatus 1905 may, at block 2015, identify services and/or available connections according to the policy. Or, no policy applies, the apparatus 1905 may, at block 2020, identify services and/or available connections—e.g., from sets of services and/or available connections as discussed above. The operations of blocks 2015 and 2020 may be performed by the service identification module 1925 and the connection identification module 1930 of FIG. 19.

At block 2025, the apparatus 1905 may transmit a registration message including identified services and/or available connections. The operations of block 2025 may be performed by the transmitter module 1920 of FIG. 19.

At block 2030, the apparatus 1905 may receive a response from the network. The operations of block 2030 may be performed by the receiver module 1910 of FIG. 19.

Figure 21:
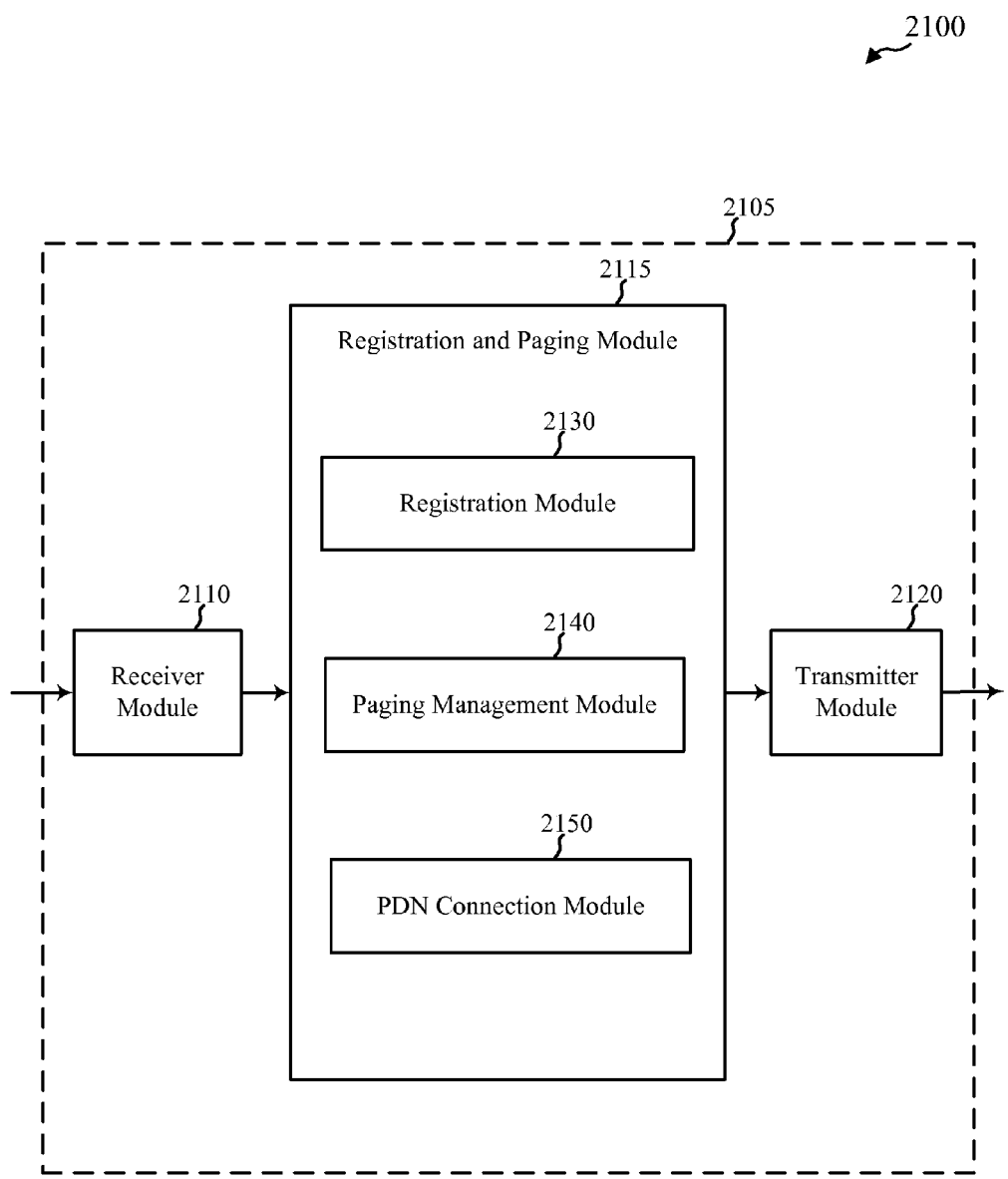
FIG. 21 shows a block diagram of an apparatus configured for use in wireless communication, in accordance with various aspects of the present disclosure.

Next, FIG. 21 shows a block diagram 2100 of an apparatus 2105 for use in wireless communication, in accordance with various aspects of the present disclosure. In some examples, the apparatus 2105 may be an example of aspects of one or more of the base stations 105, 205, and/or 305 described with reference to FIGS. 1, 2, and/or 3, and/or an example of aspects of the apparatus 805 described with reference to FIG. 8. In some examples, the apparatus 2105 may be part of or include an LTE/LTE-A base station. In other cases, the apparatus 2105 may illustrate aspects of the core network 130 and/or 230, described with reference to FIGS. 1 and 2. For instance, the apparatus 2105 may be an example of one or more aspects of an MME/SGW node 240 of FIG. 2. Or, the apparatus 2105 may illustrate aspects of the NCPS 260 of FIG. 2. The apparatus 2105 may also be a processor. The apparatus 2105 may include a receiver module 2110, a registration and paging module 2115, and/or a transmitter module 2120. Each of these modules may be in communication with each other. The registration and paging module 2115 may include a registration module 2130, a paging management module 2140, and/or a PDN connection module 2150.

The registration module 2130 may be configured to determine a registration procedure for a mobile device based, wholly or partially, on a service or available connection included in a registration message. The registration procedure may include at least one of a paging DRX cycle, a TA for which a mobile device should register, a number of cells for which the mobile device should register, or a period at which the mobile device should register. The registration module 2130 may generate a response message including the registration procedure, which may be transmitted via the transmitter module 2120.

The services included in a registration message may include active service(s) at a mobile device, a service associated with a network of the apparatus 2105, and/or a service reported based on a reporting policy or user indication. Additionally or alternatively, the available connections included in the registration message may include a RAT with which the mobile device is in wireless communication, an available network with which the mobile device is in wireless communication, and/or an available connection reported based on a reporting policy or user indication. In some examples, the response message includes an indication of when to provide an updated registration message, and it may include a set of criteria for a mobile device to apply for identifying service and or connection information to include in an updated registration message.

In some examples, the paging management module 2140 is configured to determine a paging DRX cycle as a function of the smallest latency of services included in the registration message. For instance, if services included in a registration message include voice, streaming audio, streaming video, video telephony, and two-way gaming, the paging DRX cycle may be determined according to which of those services has the smallest latency. Alternatively, the paging management module 2140 may be configured to determine a paging DRX cycle as a function of the largest latency of services included in a registration message. In some cases, the paging management module 2140 is configured to indicate, via, e.g., a response message, an absence of paging. In still other examples, the paging management module 2140 is configured to identify a paging frequency for a mobile device based on the service(s) included in a registration message. The registration module 2130 may, in conjunction with the paging management module 2140, determine a tracking area for which a mobile device should register, a number of cells for which the mobile device should register, or a period at which the mobile device should register based on mobile-terminated (MT) traffic generated according to the identified paging frequency.

In some cases, the PDN connection module 2150 is configured to identify a set of PDN connections for the mobile device. The registration module 2130 may thus determine whether the service(s) included in the registration message is/are active in a network associated with the apparatus 2105 based on the identified PDN connections.

Figure 22:
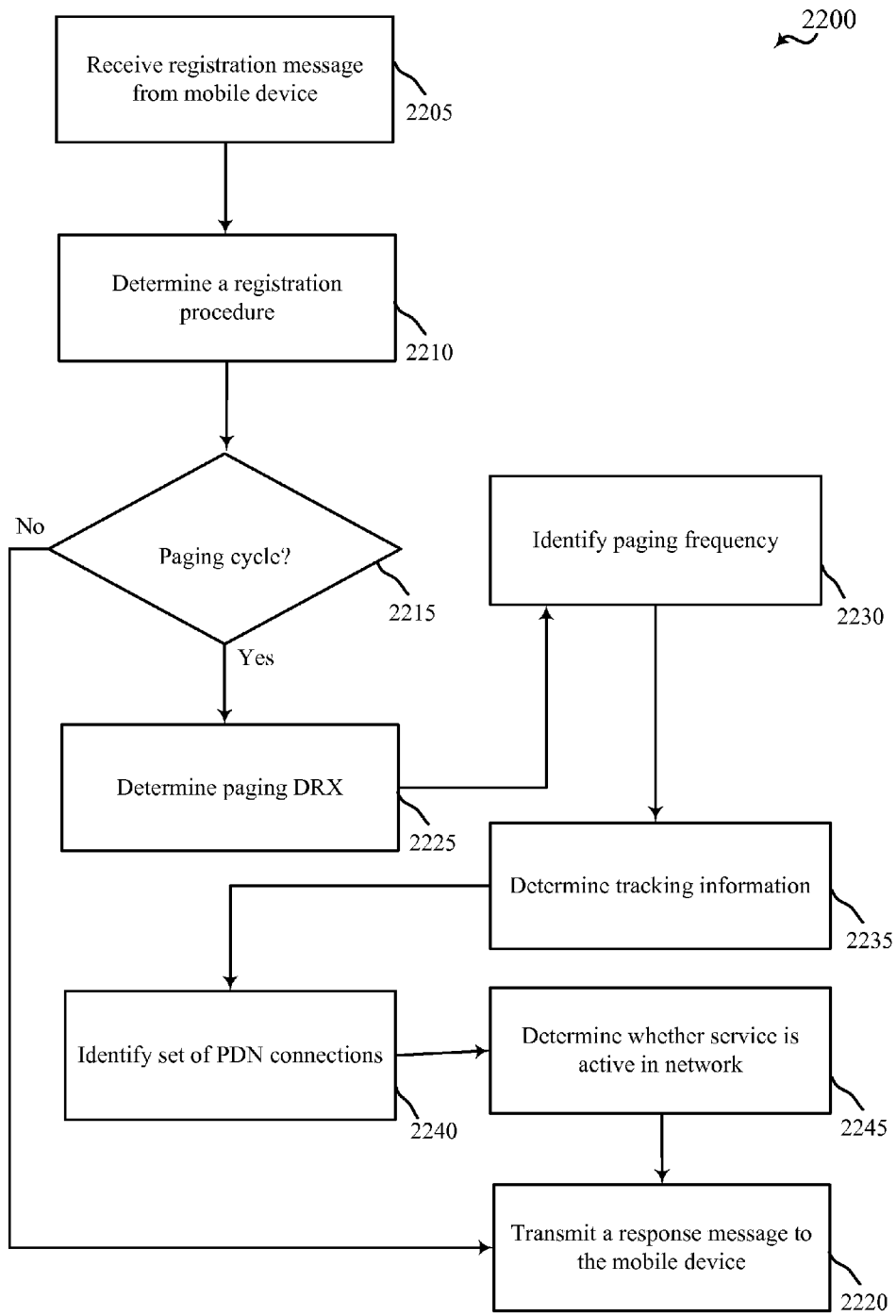
FIG. 22 shows a flowchart illustrating an example of a method for wireless communication, in accordance with various aspects of the present disclosure.

Next, FIG. 22 shows a flowchart illustrating an example of a method 2200 for wireless communication, which may be implemented by base stations 105 and/or 205 of FIGS. 1 and/or 2, MME/SGW nodes 240 of FIG. 2, and/or the apparatus 2105 of FIG. 21. By way of example, the method 2200 is described with reference to the apparatus 2105. At block 2205, the apparatus 2105 may receive a registration message from a mobile device. The operations of block 2205 may be implemented by the receiver module 2110 of FIG. 21.

At block 2210, the apparatus 2105 may determine a registration procedure. The operations of block 2210 may be performed by the registration module 2130. In some examples, determining a registration procedure may involve determining, at block 2215, whether to implement a paging cycle or to refrain from paging. If no paging cycle is to be implemented, the apparatus 2105 may, at block 2220, send a response message indicating an absence of paging. But if a paging cycle is to be implemented, the device may, at block 2225, determine a paging DRX for the paging cycle as described above. The operations of blocks 2215 and 2225 may be implemented by the paging management module 2140 of FIG. 21; and the operations of block 2220 may be implemented by the transmitter module 2120 of FIG. 2.

In some examples, at block 2230, the apparatus 2105 may identify a paging frequency of the paging cycle based on the service included in the registration message. The operations of block 2230 may be performed by the paging management module 2140 of FIG. 21. At block 2235, the apparatus 2105 may determine a TA, a number of cells, and/or a registration period based on MT generated according to the identified paging frequency. The operations of block 2235 may be performed by the registration module 2130 of FIG. 21.

The method 2200 may also include, at block 2240, identifying a set of PDN connections, as described above. At block 2245, the apparatus 2105 may determine whether service(s) included in a registration message is/are active in the network of the apparatus 2105. The operations of blocks 2245 may be performed by the PDN connection module 2150. Then, at block 2220, the apparatus 2105 may transmit a response message including the registration procedure.

Figure 23:
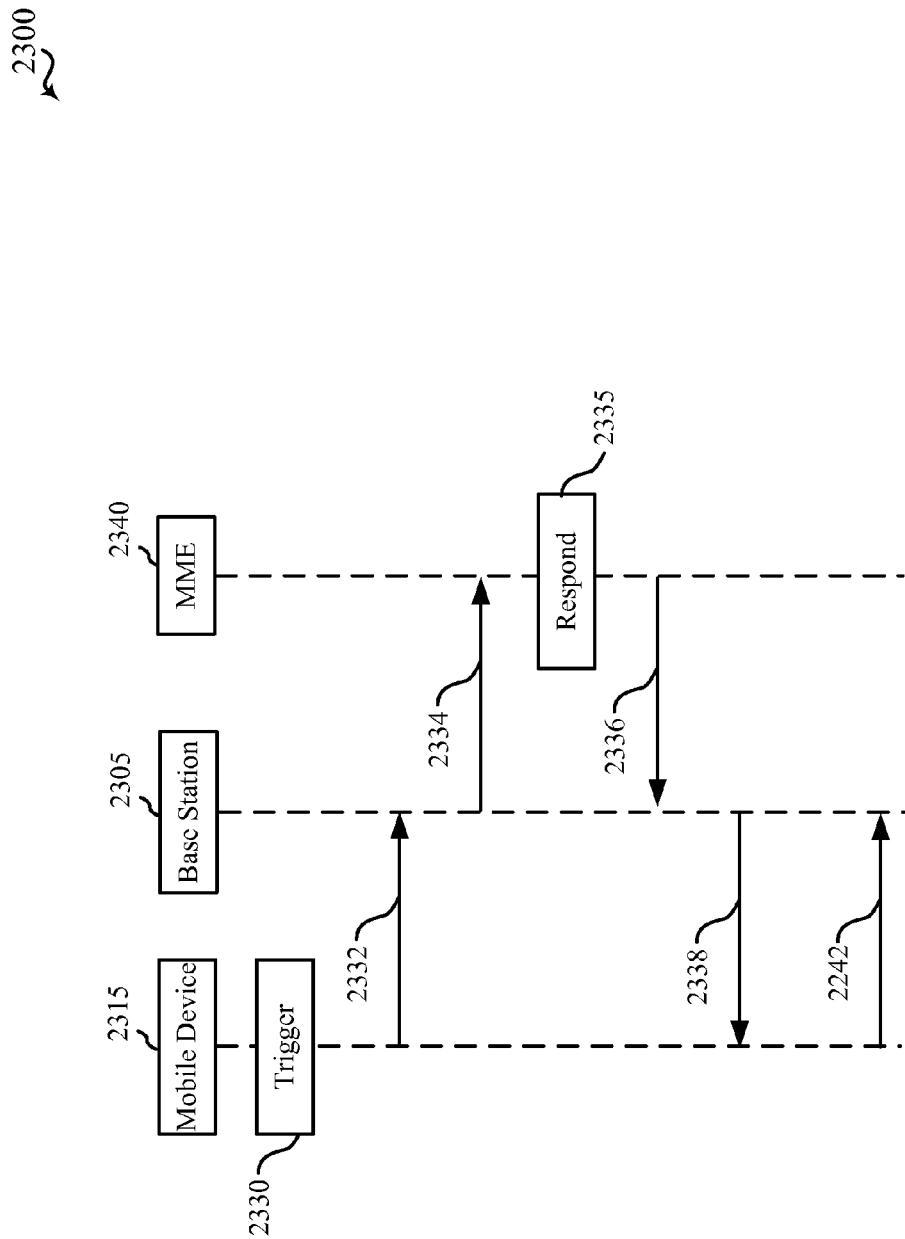
FIG. 23 shows a message flow diagram illustrating wireless communication, in accordance with various aspects of the present disclosure.

FIG. 23 shows a message flow diagram illustrating wireless communication 2300 in according with various aspects of the present disclosure. The diagram illustrates communication between a mobile device 2315, a base station 2305, and an MME 2340, which may be examples of the mobile devices 115 and 215, base stations 105, and MME/SGW nodes 240, described with reference to the preceding Figures. Additionally, in some examples, the diagram illustrates communication between an apparatus 1905 and an apparatus 2105 of FIGS. 19 and 21.

At block 2330, a triggering event (e.g., a policy, SIB information, and/or timer expiration) may trigger the mobile device 2315 to transmit a registration message 2332 (e.g., a TAU Update Request). The base station 2305 may then forward the registration message 2334 to the MME 2340. The registration message 2332 may be configured to increase the efficiency of a paging and registration configuration of the mobile device 2315 and may be based on a set of active services and/or available connection for access by the mobile device 2315. For instance, the registration message 2332 may include a list of services currently active in the mobile device and/or a list of access technologies (e.g., RATs) or networks where the mobile device 2315 is either camped on or connected to. In some cases, the registration message 2332 may indicate, for each service, the default connection associated with the service. The registration message 2332 may thus indicate a combination of services and connections.

In some example, the registration message 2332 may also provide additional information to assist the MME 2340 to recognize how large an area in which to page the mobile device 2315, and in determining a paging DRX cycle. For instance, the registration message 2332 may also include a list of TAs or cell IDs for the mobile device 2315 to indicate cells in the vicinity or on the future route of the mobile device 2315. For instance, the mobile device 2315 may indicate a geographical destination or address based on a map application running on the mobile device 2315, where the map application indicates an active trip.

Additionally or alternatively, the registration message 2332 may include a context for the mobile device 2315. In certain examples, a mobile device 2315 may be a smartphone, and it may be possible to leverage some of the features of the mobile device 2315 to provide the network with context to improve network decisions for paging and registration. Context information may include information related to a location of the mobile device 2315. The mobile device 2315 may, for example, be traveling in a vehicle (e.g., car, train, bike, plane, etc.), and it may be subject to a particular traffic flow (e.g., highway or city traffic). The mobile device 2315 may be outdoors (e.g., pedestrian, stationary, etc.) or indoors (e.g., in a user's hand or pocket, separate from the user while charging, etc.). The mobile device 2315 may be in a location with certain expected uses, such as at a user's office (e.g., in a meeting, in a conference, etc.) or at a user's home. Context may also include an indication of how much traffic to expect—e.g., based on current applications running on the mobile device 2315. Additionally or alternatively, context may include a state of the mobile device 2315 (e.g., screen on/off, in a holster or case, active use, etc.). The registration message 2332 may thus include context information, such as a battery status, a mobility status, a physical location and the like.

The additional information (e.g., services and/or connections) in the registration message may cause the registration procedure to be triggered more frequently by the mobile device 2315. So, to avoid unnecessarily frequent triggering of a registration procedure, the MME 2340 may, as part of the response message, include particular changes to trigger registration. The MME 2340 may provide additional triggers to the mobile device 2315 indicting when to register and when to abstain from registering.

At block 2335, the MME 2340 may generate a registration procedure in a response message. Based on the list of active services and connections, the MME 2340 may determine a TAI list, which may include all cells of the TAs and cell IDs at which the mobile device 2315 is required to register. For example, the paging and registration area can be reduced to services that may cause the MME 2340 to frequently page the mobile device 2315; and this reduction may reduce a paging load and/or area for which the MME 2340 monitors. Alternatively, the MME 2340 can reduce the registration load if, for example, the mobile device 2315 does not have any active services that warrant paging, which may be accomplished by setting a large area or a long periodic TAU timer.

In some cases, the MME 2340 may set a paging DRX cycle based, for instance, on the service requirements of the active services. For example, voice may require less latency for paging, while background data paging can be delayed to enable the mobile device 2315 to save power by not frequently waking up for paging.

The network (e.g., MME 2340) may indicate with a bit which services call for registration when the services become active or inactive. For example, the MME 2340 may provide a service list (e.g., a set of services) of services that, upon becoming active or inactive, trigger registration. This may help provide for sufficient latency for paging if, for example, a voice service is activated and the current paging DRX cycle is too long to readily support voice paging.

Similarly, the MME 2340 may determine and provide an indication for the context and available RATs, as well as for mobility changes. For example, the MME 2340 may provide a connection list (e.g., a set of connections) of networks or RATs that, upon becoming available or unavailable to the mobile device 2315, trigger registration. If, for instance, a data only mobile device 2315 indicates a connection to WLAN, then the network may choose not to page the mobile device 2315 if all data services are on WLAN. But once the WLAN connection is lost, the mobile device 2315 may be triggered to register in order to move the data services back to a cellular RAT, and so that mobile device 2315 is reachable by such services.

Upon determining a registration procedure and generating a response, the MME 2340 may send a response message 2336 with the registration procedure (including triggering information), which may in a TAU message or a TAU Update Accept message. The base station 2305 may then forward the response message 2338 to the mobile device 2315. In some examples, the mobile device 2315 may transmit an acknowledgement (ACK) message 2242, acknowledging the TAU Update Accept. This may be in the form of a TAU Complete message to the MME 2340 via the base station 2305.

Figure 24:
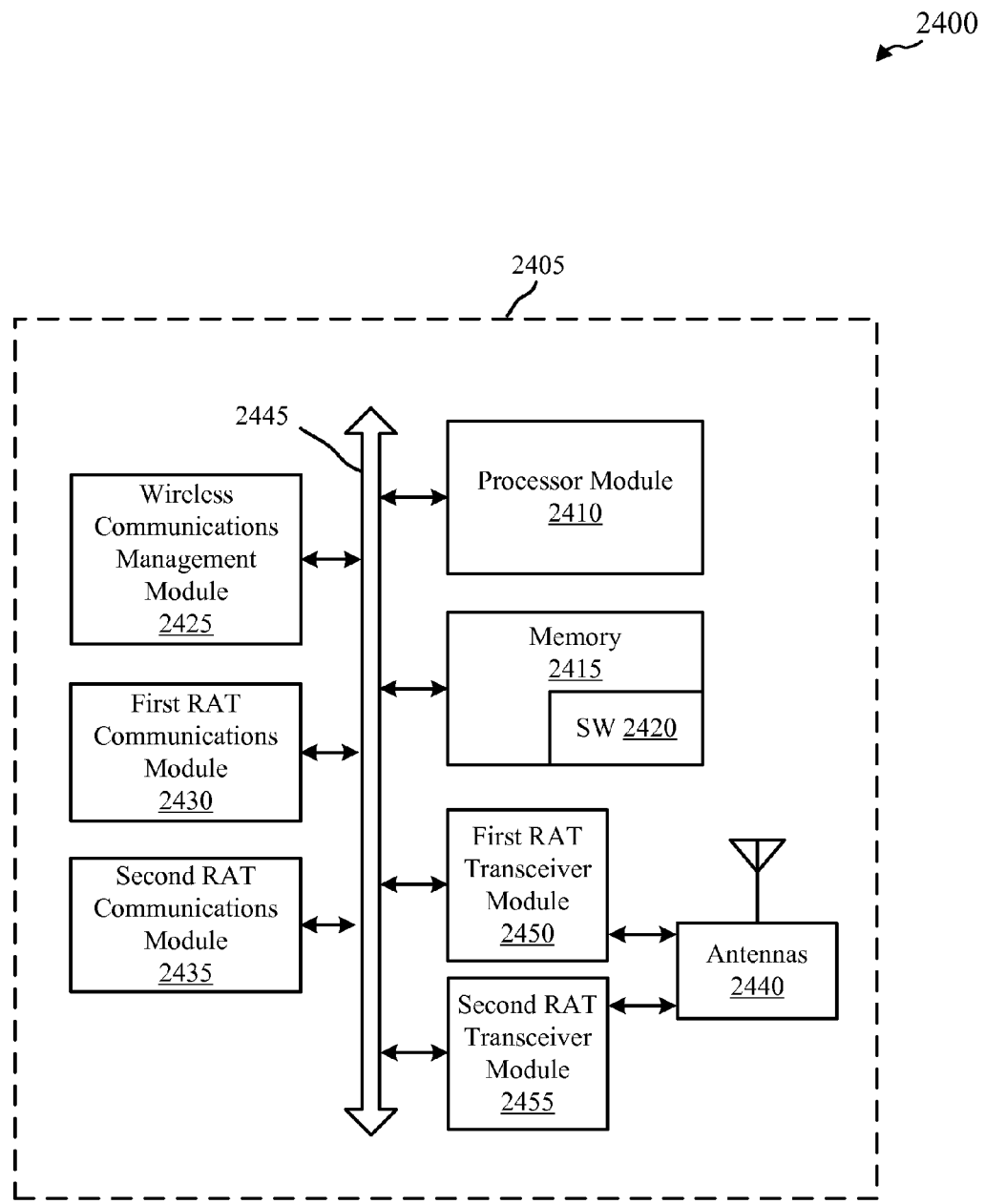
FIG. 24 shows a block diagram of a system for use in wireless communication, in accordance with various aspects of the present disclosure.

FIG. 24 shows a block diagram of a system 2400 for use in wireless communication, in accordance with various aspects of the present disclosure. The system 2400 may include a mobile device 2405, which may be an example of the mobile devices 115, 215, and/or 315 of FIGS. 1, 2, and/or 3. Mobile device 2405 may also be an example of one or more aspects of apparatuses 405, 505, 1205, and/or 1905, of FIGS. 4, 5, 12, and/or 19.

The mobile device 2405 may include components for bi-directional voice and data communications including components for transmitting communications and components for receiving communications. The mobile device 2405 may include antenna(s) 2440, a first RAT transceiver module 2450, a second RAT transceiver module 2455, a processor module 2410, and memory 2415 (including software (SW) 2420), which each may communicate, directly or indirectly, with each other (e.g., via one or more buses 2445). The first RAT transceiver module 2450 may be configured to communicate bi-directionally, via the antenna(s) 2440 and/or one or more wired or wireless links, with one or more networks operating according to a first RAT (e.g., an LTE/LTE-A network), as described above. For example, the first RAT transceiver module 2450 may be configured to communicate bi-directionally with base stations 105, 205, and/or base station/AP 305 described with reference to FIGS. 1, 2, and/or 3. The second RAT transceiver module 2455 may be configured to communicate bi-directionally, via the antenna(s) 2440 and/or one or more wired or wireless links, with one or more networks operating according to a second RAT (e.g., a WLAN), as described above. For example, the second RAT transceiver module 2455 may be configured to communicate bi-directionally with WLAN APs 135 and/or 235, and/or base station/AP 335 with reference to FIGS. 1, 2, and/or 3. Each of the transceiver module 2450, 2455 may include a modem configured to modulate packets and provide the modulated packets to the antenna(s) 2440 for transmission, and to demodulate packets received from the antenna(s) 2440. While the mobile device 2405 may include a single antenna 2440, the mobile device 2405 may have multiple antennas 2440 capable of concurrently transmitting and/or receiving multiple wireless transmissions.

The mobile device 2405 may include a wireless communications management module 2425, which may perform the functions described above for the wireless communications management modules 415, 515, 1215, and/or 1915 described with respect to FIGS. 4, 5, 12, and/or 19. The mobile device 2405 may also include first RAT communications module 2430 and a second RAT communication module 2435 that may perform operations for communications using different RATs and may initiate communications with different RATs based on service information included in page transmissions, similarly as discussed above.

The memory 2415 may include random access memory (RAM) and read-only memory (ROM). The memory 2415 may store computer-readable, computer-executable software/firmware code 2420 containing instructions that are configured to, when executed, cause the processor module 2410 to perform various functions described herein (e.g., paging and page responses, registration, etc.). Alternatively, the computer-readable, computer-executable software/firmware code 2420 may not be directly executable by the processor module 2410 but be configured to cause the mobile device 2405 (e.g., when compiled and executed) to perform functions described herein. The processor module 2410 may include an intelligent hardware device, e.g., a central processing unit (CPU), a microcontroller, an application-specific integrated circuit (ASIC), etc.

Figure 25:
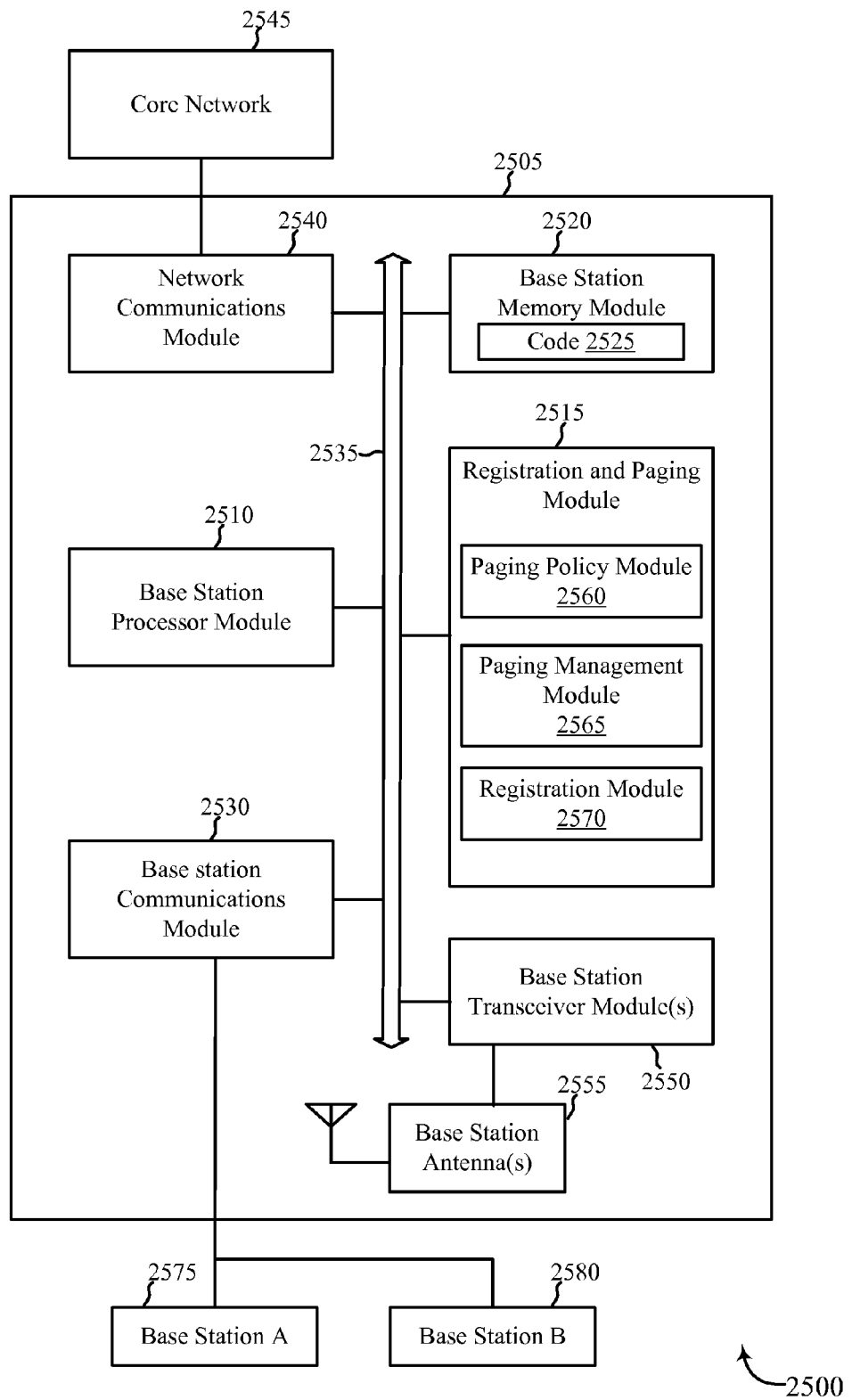
FIG. 25 shows a block diagram of a system for use in wireless communication, in accordance with various aspects of the present disclosure.

FIG. 25 shows a block diagram of a system 2500 for use in wireless communication, in accordance with various aspects of the present disclosure. The system 2500 may include a base station 2505 (e.g., a base station forming part or all of an eNB) for use in wireless communication, in accordance with various aspects of the present disclosure. In some examples, the base station 2505 may be an example of aspects of one or more of the base stations 105, 205, and/or 305 described with reference to FIGS. 1, 2, and/or 3, and/or aspects of one or more of the apparatuses 805, 905, 1405, 1605, and/or 2105 when configured as a base station, as described with reference to FIGS. 8, 9, 14, 16, and/or 21. The base station 2505 may be configured to implement or facilitate at least some of the base station and/or apparatus features and functions described with reference to the preceding Figures.

The base station 2505 may include a base station processor module 2510, a base station memory module 2520, at least one base station transceiver module (represented by base station transceiver module(s) 2550), at least one base station antenna (represented by base station antenna(s) 2555), and/or a registration and paging module 2515. The base station 2505 may also include one or more of a base station communications module 2530 and/or a network communications module 2540. Each of these modules may be in communication with each other, directly or indirectly, over one or more buses 2535.

The base station memory module 2520 may include RAM and/or ROM. The base station memory module 2520 may store computer-readable, computer-executable software/firmware code 2525 containing instructions that are configured to, when executed, cause the base station processor module 2510 to perform various functions described herein related to wireless communication. Alternatively, the computer-readable, computer-executable software/firmware code 2525 may not be directly executable by the base station processor module 2510 but be configured to cause the base station 2505 (e.g., when compiled and executed) to perform various of the functions described herein.

The base station processor module 2510 may include an intelligent hardware device, e.g., a central processing unit (CPU), a microcontroller, an ASIC, etc. The base station processor module 2510 may process information received through the base station transceiver module(s) 2550, the base station communications module 2530, and/or the network communications module 2540. The base station processor module 2510 may also process information to be sent to the transceiver module(s) 2550 for transmission through the antenna(s) 2555, to the base station communications module 2530, for transmission to one or more other base stations 2575 and 2580, and/or to the network communications module 2540 for transmission to a core network 2545, which may be an example of one or more aspects of the core network 130 and/or 230 described with reference to FIGS. 1 and/or 2. The base station processor module 2510 may handle, alone or in connection with the registration and paging module 2515, various aspects of paging and registration as discussed herein. In some examples, the registration and paging module 2515 may include a paging policy module 2560, a paging management module 2565, and a registration module 2570 that may handle various aspects of paging and registration as discussed herein.

The base station transceiver module(s) 2550 may include a modem configured to modulate packets and provide the modulated packets to the base station antenna(s) 2555 for transmission, and to demodulate packets received from the base station antenna(s) 2555. The base station transceiver module(s) 2550 may, in some examples, be implemented as one or more base station transmitter modules and one or more separate base station receiver modules. The base station transceiver module(s) 2550 may support communications in a first radio frequency spectrum band and/or a second radio frequency spectrum band. The base station transceiver module(s) 2550 may be configured to communicate bi-directionally, via the antenna(s) 2555, with one or more mobile devices or apparatuses, such as one or more of the mobile devices 115, 215, and/or 315 described with reference to FIGS. 1, 2, and/or 3. The base station 2505 may, for example, include multiple base station antennas 2555 (e.g., an antenna array). The base station 2505 may communicate with the core network 2545 through the network communications module 2540. The base station 2505 may also communicate with other base stations, such as the base stations 2575 and 2580, using the base station communications module 2530.

The registration and paging module 2515 may be configured to perform and/or control some or all of the features and/or functions described with reference to FIGS. 1, 2, 3, 8, 9, 14, 16, and/or 21 related to registration and paging. The registration and paging module 2515, or portions of the registration and paging module 2515, may include a processor, and/or some or all of the functions of the registration and paging module 2515 may be performed by the base station processor module 2510 and/or in connection with the base station processor module 2510. In some examples, the registration and paging module 2515 may be an example of the registration and paging module 815, 915, 1615, and/or 2115 described with reference to FIGS. 8, 9, 16, and/or 21.

Figure 26:
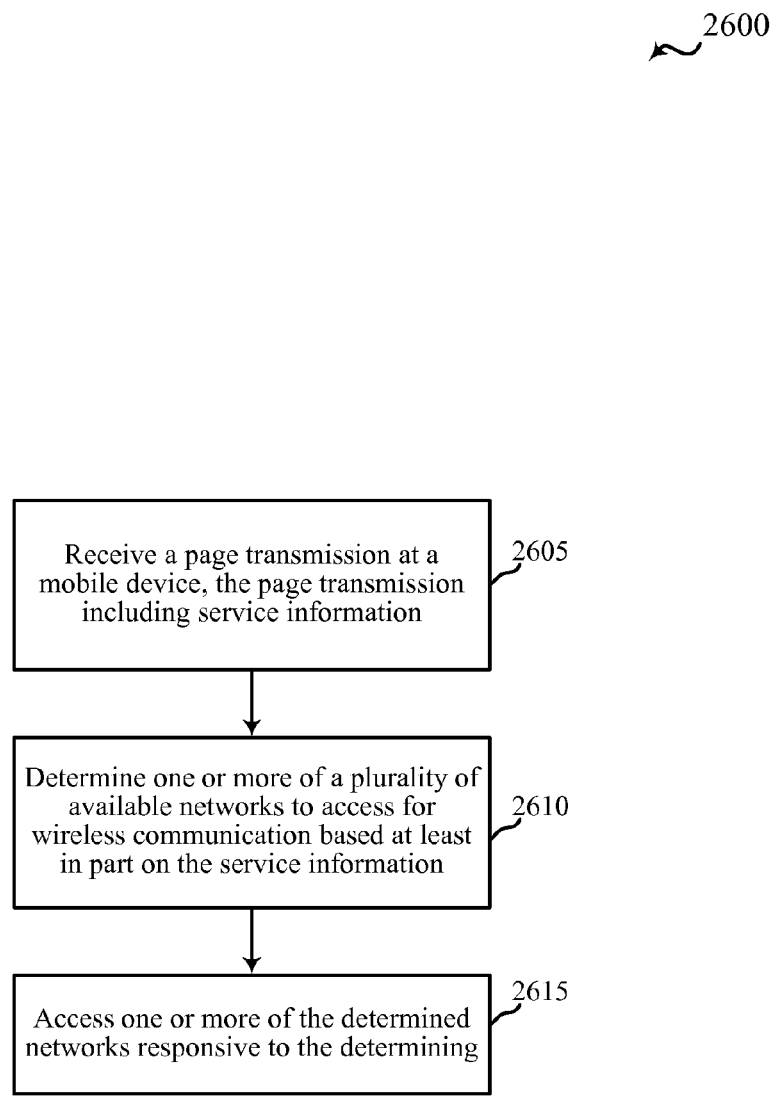
FIG. 26 shows a flowchart illustrating an example of a method for wireless communication, in accordance with various aspects of the present disclosure.

FIG. 26 shows a flowchart illustrating an example of a method 2600 for wireless communication, in accordance with various aspects of the present disclosure. For clarity, the method 2600 is described below with reference to aspects of one or more of the mobile devices 115, 215, 315, and/or 2405 described with reference to FIGS. 1, 2, 3, and/or 24, and/or aspects of one or more of the apparatuses 405 and/or 505 described with reference to FIGS. 4 and/or 5. In some examples, a mobile device may execute one or more sets of codes to control the functional elements of the mobile device to perform the functions described below. Additionally or alternatively, the mobile device may perform one or more of the functions described below using special-purpose hardware.

At block 2605, the method 2600 may include receiving a page transmission at a mobile device, the page transmission including service information. The operation(s) at block 2605 may be performed using the apparatuses 405 and/or 505 described with reference to FIGS. 4 and/or 5.

At block 2610, the method 2600 may include determining one or more of a plurality of available networks to access for wireless communication based at least in part on the service information. The operation(s) at block 2610 may be performed using the apparatuses 405 and/or 505 described with reference to FIGS. 4 and/or 5.

At block 2615, the method 2600 may include accessing one or more of the determined networks responsive to the determining. The operation(s) at block 2615 may be performed using the apparatuses 405 and/or 505 described with reference to FIGS. 4 and/or 5.

Thus, the method 2600 may provide for wireless communication. It should be noted that the method 2600 is just one implementation and that the operations of the method 2600 may be rearranged or otherwise modified such that other implementations are possible.

Figure 27:
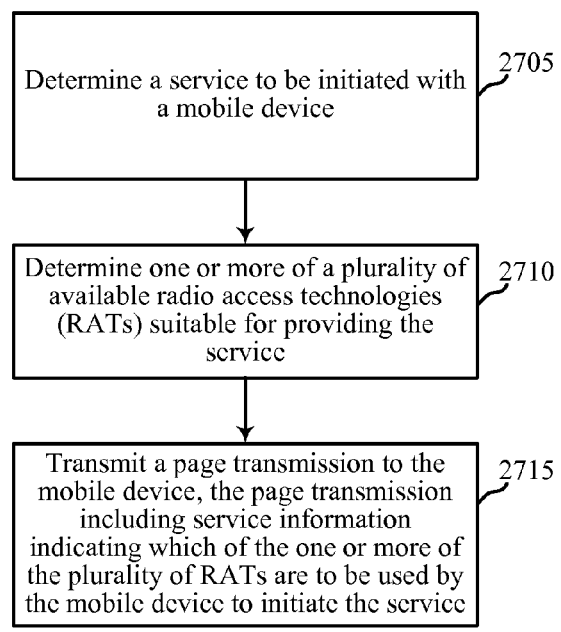
FIG. 27 shows a flowchart illustrating an example of a method for wireless communication, in accordance with various aspects of the present disclosure.

FIG. 27 shows a flowchart illustrating an example of a method 2700 for wireless communication, in accordance with various aspects of the present disclosure. For clarity, the method 2700 is described below with reference to aspects of one or more of the base stations 105, 205, 305, and/or 2505 described with reference to FIGS. 1, 2, 3, and/or 25, and/or aspects of one or more of the apparatuses 805 and/or 905 described with reference to FIGS. 8 and/or 9. In some examples, a base station may execute one or more sets of codes to control the functional elements of the base station to perform the functions described below. Additionally or alternatively, the base station may perform one or more of the functions described below using special-purpose hardware.

At block 2705, the method 2700 may include determining a service to be initiated with a mobile device. The operation(s) at block 2705 may be performed using the apparatuses 805 and/or 905 described with reference to FIGS. 8 and/or 9.

At block 2710, the method 2700 may include determining one or more of a plurality of available radio access technologies (RATs) suitable for providing the service. The operation(s) at block 2710 may be performed using the apparatuses 805 and/or 905 described with reference to FIGS. 8 and/or 9.

At block 2715, the method 2700 may include transmitting a page transmission to the mobile device, the page transmission including service information indicating which of the one or more of the plurality of RATs are to be used by the mobile device to initiate the service. The operation(s) at block 2715 may be performed using the apparatuses 805 and/or 905 described with reference to FIGS. 8 and/or 9.

Thus, the method 2700 may provide for wireless communication. It should be noted that the method 2700 is just one implementation and that the operations of the method 2700 may be rearranged or otherwise modified such that other implementations are possible.

Figure 28:
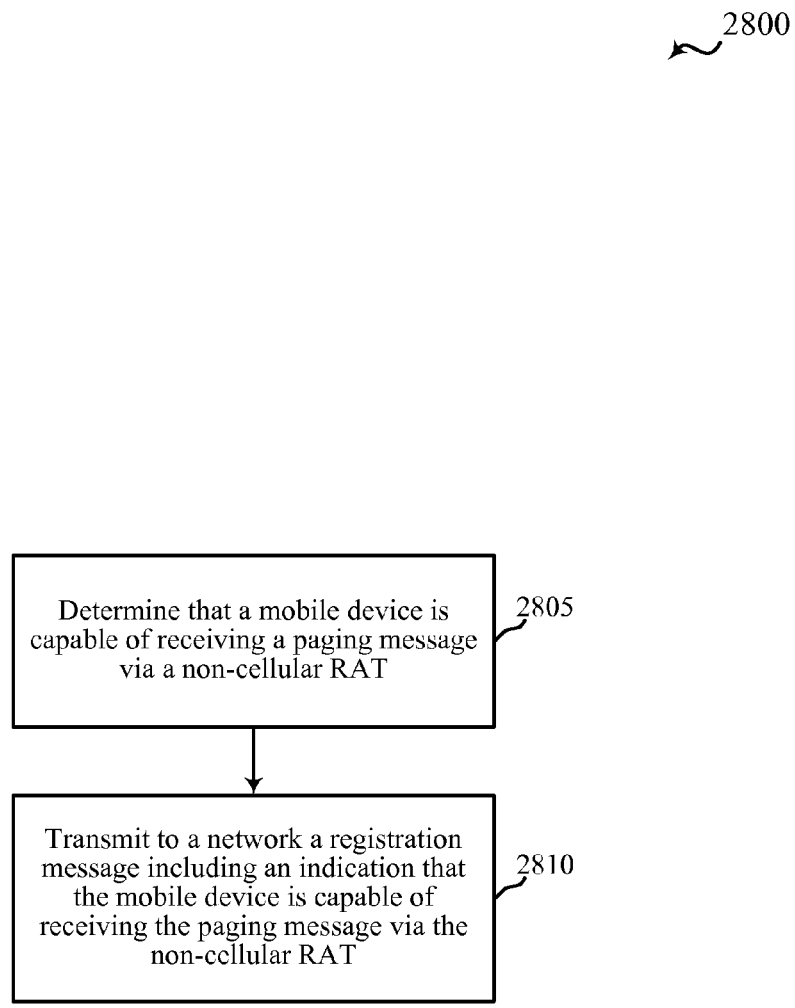
FIG. 28 shows a flowchart illustrating an example of a method for wireless communication, in accordance with various aspects of the present disclosure.

FIG. 28 shows a flowchart illustrating an example of a method 2800 for wireless communication, in accordance with various aspects of the present disclosure. The method 2800 may be performed, in various examples, by one or more of the mobile devices 115 and 215 described with reference to FIGS. 1 and 2, and/or aspects of the apparatus 1205 described with reference to FIG. 12. In some examples, a mobile device may execute one or more sets of codes to control the functional elements of the mobile device to perform the functions described below. Additionally or alternatively, the mobile device may perform one or more of the functions described below using special-purpose hardware.

At block 2805, the method 2800 may include determining that a mobile device is capable of receiving a paging message via a non-cellular RAT. At block 2810, the method 2800 may include transmitting to a network a registration message including an indication that the mobile device is capable of receiving the paging message via the non-cellular RAT.

Thus, the method 2800 may provide for wireless communication. It should be noted that the method 2800 is just one implementation and that the operations of the method 2800 may be rearranged or otherwise modified such that other implementations are possible.

Figure 29:
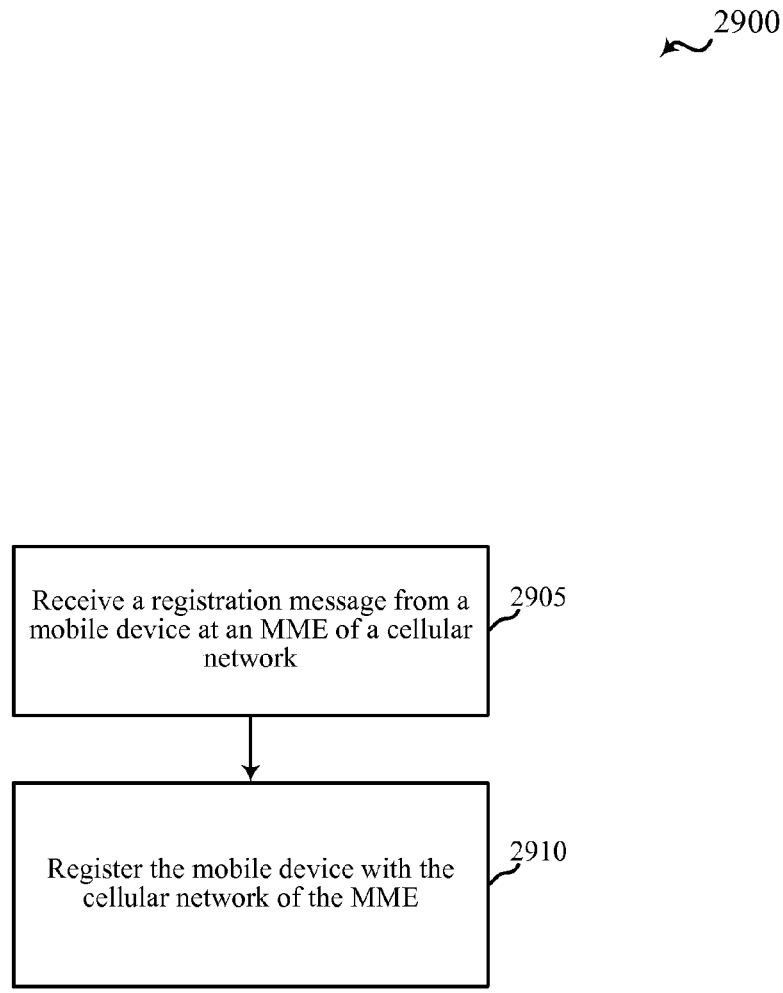
FIG. 29 shows a flowchart illustrating an example of a method for wireless communication, in accordance with various aspects of the present disclosure.

FIG. 29 shows a flowchart illustrating an example of a method 2900 for wireless communication, in accordance with various aspects of the present disclosure. The method 2900 may be performed, in various examples, by one or more of base stations 105, 205, and/or MME/SGW nodes 240 described with reference to FIGS. 1 and 2, and/or aspects of the apparatus 1405 described with reference to FIG. 14. In some examples, an MME may execute one or more sets of codes to control the functional elements of the MME to perform the functions described below. Additionally or alternatively, the MME may perform one or more of the functions described below using special-purpose hardware.

At block 2905, the method 2900 may include receiving a registration message from a mobile device at an MME of a cellular network. At block 2910, the method 2900 may include registering the mobile device with the cellular network of the MME.

Thus, the method 2900 may provide for wireless communication. It should be noted that the method 2900 is just one implementation and that the operations of the method 2900 may be rearranged or otherwise modified such that other implementations are possible.

Figure 30:
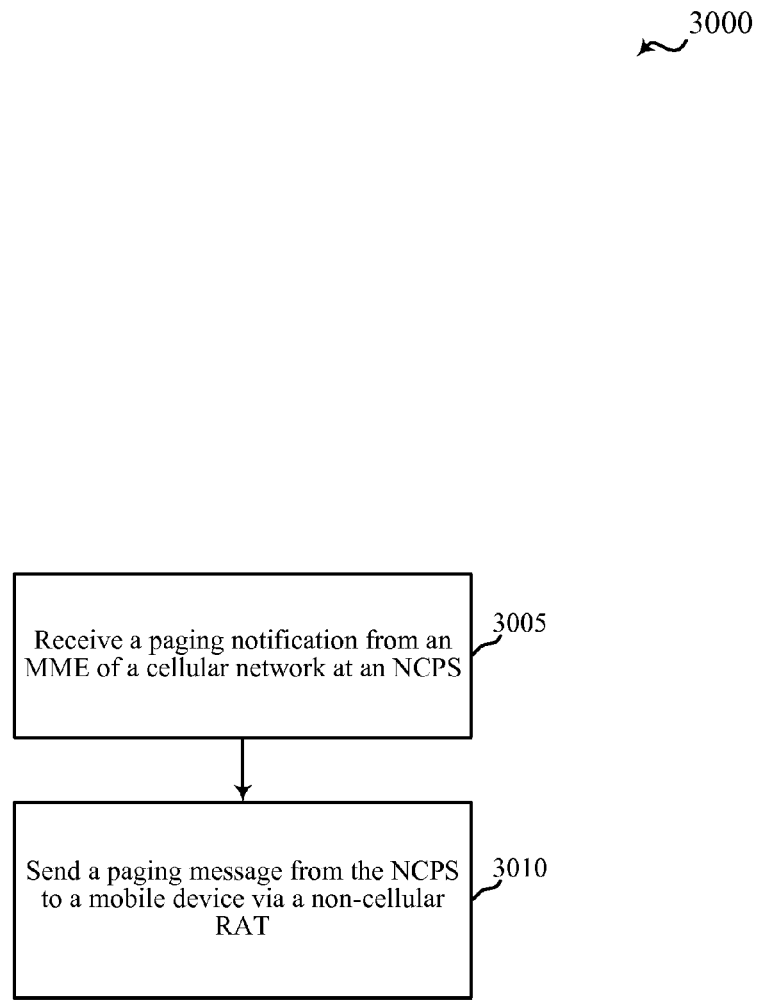
FIG. 30 shows a flowchart illustrating an example of a method for wireless communication, in accordance with various aspects of the present disclosure.

FIG. 30 shows a flowchart illustrating an example of a method 3000 for wireless communication, in accordance with various aspects of the present disclosure. The method 3000 may be performed, in various examples, by one or more of base stations 105, 205, and/or NCPS 260 described with reference to FIGS. 1 and 2, and/or aspects of the apparatus 1605 described with reference to FIG. 16. In some examples, an NCPS may execute one or more sets of codes to control the functional elements of the NCPS to perform the functions described below. Additionally or alternatively, the NCPS may perform one or more of the functions described below using special-purpose hardware.

At block 3005, the method 3000 may include receiving a paging notification from an MME of a cellular network at an NCPS. At block 3010, the method 3000 may include sending a paging message from the NCPS to a mobile device via a non-cellular RAT.

Thus, the method 3000 may provide for wireless communication. It should be noted that the method 3000 is just one implementation and that the operations of the method 3000 may be rearranged or otherwise modified such that other implementations are possible.

Figure 31:
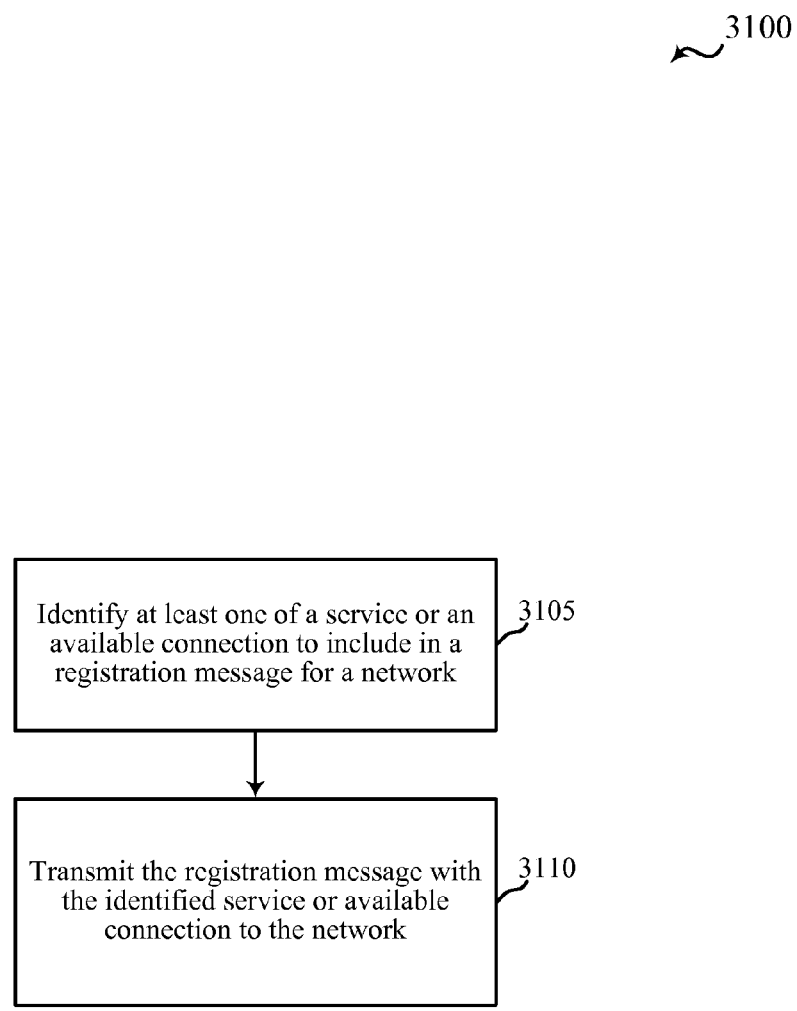
FIG. 31 shows a flowchart illustrating an example of a method for wireless communication, in accordance with various aspects of the present disclosure.

FIG. 31 shows a flowchart illustrating an example of a method 3100 for wireless communication, in accordance with various aspects of the present disclosure. The method 3100 may be performed, in various examples, by one or more of the mobile devices 115, 215 and/or 315 described with reference to FIGS. 1, 2 and/or 3, and/or aspects of the apparatus 1905 described with reference to FIG. 19. In some examples, a mobile device may execute one or more sets of codes to control the functional elements of the mobile device to perform the functions described below. Additionally or alternatively, the mobile device may perform one or more of the functions described below using special-purpose hardware.

At block 3105, the method 3100 may include identifying at least one of a service or an available connection to include in a registration message for a network. The operation(s) at block 3105 may be performed by the apparatus 1905 described with reference to FIG. 19.

At block 3110, the method 3100 may include transmitting the registration message with the identified service or available connection to the network. The operation(s) at block 3110 may be performed by the apparatus 1905 described with reference to FIG. 19.

Thus, the method 3100 may provide for wireless communication. It should be noted that the method 3100 is just one implementation and that the operations of the method 3100 may be rearranged or otherwise modified such that other implementations are possible.

Figure 32:
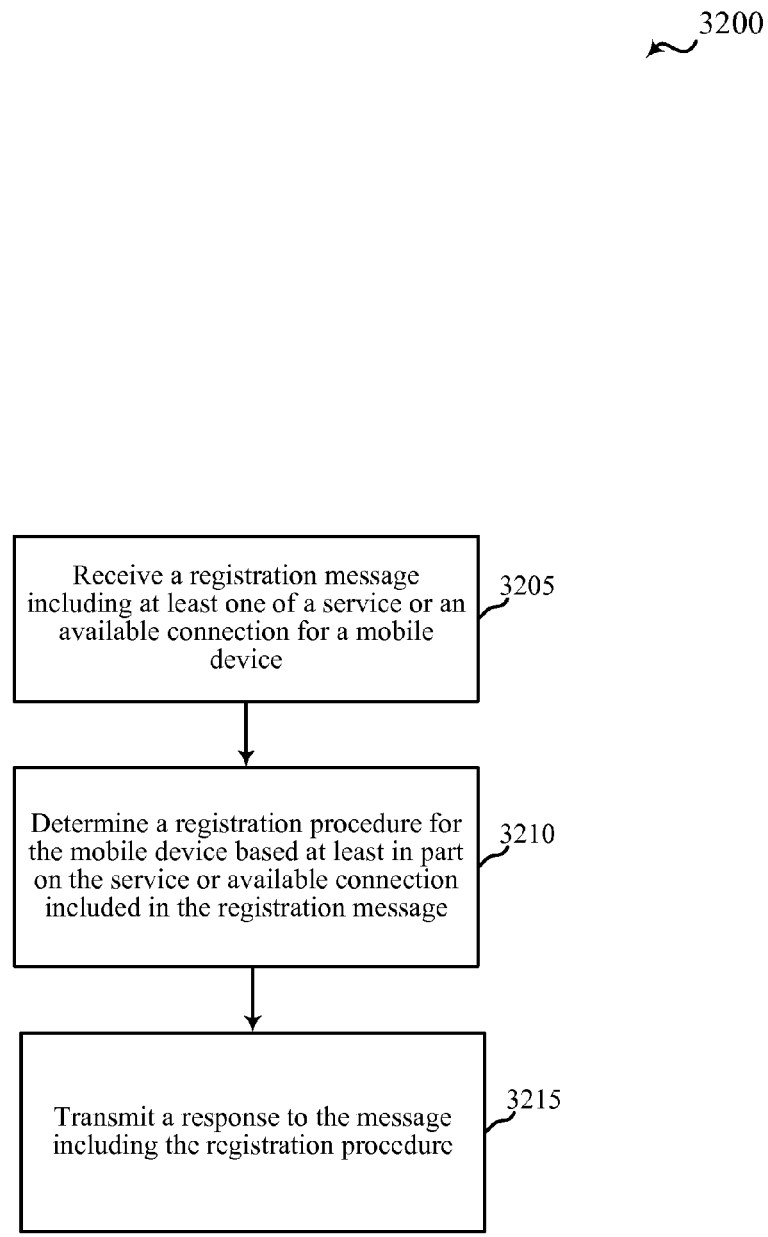
FIG. 32 shows a flowchart illustrating an example of a method for wireless communication, in accordance with various aspects of the present disclosure.

FIG. 32 shows a flowchart illustrating an example of a method 3200 for wireless communication, in accordance with various aspects of the present disclosure. The method 3200 may be performed, in various examples, by one or more of base stations 105, 205, and/or MME/SGW nodes 240 described with reference to FIGS. 1 and 2, and/or aspects of the apparatus 2105 described with reference to FIG. 21. In some examples, an MME may execute one or more sets of codes to control the functional elements of the MME to perform the functions described below. Additionally or alternatively, the MME may perform one or more of the functions described below using special-purpose hardware.

At block 3205, the method 3200 may include receiving a registration message including at least one of a service or an available connection for a mobile device. At block 3210, the method 3200 may include determining a registration procedure for the mobile device based at least in part on the service or available connection included in the registration message. At block 3215, the method 3200 may include transmitting a response to the message including the registration procedure.

Thus, the method 3200 may provide for wireless communication. It should be noted that the method 3200 is just one implementation and that the operations of the method 3200 may be rearranged or otherwise modified such that other implementations are possible.

In some examples, aspects from two or more of the methods 2600 through 3200 may be combined. It should be noted that the methods 2600 through 3200 are just example implementations, and that the operations of the methods 2600-3200 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the terms "apparatus" and "device" are interchangeable.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving a page transmission from a first network at a mobile device, the page transmission including service information comprising an indication of a type of service for which the mobile device is being paged, the type of service associated with a type of communication to be had with the mobile device;
   selecting, from a plurality of available networks and based at least in part on the type of service for which the mobile device is being paged, a second network to access for wireless communication in response to the page transmission based at least in part on a policy that indicates a priority for accessing the plurality of available networks for the type of service indicated by the page transmission, wherein the second network is different from the first network; and
   accessing the second network based at least in part on the selection.

2. The method of claim 1, wherein the selection is based at least in part on a quality of service requirement of the type of service.

3. The method of claim 1, wherein the service information further comprises an index into the policy.

4. The method of claim 3, wherein the plurality of available networks provide wireless communications through two or more different radio access technologies (RATs) and wherein the policy provides an order for accessing RATs based on a RAT priority.

5. The method of claim 4, wherein the index indicates a position in the order for accessing RATs.

6. The method of claim 4, wherein the policy indicates one or more RATs that are prohibited based on the page transmission.

7. The method of claim 1, further comprising:
   transmitting, over the second network, a paging response responsive to the received page transmission.

8. The method of claim 1, wherein selecting the second network is based at least in part on a policy that indicates a radio access technology (RAT) for sending the paging response.

9. The method of claim 7, wherein the paging response is tunneled to the first network that provided the page transmission.

10. The method of claim 1, wherein the page transmission comprises an access indication of a radio access technology (RAT) for transmitting a paging response; and wherein the method further comprises:
    determining that one or more of the plurality of available networks provide different RATs; and
    determining which of the plurality of available networks is to be used to transmit the paging response based at least in part on a policy for transmitting paging responses.

11. The method of claim 10, wherein the access indication comprises a service identifier indicating one or more services to be initiated responsive to the page transmission.

12. The method of claim 10, wherein the access indication comprises an indication of a RAT or frequency for use in the paging response.

13. The method of claim 10, wherein the access indication comprises a network identifier.

14. The method of claim 10, wherein the policy for transmitting paging responses comprises a list of RATs available for the paging response based on the service information.

15. A method for wireless communication, comprising:
    determining a type of service for which a network is to send a page transmission to a mobile device, the type of service associated with a type of communication to be had with the mobile device;
    determining, by the network, a first radio access technology (RAT) over which to send the page transmission and a second RAT to be accessed by the mobile device in response to the page transmission, wherein the second RAT is determined based at least in part on the type of service for which the network is to send the page transmission; and
    transmitting the page transmission to the mobile device over the first RAT, the page transmission including service information indicating the second RAT to be accessed by the mobile device in response to the page transmission.

16. The method of claim 15, wherein the service information comprises an index into a policy defining which of a plurality of RATs to use for wireless communication.

17. The method of claim 16, wherein the policy provides an order for accessing RATs based on a RAT priority.

18. The method of claim 17, wherein the policy is transmitted in a system information block (SIB).

19. The method of claim 15, wherein the service information is transmitted in a downlink data notification message.

20. An apparatus for wireless communication, comprising:
a processor;
memory in electronic communication with the processor; and
instructions stored in the memory, the instructions being executable by the processor to:
receive a page transmission from a first network at a mobile device, the page transmission including service information comprising an indication of a type of service for which the mobile device is being paged, the type of service associated with a type of communication to be had with the mobile device;
select, from a plurality of available networks and based at least in part on the type of service for which the mobile device is being paged, a second network to access for wireless communication in response to the page transmission based at least in part on a policy that indicates a priority for accessing the plurality of available networks for the type of service indicated by the page transmission, wherein the second network is different from the first network; and
accessing the second network based at least in part on the selection.

21. The apparatus of claim 20, wherein the page transmission comprises an access indication of a radio access technology (RAT) for transmitting a paging response; and wherein the instructions are further executable by the processor to:
determine that one or more of the plurality of available networks provide different RATs, wherein the second network is selected based at least in part on the determination and the indicated RAT.

22. The apparatus of claim 21, wherein the policy is received as part of the page transmission, and wherein the instructions are further executable by the processor to:
determine whether to apply the policy based on the access indication.

23. The apparatus of claim 21, wherein the access indication comprises an indication to override the policy.

24. The apparatus of claim 23, wherein the instructions are further executable by the processor to:
determine whether the policy allows the access indication to override the policy;
respond to the page transmission based on the access indication when the policy allows the access indication to override the policy; and
respond to the page transmission based on the policy when the policy does not allow the access indication to override the policy.

25. An apparatus for wireless communication, comprising:
a processor;
memory in electronic communication with the processor; and
instructions stored in the memory, the instructions being executable by the processor to:
determine a type of service for which a network is to send a page transmission to a mobile device, the type of service associated with a type of communication to be had with the mobile device;
determine, by the network, a first radio access technology (RAT) over which to send the page transmission and a second RAT to be accessed by the mobile device in response to the page transmission, wherein the second RAT is determined based at least in part on the type of service for which the network is to send the page transmission; and
transmit the page transmission to the mobile device over the first RAT, the page transmission including service information indicating the second RAT to be accessed by the mobile device in response to the page transmission.

26. The apparatus of claim 25, wherein the service information comprises an index into a policy defining which of a plurality of RATs to use for wireless communication.

27. The apparatus of claim 26, wherein the policy provides an order for accessing RATs based on a RAT priority.

28. The method of claim 15, wherein the page transmission further comprises a policy defining an order for accessing RATs based on the type of service to be initiated.

29. The method of claim 1, wherein the type of service comprises voice, or data, or streaming audio, or streaming video, or video telephony, or two-way gaming, or a combination thereof.

30. The method of claim 1, wherein the type of service comprises an application operable on the mobile device, or the second network, or a combination thereof.

31. The method of claim 15, wherein the type of service comprises voice, or data, or streaming audio, or streaming video, or video telephony, or two-way gaming, or a combination thereof.

32. The method of claim 15, wherein the type of service comprises an application operable on the mobile device, or the network, or a combination thereof.

33. The apparatus of claim 20, wherein the type of service comprises voice, or data, or streaming audio, or streaming video, or video telephony, or two-way gaming, or a combination thereof.

34. The apparatus of claim 20, wherein the type of service comprises an application operable on the mobile device, or the second network, or a combination thereof.

35. The apparatus of claim 25, wherein the type of service comprises voice, or data, or streaming audio, or streaming video, or video telephony, or two-way gaming, or a combination thereof.

36. The apparatus of claim 25, wherein the type of service comprises an application operable on the mobile device, or the network, or a combination thereof.

* * * * *